(12) United States Patent
Kondo et al.

(10) Patent No.: US 6,618,396 B1
(45) Date of Patent: Sep. 9, 2003

(54) DATA TRANSMITTING DEVICE, DATA RECEIVING DEVICE, AND DATA RECORDING DEVICE

(76) Inventors: Satoshi Kondo, Kyotofu, Yawata Otokoyamasasatani 8-D3-202, 614-8372 (JP); Akiyoshi Maeda, Hyogoken, Sanda Yayoigaoka 4-5-1, 669-1546 (JP); Hiroyuki Uenaka, Hyogoken, Akashi Uozumicho Kamoike 8-11, 674-0073 (JP); Hiromu Kitaura, Osakafu, Osakasayama Onodai 1-14-7, 589-0023 (JP); Hidetoshi Takeda, Osakafu, Neyagawa Kourinishinocho 22-7, 572-0089 (JP); Yoshitaka Mitui, Osakafu, Ibaraki Higashinara 3-11-D-804, 567-0861 (JP)

( * ) Notice: Subject to any disclaimer, the term of this patent is extended or adjusted under 35 U.S.C. 154(b) by 0 days.

(21) Appl. No.: 09/122,899

(22) Filed: Jul. 28, 1998

(30) Foreign Application Priority Data

Jul. 29, 1997 (JP) ............................................... 9-202746
Jul. 29, 1997 (JP) ............................................... 9-202748
Jul. 31, 1997 (JP) ............................................... 9-205671
Oct. 7, 1997 (JP) ............................................... 9-274139

(51) Int. Cl.[7] ................................................. H04J 3/02
(52) U.S. Cl. ..................................... 370/474; 370/538
(58) Field of Search ................................ 370/538, 528, 370/474, 470, 471, 476, 487, 493, 509, 389, 392, 395

(56) References Cited

U.S. PATENT DOCUMENTS

| 4,149,039 | A | * | 4/1979 | Yuguchi et al. ............. 370/477 |
|---|---|---|---|---|
| 5,291,486 | A | * | 3/1994 | Koyanagi .................... 370/541 |
| 5,566,208 | A | * | 10/1996 | Balakrishnan ............... 375/240 |
| 5,619,337 | A | * | 4/1997 | Naimpally .................... 386/83 |
| 5,631,644 | A | * | 5/1997 | Katata et al. ................. 341/51 |
| 5,644,506 | A | * | 7/1997 | Okazaki et al. ............. 364/514 |
| 5,652,749 | A | * | 7/1997 | Davenport et al. ......... 370/466 |
| 5,663,951 | A | | 9/1997 | Danneels et al. ........... 370/230 |
| 5,699,392 | A | | 12/1997 | Dokic ......................... 375/376 |
| 5,724,349 | A | | 3/1998 | Cloonan et al. ............ 370/390 |
| 5,754,241 | A | * | 5/1998 | Okada et al. ............ 375/240.05 |
| 5,802,068 | A | * | 9/1998 | Kudo .......................... 370/538 |
| 5,894,328 | A | * | 4/1999 | Tahara et al. ............... 348/423 |
| 5,901,149 | A | * | 5/1999 | Itakura et al. .............. 370/468 |
| 5,933,430 | A | * | 8/1999 | Osakabe et al. ............ 370/395 |
| 5,970,386 | A | * | 10/1999 | Williams ....................... 725/69 |
| 6,009,229 | A | * | 12/1999 | Kawamura .................... 386/68 |

FOREIGN PATENT DOCUMENTS

| JP | 7-111507 | 4/1995 |
|---|---|---|
| JP | 7-221762 | 8/1995 |
| JP | 9-135241 | 5/1997 |

* cited by examiner

*Primary Examiner*—Hassan Kizou
*Assistant Examiner*—Saba Tsegaye

(57) ABSTRACT

A data transmitting device connected to a prescribed network includes a coding device for receiving plural kinds of coded data, and coupling these coded data in first data units to generate a first coded stream. A divider divides the first coded stream into second data units of a prescribed data size to generate divided pack data corresponding to divided packs as the second units. A packet generating device adds header information to respective divided pack data to generate packet data corresponding to packets as data transmission units; and a transmitter outputs the respective packet data toward the network as a second coded stream which has a data structure different from that of the first coded stream.

46 Claims, 39 Drawing Sheets

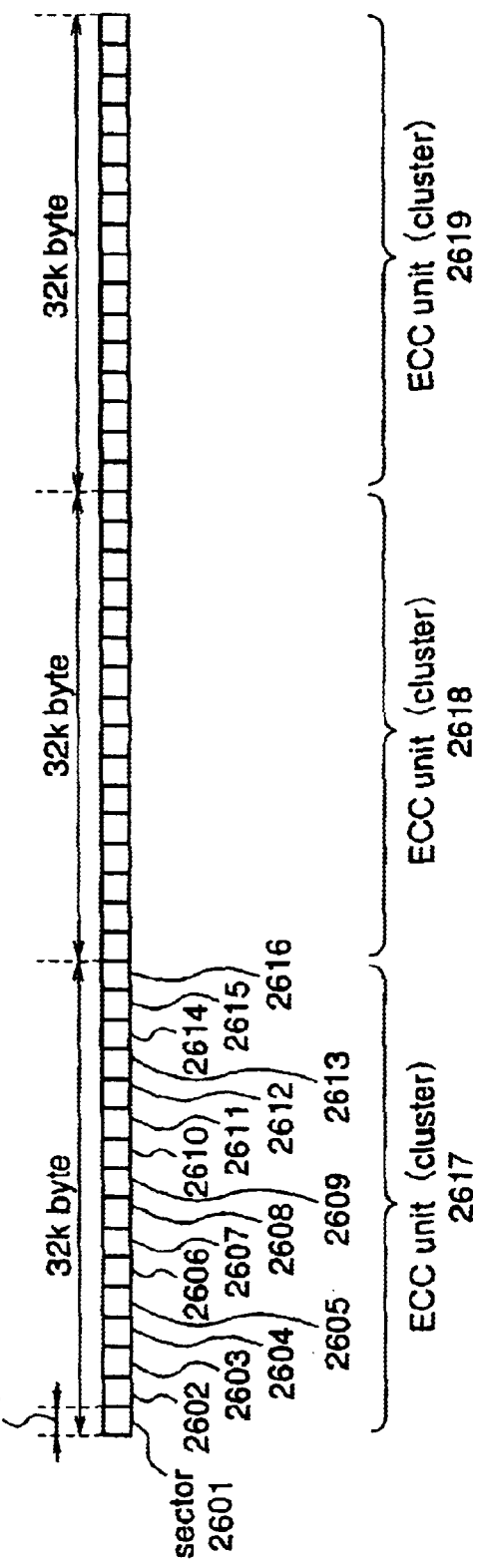
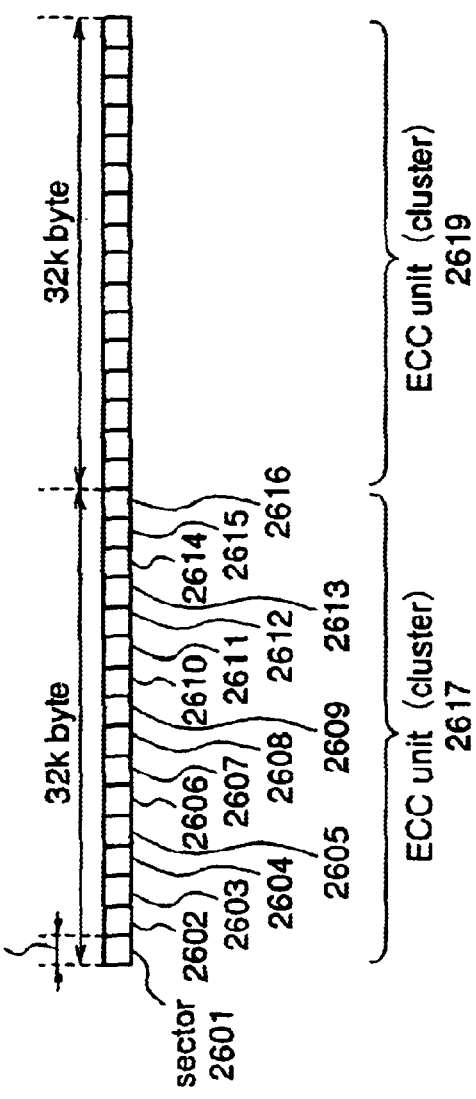
Fig.26 (a)
Fig.26 (b)

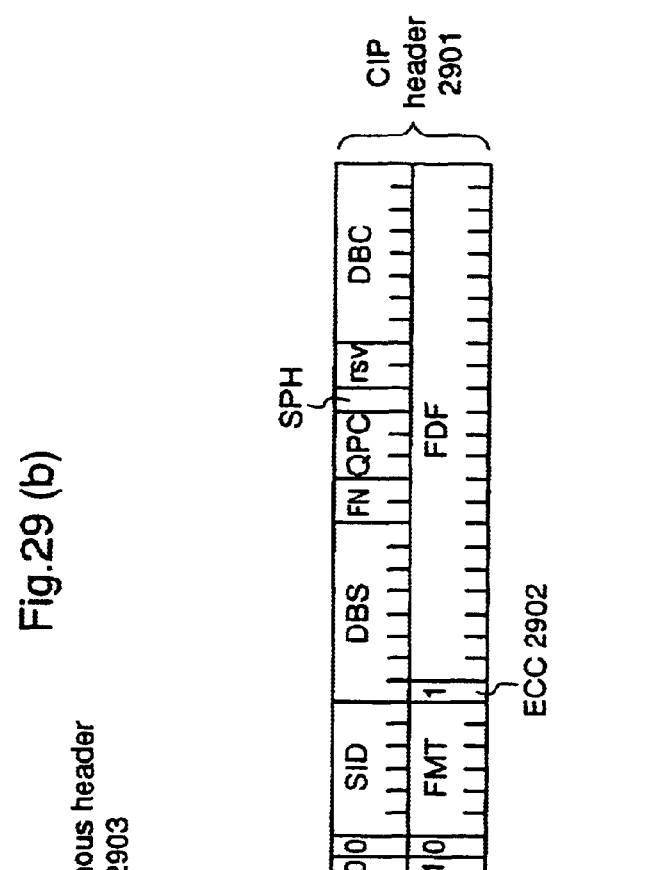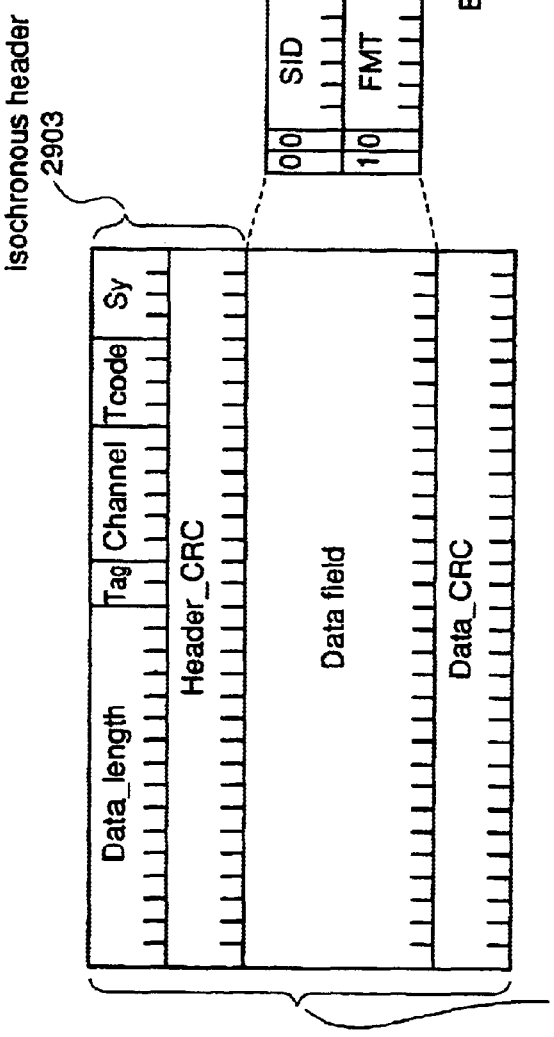

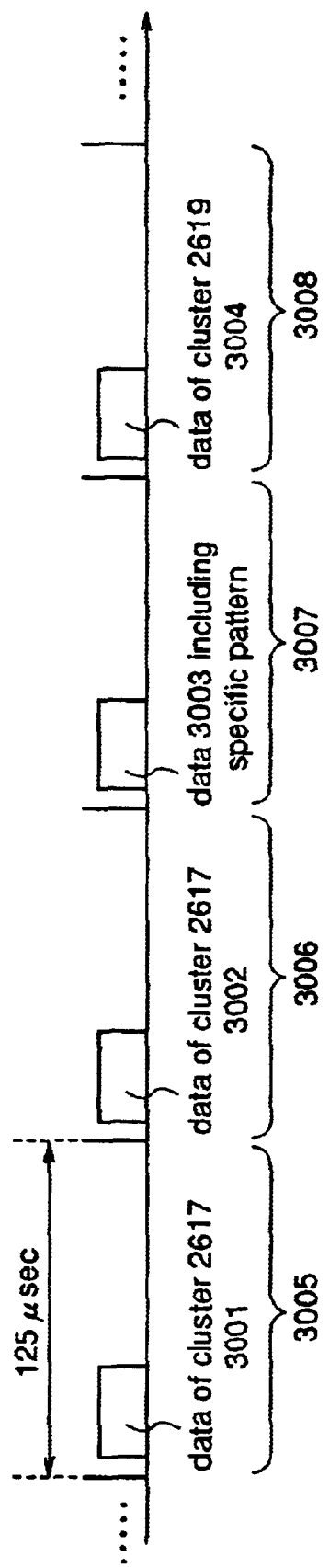

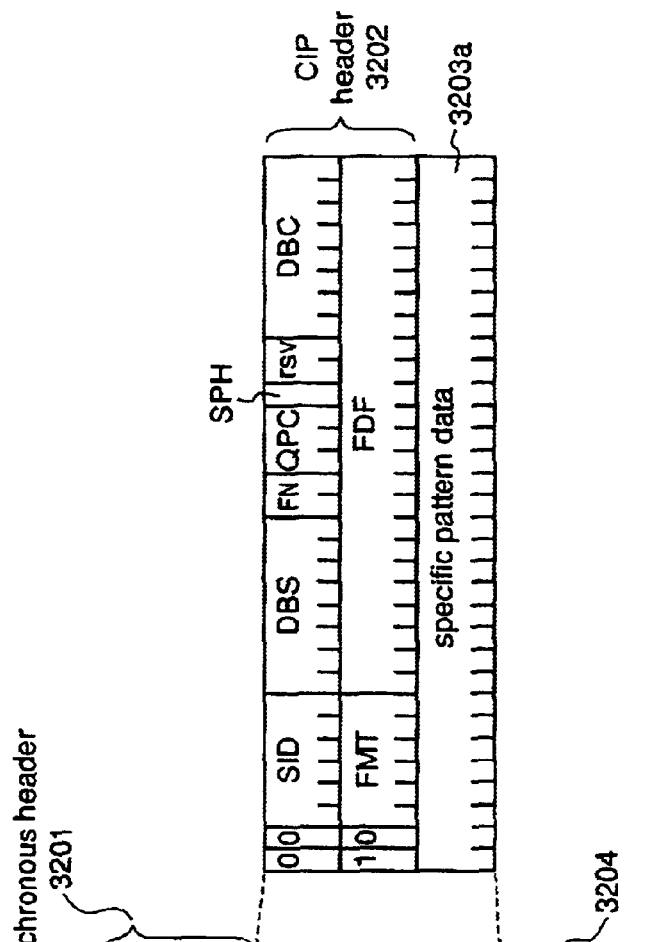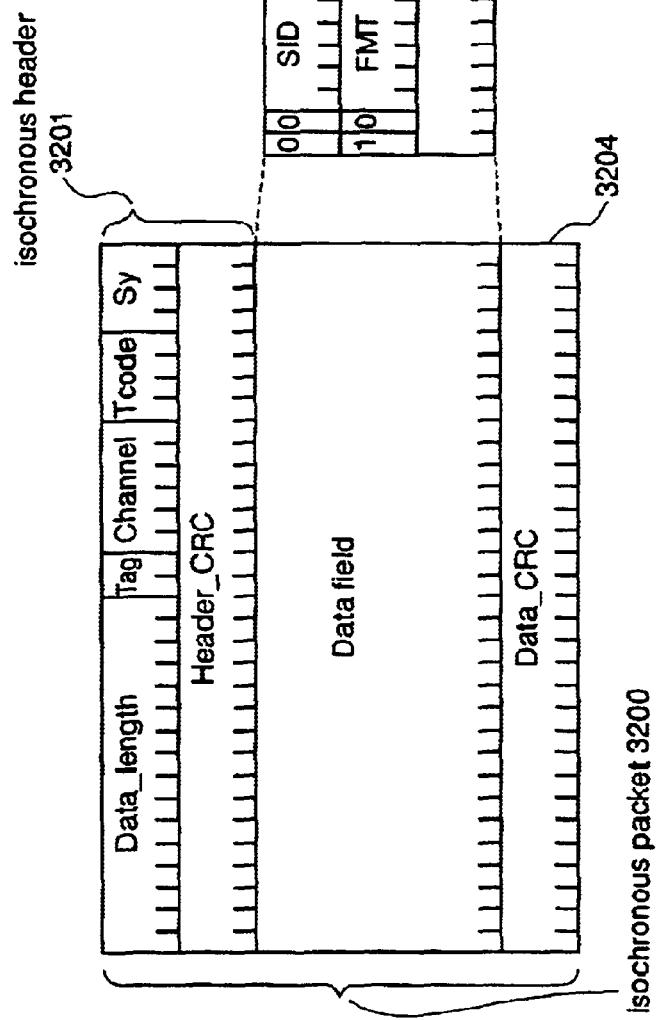

general MPEG2-PS
: variable length

DVD : fixed length

MPEG-TS
: for broadcasting

DATA TRANSMITTING DEVICE, DATA RECEIVING DEVICE, AND DATA RECORDING DEVICE

FIELD OF THE INVENTION

The present invention relates to a data transmitting device, a data receiving device, and a data recording device and, more particularly to an device which transmits, receives, or records output data of an MPEG (moving picture expert group) 2 encoder or data of an MPEG2 program stream recorded in a recording medium such as an optical disk, through a communication medium (interface) such an IEEE1394 system.

BACKGROUND OF THE INVENTION

In recent years, attention has been focused on the IEEE1394 system as a serial transmission system for data.

The IEEE1394 system uses any of 100 Mbps, 200 Mbps, and 400 Mbps as a base rate of data transmission with a cycle time of 125 $\mu$s (microsecond).

Also, the IEEE1394 system defines two communication methods, namely, an isochronous transfer (synchronous communication) and an asynchronous transfer. In the isochronous transfer, data is transmitted immediately in response to a transmission request, while in the asynchronous transfer, some delay may sometimes occur between generation of a transmission request and data transmission.

The isochronous transfer is a communication method for use by data transmission which must be made in real time, as is typical of transmission of AV (Audio Video) data. In the isochronous transfer, prior to the start of data transmission, a band required for data transmission is obtained. Then, with this band, data of at least one packet is transmitted once in one cycle (125 $\mu$s), which ensures that data transmission is made in real time.

On the other hand, the asynchronous transfer is a communication method for use by data transmission which need not be made in real time, as in the case of transmission of computer data such as commands or still picture data. It is assumed that this is identical to a transmission system such as a conventional SCSI (small computer system interface).

Currently, for transmission of the AV data using the isochronous transfer, a method of transmitting data for digital VCR (Video Cassette Recorder), a method of transmitting MPEG2 transport stream data, and so forth are defined.

Now, a brief description is given of a communication method on a network N by the use of an interface according to the IEEE1394 (hereinafter referred to as 1394I/F).

FIG. 36(a) schematically shows a network to which three terminals are connected through the 1394I/F. Suppose that terminals A, B and C are a digital video camcoder (DVC), a personal computer for outputting the MPEG2 transport stream (TS) as image data, and a receiving device for image data, respectively. Also suppose that the terminal A is a main terminal for outputting cycle start packet per 125 $\mu$s toward the network N, and allocating a frequency band for data transmission to each terminal.

In the 1384I/F, time for the isochronous transfer and time for asynchronous transfer are allocated for one cycle. Of the one cycle, 80% time period is used for the isochronous transfer, and the remaining 20% time period is used for the asynchronous transfer. Each terminal performs data transmission by the isochronous transfer for data which must be transmitted in real time, and performs data transmission by the asynchronous transfer for data which need not be transmitted in real time.

Initially, each of the terminals A–C declares a frequency band required for data transmission to the main terminal A, and requests permission for use of the band. If permitted, each terminal uses the band for data transmission, whereas if not permitted, it tries to request permission for use of reduced band. When the permission is granted, each terminal can transmit packet data by the isochronous transfer at least once in one cycle when it is necessary to perform the isochronous transfer.

Hereinafter, description is given of a case where the terminals A and B perform data transmission by the isochronous transfer, and the terminal C performs data transmission by the asynchronous transfer, with reference to FIG. 36(b).

Referring to FIG. 36(b), the main terminal A outputs cycle start packets St1, St2, St3, . . . , each indicating a head of each cycle in each cycle, and outputs isochronous packets Aiso1, Aiso2, Aiso3, . . . in each cycle.

The terminal B outputs isochronous packets Biso1, Biso2, Biso3, . . . , in each cycle.

The terminal C outputs an asynchronous packet Casyn1, subsequently to the isochronous packets Aiso1, and Biso1, in a cycle between the cycle start packets St1 and St2.

In a case where plural terminals output asynchronous packets, priority of the asynchronous packets is established among them in such a manner that priority decreases in the order in which transmission requests of the corresponding terminals are sent to the main terminal. In this case, asynchronous packets which have not been transmitted in one cycle will be transmitted in a subsequent cycle.

Meanwhile, in DVD (digital versatile disk)-Video standard, a method of recording compressively coded video data or audio data in a DVD disk as a recording medium is defined.

Assume that compressively coded video data or audio data is read from the recording medium such as the DVD, and AV decoding is performed thereto. In this case, in general, data is read from the recording medium at a rotation rate higher than a rotation rate corresponding to normal data processing rate, and data is read intermittently.

As shown in FIG. 37, a reproducing device 10 such as a DVD player, includes a buffer 12 at a previous stage of an AV data decoder 13, for storing read data therein to buffer difference between a data readout rate and a data processing rate. In FIG. 37, reference numeral 11 designates an optical head for reading data from the DVD disk1, and reference numeral 14 designates a display such as TV (Television Set) which displays image data or outputs audio data on the basis of an output of the AV data decoder 13.

In the DVD player thus constructed, data transfer from the recording medium 1 to the buffer 12 is controlled according to amount of data stored in the buffer 12. In response to a request Re from the AV data decoder 13, data Da is then transferred from the buffer 12 to the AV data decoder 13.

Here, assume that a digital interface (I/F) 15 is added to the DVD player as shown in FIG. 38.

At a transmitting end, a transmitting device 10 transfers data from the recording medium 10a to the buffer 12, and then outputs data to the digital interface 15.

Meanwhile, at a receiving end, a receiving device 20 receives data through a digital interface 21, and then an AV data decoder 22 decodes received data and outputs decoded data to the TV or the like.

In this case, since data is output from the buffer 12 in response to a request Rq2 from the AV data decoder 22 of the receiving device 20, the request Rq2 must be transmitted through the digital interfaces 21 and 15 at the receiving end and the transmitting end, respectively.

Besides, in another case where plural devices receives data, since operations of the corresponding AV data decoders might differ from each other, it is required that a transmitting device at the transmitting end output data in response to requests from respective receiving devices at the receiving end. Therefore, a transmitting device at the transmitting end must read data from a recording medium at a very high rate.

Data recorded in the DVD is data which takes an MPEG2 program stream format (hereinafter referred to as MEPEG2-PS data). In order to transmit the MEPEG2-PS data through the 1394I/F as the digital interface 15 in FIG. 38(a), that is, to transmit it according to a transmitting method of the conventional MPEG2 transport stream format data (hereinafter referred to as MPEG2-TS data), it is required that the MEPEG2-PS data be converted into the MPEG2-TS data.

Hereinbelow, description is given of problems associated with transmission of the MEPEG2-PS data recorded in the DVD through the 1394I/F from the transmitting end to the receiving end with reference to FIG. 39.

FIG. 39 shows detailed structures of the interfaces 15 and 21 of transmitting device 10a and receiving device 20a in FIG. 38, respectively. The interface 15 of the transmitting device 10 comprises a conversion unit 15a for converting the MEPEG2-PS data output from the buffer 12 into the MPEG2-TS data, and a transmitting end 1394I/F 15b connected to an output area of the conversion unit 15a. The interface 21 comprises a receiving end 1394I/F 21a for receiving the MPEG2-TS data from the transmitting end over an network N, and a conversion unit 21b for converting the MPEG2-TS data from the 1394I/F 21a into the MPEG2-PS data.

In order to transmit the MEPEG2-PS data recorded in the DVD through the 1394I/F, it is required that the MPEG2-PS data be converted into the MPEG2-TS data on the transmitting end, and the MPEG2-TS data be converted into the MEPEG2-PS data at the receiving end.

However, there have been many problems associated with the above data conversion, which will be described below.

i) The MEPEG2-PS data and the MPEG2-TS data have contents of data description which differ from each other in their respective headers, and therefore information of the headers must be changed, causing complicated data processing.

ii) The MEPG2-PS data and the MPEG2-TS data respectively contain clock reference (time data) which a decoder use. The clock reference of the MEPEG2-PS data is called "SCR" (System Clock Reference), and the clock reference of the MPEG2-TS data is called "PCR" (Program Clock Reference). According to MPEG2, the largest interval of the SCR is 700 ms, and the largest interval of the PCR is 100 ms. When converting the MEPEG2-PS data into the MPEG2-TS data, more clock references must be created, and therefore there is a need for a circuit for generating a high-precision timing signal at a transmitting end.

The MEPEG2-PS data recorded in the DVD contains data unique to the DVD (Navigation data or the like) in a private stream format. When the MPEG2-TS data into which the MEPEG2-PS data has been converted is decoded by a decoder for TS, the data unique to the DVD cannot be decoded. For this reason, it is necessary that the MPEG2-TS data output from the 1395I/F 21a be inversely converted into the MEPEG2-TS data at the receiving end, causing a complicated structure of receiving device.

Assuming that transmitting device is a DVD recorder 10b for performing coding to a TV signal and recording a coded TV signal in a recording medium 1 such as the DVD, as in the case of the DVD recorder 10, what is needed is that the DVD recorder 10b includes a conversion unit 17 for converting the MEPEG2-TS data output from an MPEG2 program stream encoder (elementary and system) 16 into the MPEG2-TS data, and an output of the conversion unit 17 is signal is sent onto an network N through an 1394I/F unit 18.

The recording medium such as the optical disc contains data which has been subjected to error correction coding and modulation. In a case where the data us read from the recording medium such as the optical disk, it track jump may fails and the same data is reread therefrom, a buffer may underflow, or if ECC (error correction code) decoding may develop an error, and the same data is reread therefrom, a buffer may underflow in the system in FIG. 38.

In this case, even if the AV data decoder 13 at a transmitting end issues a data request to the buffer, data will not be output therefrom, or it is not correct data if output. The same goes for data output to the digital interface 15. Hence, in the system shown in FIG. 38, the AV data decoder 22 at the receiving end cannot perform correct decoding, causing an incorrect video or audio signal to be reproduced. In other words, in the system shown in FIG. 38, when reading data from a recording medium such as an optical disk has developed an error in the transmitting device, if read data is transmitted to the receiving end through the digital interface, the data cannot be AV decoded correctly at the receiving end.

SUMMARY OF THE INVENTION

It is an object of the present invention to provide a data transmitting device which can transmit MPEG2 program stream data output from an MPEG2 encoder (elementary and system) or recorded in a recording medium by the use of an 1394I/F without the necessity of converting it into an MPEG2 transport stream.

It is another object of the present invention to provide a data receiving device which can receive the MPEG2 program stream data transmitted by the use of the 1394I/F and can decode the same correctly, and a data recording device which can record the MPEG2 program stream data transmitted by the use of the 1394I/F in a prescribed recording format.

It is still another object of the present invention to provide a data transmitting device which can transmit data which will be decoded correctly at a receiving end, and a data receiving device which can correctly decode the data transmitted from the data transmitting device, even if underflow or an ECC error occurs in a buffer at a transmitting end while data recorded in a recording medium is transmitted.

Other objects and advantages of the present invention will become apparent from the detailed description that follows. The detailed description and specific embodiments described are provided only for illustration since various additions and modifications within the spirit and scope of the invention will be apparent to those skill in the art from the detailed description.

According to first aspect of the present invention, a data transmitting device connected to a prescribed network, comprises coding means for receiving plural kinds of coded data, and coupling these coded data in first data units to generate a first coded stream; dividing means for dividing the first coded stream in second data units of a prescribed data size to generate divided pack data corresponding to divided packs as the second units; packet generating means for adding header information to respective divided pack data to generate packet data corresponding to packets as data transmission units; and transmitting means for outputting the respective packet data toward the network as a second coded stream which has a data structure different from that of the first coded stream. Therefore, the MPEG2 program stream data or the like cane divided into packets which are smaller than its data units. As a result, the MPEG2 program stream or the like cane output toward the network by a transmitting method of the transport stream, that is, through the IEEE 1394I/F, without the necessity of converting it into the MPEG transport stream.

In addition, in a receiving device at a receiving end connected to the network, received data packets are coupled, thereby restoring the MPEG2 program stream generated by the data transmitting device.

According to a second aspect of the present invention, in the data transmitting device as defined in the first aspect, the dividing means divides the first coded stream in such a manner that the divided packs each contains coded data of one kind. Therefore, the MPEG2 program stream can be restored easily at the receiving end.

According to a third aspect of the present invention, in the data transmitting device as defined in the second aspect, the packet generating means generates packet data by adding stuffing data to a divided pack of a size smaller than the prescribed data size so that all the generated packets are of the same size. Therefore, packet data is easy to handle at the transmitting end and the receiving end.

According to a fourth aspect of the present invention, a data transmitting device connected to a prescribed network, comprises reading means for reading data recorded in sector units of a prescribed data size in a recording medium for each sector; dividing means for dividing data corresponding to each sector read by the reading means in data units of a data size smaller than that of the sector, to generate divided pack data corresponding to divided packs as the data units; packet generating means for adding header information to respective divided pack data, to generate packet data corresponding to packets as data transmission units; and transmitting means for outputting respective packet data toward the network. Therefore, the MPEG2 program stream or the like can be output toward the network by a transmitting method of the transport stream, that is, through the IEEE 1394I/F, without the necessity of converting it into the MPEG transport stream.

According to a fifth aspect of the present invention, in the data transmitting device as defined in the fourth aspect, the dividing means divides the data corresponding to the sector so that head data of each sector matches head data of the corresponding divided pack. Therefore, packet data is easy to handle at the receiving end.

According to a sixth aspect of the present invention, in the data transmitting device as defined in the fourth or fifth aspect, the packet generating means generates packet data by adding information indicating that a divided pack contains head data of the corresponding sector to the divided pack. Therefore, divided packs can be restored to a pack with ease at a receiving end. Besides, the pack is divided in arbitrary byte units, thereby realizing effective use of a band of a digital interface such as the 1394I/F.

According to a seventh aspect of the present invention, a data receiving device for receiving packet data output from the data transmitting device as defined in any of the fourth to sixth aspects as a coded stream, comprises receiving means for receiving the packet data and outputting the divided pack data corresponding to each packet according to analysis of its header information; and coupling means for coupling the divided pack data output from the receiving means to generate data corresponding to the sector. Therefore, based on packet data output from the data transmitting device, the MPEG2 program stream or the like generated by the data transmitting device can be correctly restored.

According to an eighth aspect of the present invention, a data recording device for receiving and recording packet data output as a coded stream from the data transmitting device as defined in any of the fourth to sixth aspects, comprises receiving means for receiving the packet data and outputting the divided pack data corresponding to each packet according to analysis of its header information; coupling means for coupling the divided pack data output from the receiving means to generate data corresponding to the sector; and recording means for recording the data corresponding to the sector output from the coupling means in a recording medium having a sector structure. Therefore, based on packet data output from the data transmitting device, the MPEG2 program stream or the like generated by the data transmitting device can be correctly restored and recorded.

According to a ninth aspect of the present invention, a data transmitting device connected to a prescribed network, comprises data reading means for reading data recorded in a recording medium; buffer means for temporarily storing the data read by the data reading means; and data transmitting means for outputting the data output from the buffer means, toward the network; wherein, when the buffer means goes into underflow state, the data transmitting means outputs underflow information indicating that underflow has occurred in the buffer means, toward the network. Therefore, even when underflow has occurred in a buffer at the transmitting end, the receiving end detects the occurrence of underflow and converts the operating mode from the normal mode to the error handling mode. As the result, speedy error-handling is realized at the receiving end, whereby disorder of video and audio signals due to the occurrence of underflow in the buffer at the transmitting end can be suppressed effectively.

According to a tenth aspect of the present invention, a data transmitting device connected to a prescribed network, comprises data reading means for reading data recorded in a recording medium; buffer means for temporarily storing the data read by the data reading means; packet generating means for adding header information to the data output from the buffer means, and generating packet data corresponding to a packet which is a unit of data transmission; and data transmitting means for outputting the packet data output from the packet generating means, toward the network; wherein, when the buffer means goes into underflow state, the packet generating means adds underflow information to a header section of the packet, which information indicates that underflow has occurred in the buffer means, and outputs the packet toward the data transmitting means. Therefore, even when underflow has occurred in a buffer at the transmitting end, the receiving end detects the occurrence of underflow and performs speedy error-handling, whereby disorder of video and audio signals due to the occurrence of underflow in the buffer at the transmitting end can be suppressed effectively.

According to an eleventh aspect of the present invention, in the data transmitting device of the tenth aspect, the data transmitting means repeats, at fixed time intervals, packet-by-packet data transmission for outputting at least one packet data to the network at a fixed transmission rate; and the packet generating means adds the underflow information to a header of an isochronous packet used in isochronous transfer in which the data transmission is performed synchronously with a transfer request generated by the data transmitting means.

According to a twelfth aspect of the present invention, a data transmitting device connected to a prescribed network, comprises data reading means for reading data recorded in a recording medium; buffer means for temporarily storing the data read by the data reading means; and data transmitting means for outputting the data output from the buffer means, toward the network; wherein, when the buffer means goes into underflow state, the data transmitting means output data of a prescribed pattern to the network, as underflow information indicating that underflow has occurred in the buffer means. Therefore, even when underflow has occurred in a buffer at the transmitting end, the receiving end detects the occurrence of underflow and performs speedy error-handling, whereby disorder of video and audio signals due to the occurrence of underflow in the buffer at the transmitting end can be suppressed effectively.

According to a thirteenth aspect of the present invention, a data receiving device connected to a prescribed network, comprises data receiving means for receiving data output from the data transmitting device of the ninth aspect; data analyzing means for analyzing the data received by the data receiving means, and outputting information indicating that underflow has occurred at the transmitting end when underflow information is included in the data; and data decoding means for performing decoding based on the data received by the data receiving means, and converting the operating mode of the decoding from normal mode to error handling mode on receipt of the information indicating the occurrence of underflow. Therefore, the receiving end detects that underflow has occurred in a buffer at the transmitting end, and performs speedy error-handling, whereby disorder of video and audio signals due to the occurrence of underflow in the buffer at the transmitting end can be suppressed effectively.

According to a fourteenth aspect of the present invention, a data receiving device connected to a prescribed network, comprises data receiving means for receiving packet data output from the data transmitting device of the tenth aspect; data analyzing means for analyzing the packet data received by the data receiving means, and outputting information indicating that underflow has occurred at the transmitting end when underflow information is included in the packet data; and data decoding means for performing decoding based on the packet data received by the data receiving means, and converting the operating mode of the decoding from normal mode to error handling mode on receipt of the information indicating the occurrence of underflow. Therefore, the receiving end detects that underflow has occurred in a buffer at the transmitting end, and performs speedy error-handling, whereby disorder of video and audio signals due to the occurrence of underflow in the buffer at the transmitting end can be suppressed effectively.

According to a fifteenth aspect of the present invention, a data receiving device connected to a prescribed network, comprises data receiving means for receiving isochronous packet data output from the data transmitting device of the eleventh aspect; data analyzing means for analyzing the isochronous packet data received by the data receiving means, and outputting information indicating that underflow has occurred at the transmitting end when the underflow information is included in the header of the isochronous packet data; and data decoding means for performing decoding based on the isochronous packet data received by the data receiving means, and converting the operating mode of the decoding from normal mode to error handling mode on receipt of the information indicating the occurrence of underflow. Therefore, the receiving end detects the underflow has occurred in a buffer at the transmitting end, and performs speedy error-handling, whereby disorder of video and audio signals due to the occurrence of underflow in the buffer at the transmitting end can be suppressed effectively.

According to sixteenth aspect of the present invention, a data receiving device connected to a prescribe network, comprises data receiving means for receiving data output from the data transmitting device of the twelfth aspect; data analyzing means for analyzing the data received by the data receiving means, and outputting information indicating that underflow has occurred at the transmitting end when the data of a prescribed pattern is included in the received data; and data decoding means for performing decoding based on the data received by the data receiving means, and converting the operating mode of the decoding from normal mode to error handling mode on receipt of the information indicating the occurrence of underflow. Therefore, the receiving end detects that underflow has occurred in a buffer at the transmitting end, and performs speedy error-handling, whereby disorder of video and audio signals due to the occurrence of underflow in the buffer at the transmitting end can be suppressed effectively.

According to a seventeenth aspect of the present invention, a data transmitting device connected to a prescribed network, comprises data reading means for reading data recorded in a recording medium, which data is given an error-correcting code; error detecting means for detecting whether an error exists in data processing or not, by decoding the error-correcting code included in the data read by the data reading means; and data tram sitting means for outputting the data read from the data reading means toward the network; wherein, when an error in data processing is detected by the error detecting means, the data transmitting means outputs error information indicating the occurrence of error in data processing, toward the network. Therefore, even when an ECC error has occurred during ECC decoding of data read from the recording media, the receiving end detects the occurrence of the ECC error, and converts the operating mode from the normal mode to the error handling mode. As a result, speedy error-handling is realized at the receiving end, whereby disorder of video and audio signals due to the ECC error can be suppressed effectively.

According to an eighteenth aspect of the present invention, a data transmitting device connected to a prescribed network, comprises data reading means for reading data recorded in a recording medium, which data is given an error-correcting code; error detecting means for detecting whether an error exists in data processing or not, by decoding the error-correcting code included in the data read by the data reading means; packet generating means for adding header information to the data read by the data reading means, and generating packet data corresponding to a packet which is a unit of data transmission; and data transmitting means for transmitting the packet data output from the packet generating means, toward the network; wherein, when an error in data processing is detected by the error detecting means, the packet generating means adds error information to a header section of the packet, which information indicates that an error has occurred in data processing, and outputs the packet toward the data transmitting means. Therefore, the receiving end detects that an error in data processing, such as an ECC error, has occurred at the transmitting end, and performs speedy error-handling, whereby disorder of video and audio signals due to the ECC error can be suppressed effectively.

According to a nineteenth aspect of the present invention, in the data transmitting device of the eighteenth aspect, the data transmitting means repeats, at fixed time intervals, packet-by-packet data transmission for outputting at least one packet data to the network at a fixed transmission rate; and the packet generating means adds the error information to a header of an isochronous packet used in isochronous transfer in which the data transmission is performed synchronously with a transfer request generated by the data transmitting means.

According to a twentieth aspect of the present invention, a data transmitting device connected to a prescribed network, comprises data reading means for reading data recorded in a recording medium, which data is given an error-correcting code; error detecting means for detecting whether an error exists in data processing or not, by decoding the error-correcting code included in the data read by the data reading means; and data transmitting means for transmitting the data read by the data reading means toward the network; wherein, when an error in data processing is detected by the error detecting means, the data transmitting means outputs data of a prescribed pattern to the network, as information indicating that an error has occurred in data processing. Therefore, the receiving end detects that an error in data processing, such as an ECC error, has occurred at the transmitting end, and performs speedy error-handling, whereby disorder of video and audio signals due to the ECC error can be suppressed effectively.

According to a twenty-first aspect of the present invention, a data transmitting device connected to a prescribed network, comprises data reading means for reading data recorded in a recording medium, which data is given an error-correcting code; error detecting means for detecting whether an error exists in data processing or not, by decoding the error-correcting code included in the data read by the data reading means; packet generating means for adding header information to the data read by the data reading means, and generating packet data corresponding to a packet which is a unit of data transmission; and data transmitting means for transmitting the packet data output from the packet generating means toward the network; wherein, when an error in data processing is detected by the error detecting means, the packet generating means adds incorrect cyclic redundancy check data to the packet data, as information indicating that an error has occurred in data processing, and outputs the packet data. Therefore, the receiving end detects that an error in data processing, such as an ECC error, has occurred at the transmitting end, and performs speedy error-handling, whereby disorder of video and audio signals due to the ECC error can be suppressed effectively.

According to a twenty-second aspect of the present invention, a data receiving device connected to a prescribed network, comprises data receiving means for receiving data output from the data transmitting device of the seventeenth aspect; data analyzing means for analyzing the data receiving by the data receiving means, and outputting information indicating that an error has occurred in data processing at the transmitting end when the error information is included in the received data; and data decoding means for performing decoding based on the data received by the data receiving means, and converting the operating mode of the decoding from normal mode to error handling mode on receipt of the information indicating the occurrence of error in data processing. Therefore, the receiving end detects that an error in data processing, such as an ECC error, has occurred at the transmitting end, and performs speedy error-handling, whereby disorder of video and audio signals due to the ECC error can be suppressed effectively.

According to a twenty-third aspect of the present invention, a data receiving device connected to a prescribed network, comprises data receiving means for receiving packet data output from the data transmitting device of the eighteenth aspect; data analyzing means for analyzing the packet data received by the data receiving means, and outputting information indicating that an error has occurred in data processing at the transmitting end when the error information is included in the packet data; and data decoding means for performing decoding based on the packet data received by the data receiving means, and converting the operating mode of the decoding from normal mode to error handling mode on receipt of the information indicating the occurrence of error in data processing. Therefore, the receiving end detects that an error in data processing, such as an ECC error, has occurred at the transmitting end, and performs speedy error-handling, whereby disorder of video and audio signals due to the ECC error can be suppressed effectively.

According to a twenty-fourth aspect of the present invention, a data receiving device connected to a prescribed network, comprises data receiving means for receiving isochronous packet data output from the data transmitting device of the nineteenth aspect; data analyzing means for analyzing the isochronous packet data received by the data receiving means, and outputting information indicating that an error has occurred in data processing at the transmitting end when the error information is included in the header of the isochronous packet data; and data decoding means for performing decoding based on the isochronous packet data received by the data receiving means, and converting the operating mode of the decoding from normal mode to error handling mode on receipt of the information indicating the occurrence of error in data processing. Therefore, the receiving end detects that an error in data processing, such as an ECC error, has occurred at the transmitting end, and performs speedy error-handling, whereby disorder of video and audio signals due to the ECC error can be suppressed effectively.

According to a twenty-fifth aspect of the present invention, a data receiving device connected to a prescribed network, comprises data receiving means for receiving data output from the data transmitting device of the twentieth aspect; data analyzing means for analyzing the data received by the data receiving means, and outputting information indicating that an error has occurred in data processing at the transmitting end when the data of a prescribed pattern is included in the received data; and data decoding means for performing decoding based on the data received by the data receiving means, and converting the operating mode of the decoding from normal mode to error handling mode on receipt of the information indicating the occurrence of error in data processing. Therefore, the receiving end detects that an error in data processing, such as an ECC error, has occurred at the transmitting end, and performs speedy error-handling, whereby disorder of video and audio signals due to the ECC error can be suppressed effectively.

According to a twenty-sixth aspect of the present invention, a data receiving device connected to a prescribed network, comprises data receiving means for receiving packet data output from the data transmitting device of the twenty-first aspect; data analyzing means for analyzing the packet data received by the data receiving means, and outputting information indicating that the cyclic redundancy check data is incorrect, when the cyclic redundancy check data included in the header section of the packet data is incorrect; and data decoding means for performing decoding based on he packet data received by the data receiving means, and converting the operating mode of the decoding from normal mode to error handling mode on receipt of the information indicating that the cyclic redundancy check data is incorrect. Therefore, the receiving end detects that an error in data processing, such as an ECC error, has occurred at the transmitting end, and performs speedy error-handling, whereby disorder of video and audio signals due to the ECC error can be suppressed effectively.

According to a twenty-seventh aspect of the present invention, the data transmitting device as defined in any of the ninth and twelfth aspects, comprises dividing means for dividing data output from the buffer means in data units of a data prescribed size, to generate divided pack data corresponding to divided packets as the data units; and packet generating means for adding header information to respective divided pack data to generate packet data corresponding to packets as data transmission units, the data transmitting means outputting the packet data toward the network as data output from the buffer means. If underflow may occur in the buffer at the transmitting end, this is detected, and error is processed speedily at the receiving end, whereby disorder of the video or audio signal due to occurrence of underflow can be effectively suppressed. Besides, the MPEG2 program stream data recorded in sector units in a recording medium such as DVD can be divided into packets smaller than the sector. As a result, the MPEG2 program stream or the like can be output toward the network by a transmitting method of the transport stream, that is, through the IEEE 1394I/F, without the necessity of converting it into the MPEG transport stream.

According to a twenty-eighth aspect of the present invention, a data receiving device connected to a prescribed network, comprises receiving means for receiving packet data output from the data transmitting device of the twenty seventh aspect; data analyzing means for analyzing the packet data received by the data receiving means, and outputting information indicating that underflow has occurred at a transmitting end when the packet data contains the underflow information; and data decoding means for performing decoding based on the packet data received by the data receiving means, and converting decoding operating mode from normal mode to error handling mode, upon receipt of the information indicating that underflow has occurred. Therefore, the underflow is detected at the receiving end, and error is processed speedily, whereby disorder of the video or audio signal due to occurrence of underflow can be effectively suppressed. Besides, based on packet data output from the data transmitting device, the MPEG2 program stream or the like generated by the data transmitting device can be restored.

According to a twenty-ninth aspect of the present invention, in the data transmitting device as defined in any of tenth or eleventh aspect further comprises: dividing means for dividing data output from the buffer means in data units of a prescribed data size, to generate divided pack data corresponding to divided packs as the data units, the packet generating means receiving the divided pack data as the data output from the buffer means and adding header information to respective divided pack data to generate the packet data. Besides, the MPEG2 program stream data recorded in sector units in a recording medium such as DVD can be divided into packets smaller than the sector. As a result, the MPEG2 program stream or the like can be output toward the network by a transmitting method of the transport stream, that is, through the IEEE 1394I/F, without the necessity of converting it into the MPEG transport stream.

According to a thirty aspect of the present invention, in a data receiving device connected to a prescribed network, comprises receiving means for receiving packet data output from the data transmitting device of the twenty ninth aspect, data analyzing means for analyzing the packet data received by the data receiving means, and outputting information indicating that underflow has occurred at a transmitting end when the packet data contains the underflow information; and data decoding means for performing decoding based on the packet data received by the data receiving means, and converting decoding operation mode from normal mode to error handling mode, upon receive of the information indicating that underflow has occurred. Therefore, the underflow is detected at the receiving end, and error is processed speedily, whereby disorder of the video or audio signal due to occurrence of underflow can be effectively suppressed. Besides, based on the received packet data, the MPEG2 program stream data generated at the transmitting end or the like can be restored.

According to a thirty-first aspect of the present invention, in the data transmitting device as defined in any of seventeenth and twentieth aspects, further comprises dividing means for dividing data read from the data reading means in data units of a prescribed data size, to generate divided pack data corresponding to divided packs as the data units; and packet generating means for adding header information to respective divided pack data to generate packet data corresponding to packets as data transmission units, the data transmitting means outputting the packet data toward the network as the data read by the data reading means. Therefore, if an ECC error may occur when performing ECC decoding to data read from the recording medium, this is detected, and the operating mode switched from normal mode to error handling mode, whereby error is processed speedily, and disorder of the video or audio signal due to occurrence of underflow can be effectively suppressed. Besides, the MPEG2 program stream data recorded in sector units in a recording medium such as DVD can be divided into packets smaller than the sector. As a result, the MPEG2 program stream or the like can be output toward the network by a transmitting method of the transport stream, that is, through the IEEE 1394I/F, without the necessity of converting it into the MPEG transport stream.

According to a thirty-second aspect of the present invention, a data receiving device connected to a prescribed network, comprises receiving means for receiving packet data output from the data transmitting device of the thirty first; data analyzing means for analyzing packet data received by the data receiving means and outputting information indicating that an error has occurred in data processing at a transmitting end when the packet data contains the error information; and data decoding means for performing decoding based on the packet data received by the data receiving means, and converting decoding operation mode from normal mode to error handling mode, upon receipt of the information indicating that the error has occurred in the data processing. Therefore, ECC error at the transmitting end is detected, and disorder of video or audio signal due to the error can be effectively suppressed at the receiving end. Besides, based on the received packet data, the MPEG2 program stream data generated at the transmitting end or the like can be restored.

According to a thirty-third aspect of the present invention, in the data transmitting device as defined in any of the eighteenth, nineteenth, and twenty first aspects further comprises dividing means for dividing data read by the data reading means in data units of a prescribed data size, to generate divided pack data corresponding to divided packs as the data units, the packet generating means receiving the divided pack data as the data read by the data reading means and adding header information to respective divided pack data to generate the packet data. If an ECC error may occur when performing ECC decoding to data read from the recording medium, this is detected, and the operating mode switches from normal mode to error handling mode, whereby error is processed speedily, and disorder of the video or audio signal due to occurrence of underflow can be effectively suppressed. Besides, the MPEG2 program stream data recorded in sector units in a recording medium such as DVD can be divided into packets smaller than the sector. As a result, the MPEG2 program stream or the like can be output toward the network by a transmitting method of the transport stream, that is, through the IEEE 1394I/F, without the necessity of converting it into the MPEG transport stream.

According to a thirty-fourth aspect of the present invention, a data receiving device connected to a prescribed network, comprises receiving means for receiving packet data output from the data transmitting device of the thirty third aspect; data analyzing means for analyzing the packet data received by the data receiving means, and outputting information indicating that an error has occurred in data processing at a transmitting end when the packet data contains the error information; and data decoding means for performing decoding based on the packet data received by the data receiving means, and converting decoding operation mode from normal mode to error handling mode, upon receipt of the information indicating that the error has occurred in the data processing. Therefore, ECC error at the transmitting end is detected, and disorder of video or audio signal due to the error can be effectively suppressed at the receiving end. Besides, based on the received packet data, the MPEG2 program stream data generated at the transmitting end or the like can be restored.

BRIEF DESCRIPTION OF THE DRAWINGS

FIGS. 26(a) and 26(b) are diagrams showing structures of data output from the data transmitting device of the eleventh embodiment.

FIGS. 29(a) and 29(b) are diagrams showing a structure of a packet (ECC flag 1) generated by the data transmitting device of the eleventh embodiment.

FIG. 30 is a diagram for explaining a data transmitting device and showing a packet output toward the network N from the data transmitting device of the twelfth embodiment.

FIGS. 32(a) and 32(b) are diagrams showing a structure of a packet which contains specific pattern data generated by the data transmitting device of the twelfth embodiment.

DETAILED DESCRIPTION OF THE PREFERRED EMBODIMENTS

Inventors of the present invention studied the problems carefully, and discovered that the reason why the MEPEG2-PS data cannot be transmitted by the use of the 1394I/F unless it is converted into the MPEG2-TS data is that a pack or a packet of the MEPEG2-PS data is by far larger than that of the MPEG2-TS data handled by the 1394I/F. This will be described below.

Figure 41:
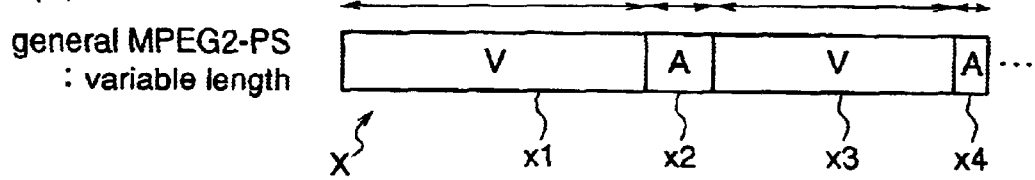
FIG. 41(a) is a diagram showing data X of an MPEG2-PS (program stream)
FIG. 41(b) is a diagram showing MEPEG2-PS data Y recorded in DVD.
FIG. 41(c) is a diagram showing data Z of an MPEG-TS (transport stream) for broadcasting.
Figure 41:
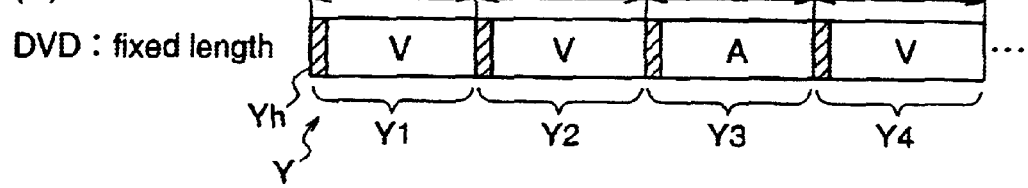
Figure 41:
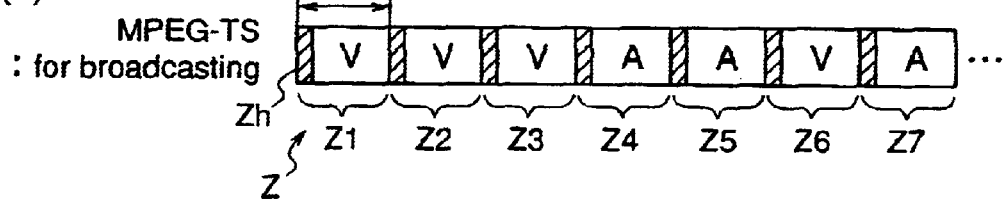

Referring now to FIG. 41(a), in general MPEG2-PS (program stream) data X, its packs X1–X4 . . . are variable in length. For example, the pack X1 of video data, the pack X2 of audio data, the pack X3 of video data, and the pack X4 of audio data, are pack length 4 kB, pack length 1 kB, and pack length 3 kB, and pack length 0.5 kB, respectively.

Referring to FIG. 41(b), in MEPEG2-PS data Y recorded in the DVD, its packets Y1–Y4 are respectively fixed in length (2 kB), irrespective of video data packets (Y1, Y2, and Y4) or a audio data packet (Y3), and each packet contains a header Yh in its head.

Referring to FIG. 41(c), in MPEG-TS (transport stream) data Z for broadcasting, its packets Z1–Z7 are respectively fixed in length (188 B), irrespective of video data packets Z1–Z3, and Z6, or audio data packets Z4 and Z5, and Z7.

Here, transmission of these stream data through he 1394I/F will be discussed.

In a case where a base rate is 100 Mbps, it is possible to transmit 1.25 kB (100 Mbps/8 kHz) data in one cycle (125 µsec=⅛ [kHz]). Since 80% time of the one cycle is used for the isochronous transfer, about 1 kB (1.25 kB×0.8) data can be transmitted by the isochronous transfer in one cycle.

The MPEG2-TS data packets are respectively 188 B in size, and are therefore satisfactorily transmitted in one cycle, whereas most of the packs of the MPEG2-PS (program stream) data X and packets of the MEPEG2-PS data (2 kB) recorded in the DVD cannot be transmitted in one cycle.

In case of 200 Mbps, it is possible to transmit 2.5 kB (200 Mbps/8 kHz) data in one cycle. In this case, data transmitted by the isochronous transfer in one cycle is about 2 kB (2.5 kB×0.8), so that it is impossible to transmit the MPEG2-PS (program stream) data X and the MEPEG2-PS data Y recorded in the DVD because overhead or the like must be taken into account.

In case of 400 Mbps, it is possible to transmit 5 kB (400 Mbps/8 kHz) data in one cycle, and therefore data transmitted by the isochronous transfer in one cycle is about 4 kB (5 kB×0.8), so that it is possible to transmit the MEPEG2-PS data Y recorded in the DVD.

In this case, however, a band required for transmitting the MEPEG2-PS data is 128 Mbps (one packet size (2 kB)× frequency (8 kHz)), and is thus large, compared to the maximum access rate 10.08 Mbps of the DVD data.

So, inventors have conceived a data transmitting device in which the MEPEG2-PS data is divided into packs which are sufficiently smaller than data of about 1 kB which can be transmitted by the isochronous transfer in one cycle, headers are added to data of respective packs, and the resulting packet data is transmitted, a data receiving device for restoring the MEPEG2-PS data from the packet data transmitted from the data transmitting device, and a data recording device for restoring the MEPEG2-PS data from the packet data transmitted from the data transmitting device, and recording it in a prescribed recording format.

In addition, as solutions to the problem that the request for data transfer from the recording medium to the buffer must be performed through the digital interface at the transmitting end, and the problem that data must be read from the recording medium at a high rate when plural receiving devices receive data, inventors have proposed a method of transmitting clock information of an AV data decoder at the transmitting end together with AV data through a digital interface, generating a clock of an AV data decoder from this clock information and decoding AV data at a receiving end (Japanese Patent Publication No. Hei 10-149617). However, if data is reread because error or the like has occurred, the buffer underflows, which makes it impossible to perform correct AV decoding at the receiving end.

As a solution to this, inventors have conceived a data transmitting device for transmitting underflow information indicating whether or not the buffer underflows at the transmitting end to the receiving end, and a data receiving device for setting a operating mode to be error handling mode upon detecting occurrence of underflow in the buffer on the transmitting end according to the underflow information.

Now, preferred embodiments of the present invention will be described with reference to figures.

[Embodiment 1]

Figure 1:
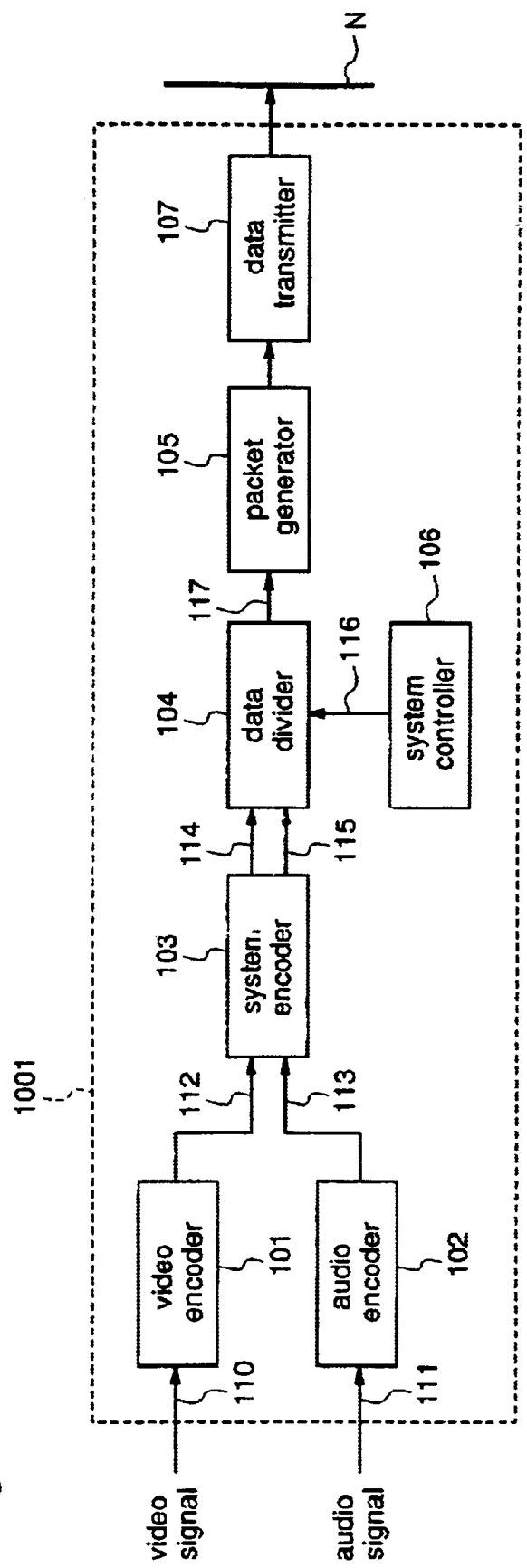
FIG. 1 is a block diagram showing a data transmitting device according to a first embodiment of the present invention.
Figure 2:
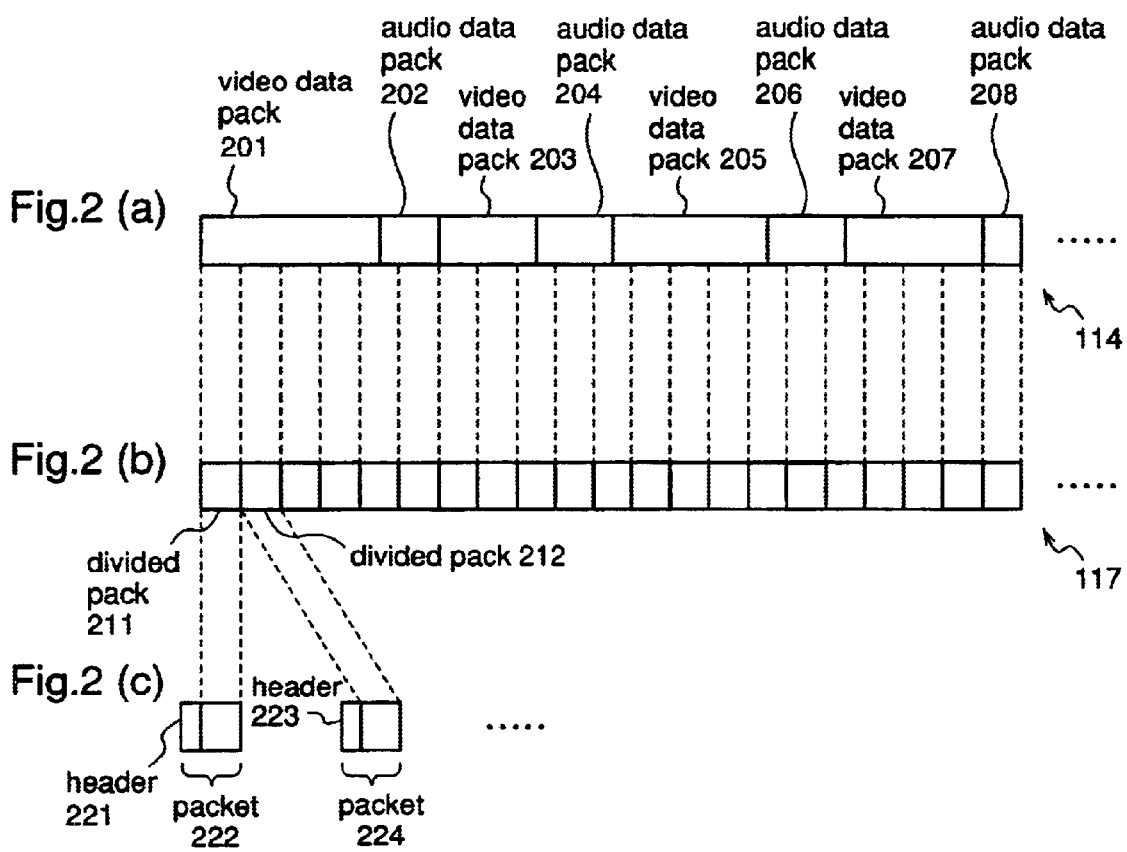
FIGS. 2(a)–2(c) are diagrams showing packet generation in the data transmitting device of the first embodiment.

FIG. 1 is a block diagram showing a data transmitting device according to a first embodiment of the present invention, and FIG. 2 is a diagram for explaining generation of packets in the data transmitting device. First, construction of the device will be described.

Referring now to FIG. 1, there is shown a data transmitting device 1001, which includes a video encoder 101 for coding a video signal 110 to generate a video elementary stream 112, an audio encoder 102 for coding an audio signal 111 to generate an audio elementary stream 114, and a system encoder (system coding means) 103 for dividing each of video elementary stream 112 and the audio elementary stream 113 into packs so that each pack has an appropriate size, interleaving video data and audio data in packs to generate an MPEG2 program stream 114, and outputting the program stream 114.

The data transmitting device 1001 further includes a data divider (dividing means) 104 for dividing the program stream 114 into packs (divided packs) so that each pack has a size in accordance with a control signal 116, a packet generator 105 for adding headers for transmission 221, 223, . . . , to the respective packs 211, 212, . . . , to generate packets 222, 224, . . . , a data transmitter 107 for outputting these data in packet units onto an network N by the isochronous transfer or the asynchronous transfer, and a system controller 106 for controlling the data divider 104 using the control signal 116. The data transmitter 107 has the same construction as the prior art 1394I/F.

Operation of the device 1001 will now be described.

When the video signal 110 and the audio signal 111 are input to the device 1001, the video signal 110 and the audio signal 111 are coded by the video encoder 101 and the audio encoder 102, respectively, and the resulting video elementary stream 113 and audio elementary stream 114 are respectively output from them and input to the system encoder 103.

The system encoder 103 divides each of the video elementary stream 113 and the audio elementary stream 114 into packs so that each pack has an appropriate size, interleaves these packs, and outputs the MPEG2 program stream 114.

The elementary streams 112 and 113 are divided by the system encoder 103 so that AV synchronization is correctly established using limited buffer amount, that is, audio data is correctly in synchronization with video data, when a decoder decodes the MPEG2 program stream 117.

FIG. 2(*a*) shows a structure of the MPEG2 program stream 114 generated by the system encoder 103. As shown in FIG. 2(*a*), in general, video data packs 201, 203, 205, 207, . . . , and audio data packs 202, 204, 206, 208, . . . , are variable in length.

When the stream 114 output from the system encoder 103 is input to the data divider 104, the divider 104 divides the stream 114 into packs so that each pack has a size specified by the control signal 116 output from the system controller 106. Here, assume that the stream 114 is divided into packs of the same size starting with its head. From the data divider 104, the divided packs 211, 212, . . . shown in FIG. 3(*b*) are output.

The packs 211, 212, . . . , are input to the packet generator 105 in this order, which adds headers for transmission 221, 223, . . . , to these packs 211, 212, . . . , to generate packets 222, 224, . . . , which are output to the data transmitter 107, which outputs these packets toward the network N by the isochronous transfer or by the asynchronous transfer.

Thus, in the data transmitting device 1001 of the first embodiment, the MPEG2 program stream data 114 is packetized and output. Therefore, it is possible to divide the MPEG2 program stream data 114 according to amount of data to-be-transmitted in one cycle by the data transmitter 107 of the same construction as the conventional 1394I/F, and output the resulting packetized data toward the network. As a result, it is possible to transmit the MPEG program stream data output from the MPEG2 system encoder by the use of the 1394I/F without the necessity of converting it into the MPEG2 transport stream.

In addition, in the receiving device which has received these packets, these packet data is coupled to restore the MPEG2 program stream generated by the data transmitting device 1001.

Figure 3:
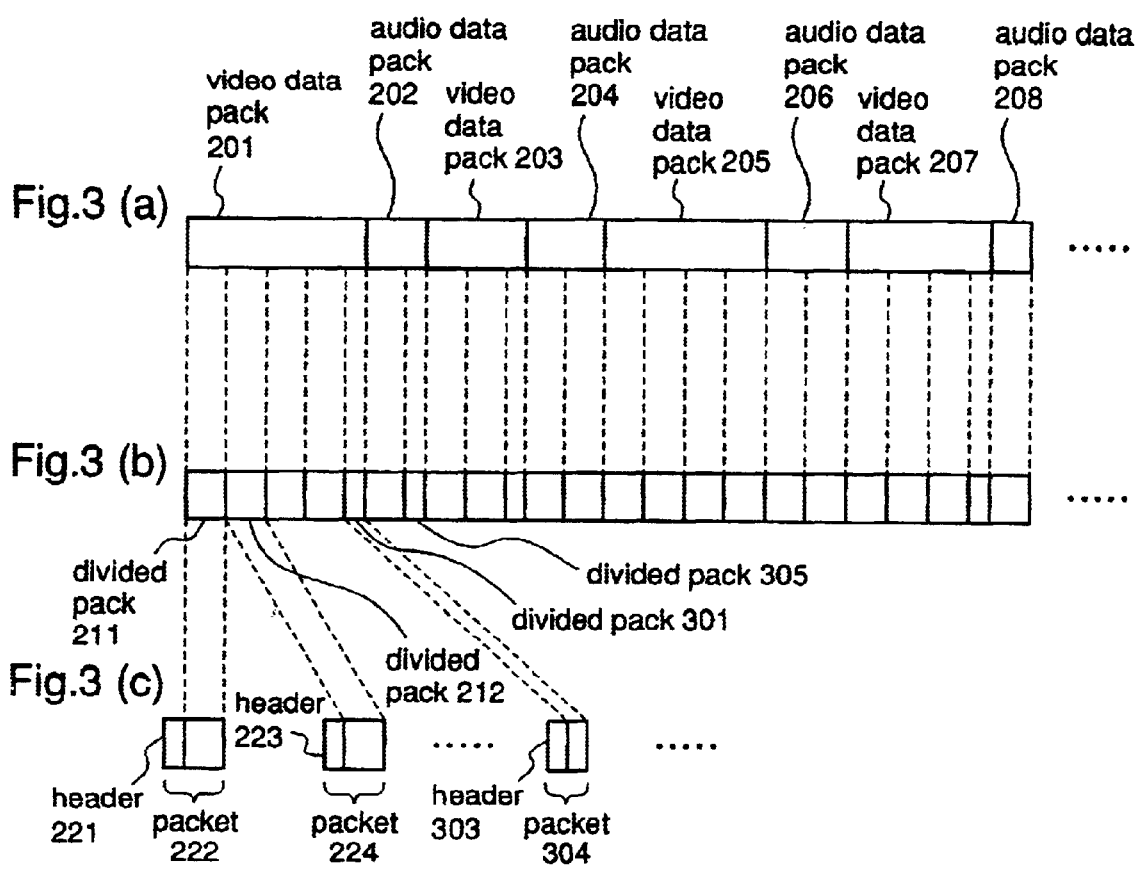
FIG. 3 is a diagram showing another packet generation in the data transmitting device of the first embodiment.

Besides, while in the first embodiment, the MPEG2 program stream is divided into packs of the same size starting with its head as shown in FIG. 2, dividing method shown in FIG. 3 may be employed.

In this case, as in the first embodiment, when dividing the MPEG2 program stream (see FIG. 3(*a*)) into packs, a head of a pack of the stream matches a head of the corresponding divided pack.

For such division, the data divider 104 is instructed by the system controller 106 on its method. The system encoder 103 outputs the stream 114 and a head position signal 115 indicating that head data of each pack of the stream 114 has been output, to the data divider 104. Thereby, the data divider 104 detects a head of the pack of the program stream output from the system encoder 103.

For instance, since a size of the video data pack 201 is not an integer multiple of that of the corresponding divided pack, the last divided pack 301 of the divided packs of the pack 201 is smaller than a normal divided pack. The packet generator 105 adds a header 303 to the divided pack 301 as in the case of a divided pack of a normal size, and outputs the resulting packet 304.

Likewise, since a size of the audio data pack 202 is not an integer multiple of that of the corresponding divided pack, the last divided pack 305 of the pack 202 is smaller than a normal divided pack. The packet generator 105 adds a header to the divided pack 305 as in the case of the divided pack 301, to be output toward the network N.

The data transmitting device so constructed, the MPEG2 program stream data can be packetized and output toward the network N through the 1394I/F, and in addition, video data and audio data do not coexist in a packet. Moreover, even if a packet lacks due to occurrence of a communication error, data of the following packet can be decoded.

In addition, in the receiving device which has received these packets, these packet data is coupled to restore the MPEG2 program stream.

Figure 4:
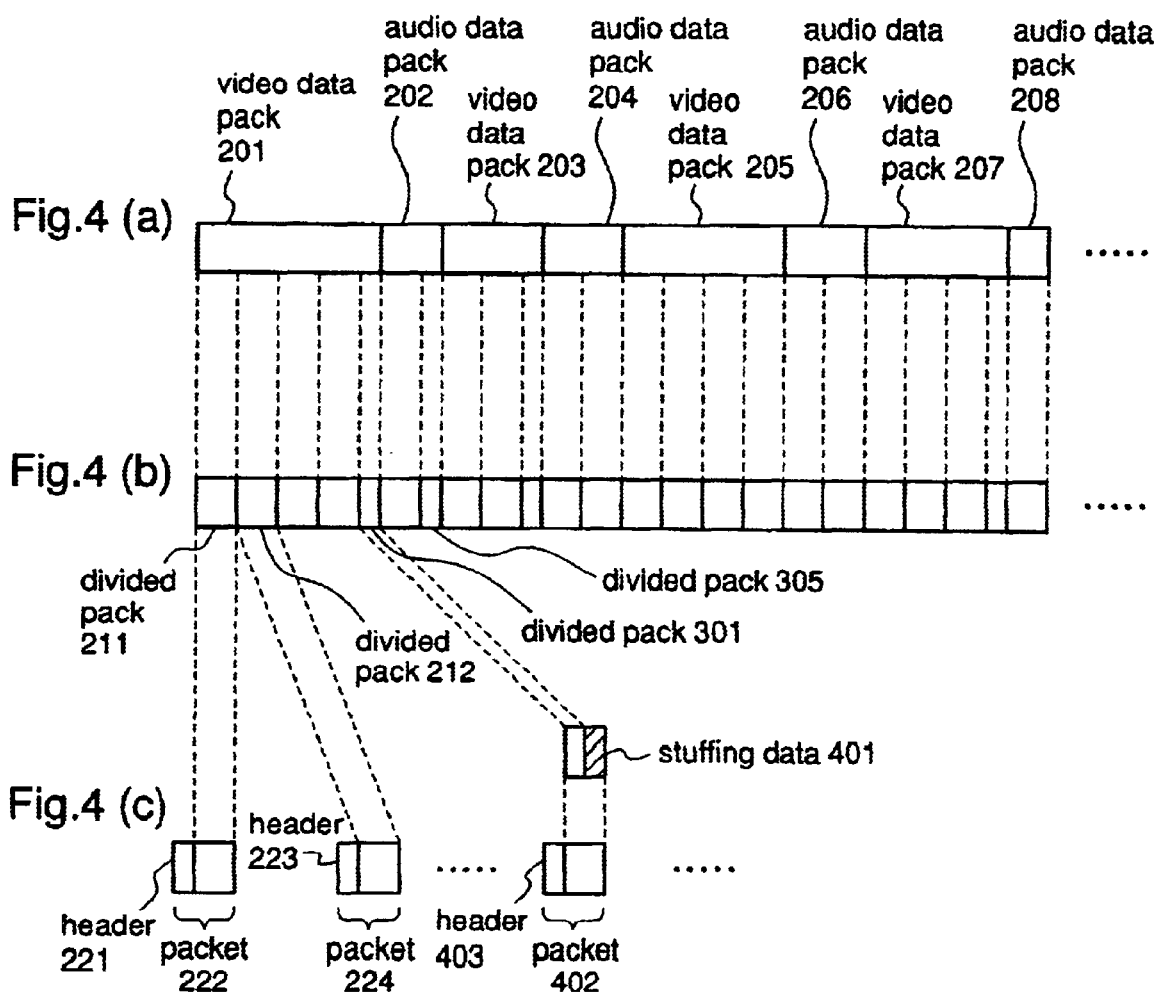
FIG. 4 is a diagram showing another packet generation in the data transmitting device of the first embodiment.

Further, as a pack dividing method of the data divider 104, a method shown in FIGS. 4(*a*) and 4(*b*) is possible, in addition to methods in FIGS. 2(*a*) and 2(*b*) and 3(*a*) and 3(*b*).

Also in this method, as in the first embodiment, when dividing the MPEG2 program stream (see FIG. 4(*a*)) into packs, it is possible that a head of a pack of the stream matches a head of the corresponding divided pack as shown in FIG. 4(*b*) and all the packets are of the same size.

For instance, since a size of the video data pack 201 is not an integer multiple of that of the corresponding divided pack, the last divided pack 301 of the divided packs of the pack 201 is smaller than a normal divided pack.

The packet generator 105 adds stuffing data 401 to the divided pack 301 to create a pack of the same size as a normal divided pack, adds a header 403 to the pack, and outputs the resulting packet 402. At this time, to the header 403, added is data or a flag indicating that the stuffing data 401 is added.

The data transmitting device so constructed, the MPEG2 program stream data can be packetized and output toward the network N through the 1394I/F, and in addition, video data and audio data do not coexist in a packet. Moreover, since all the packets are of the same size, packet data is easy to handle both in the transmitting device and the receiving device. Especially in the receiving device, a circuit for deciding a packet size is dispensed with, whereby a simple circuit structure is realized.

In the receiving device which has received these packets output from the data transmitting device, these packet data is coupled, and the stuffing data added to a smaller pack is removed, thereby restoring the MPEG2 program stream data.

While in the data transmitting device of the first embodiment, the MPEG2 program stream includes video data and audio data, data included in the MPEG program stream is not limited to these, the stream may include subtitle data.

In addition, while in the data transmitting device of the first embodiment, the MPEG2 program stream data is divided into packs of the same size, any dividing method may be employed so long as divided packs which are as small as packets of the MPEG2 transport stream to-be-handled by the 1394I/F are obtained.

Further, while in the first embodiment the 1394I/F is shown as a digital interface, the present invention is applicable to an interface which performs data communication in packet units which are by far smaller than packs of the MPEG2 program stream or the like, for example, about 1/10 sized packet units, as well as to the 1394I/F.

As thus far described, in the data transmitting device of the first embodiment, the MPEG2 program stream data output from the MPEG2 encoder is divided into packs which are almost as large as packets of the MPEG2 transport stream. Therefore, it is possible to transmit the MPEG2 program stream through the digital interface such as the conventional IEEE1394I/F which handles the MPEG2 transport stream data. At a receiving end, these received packet data is coupled, thereby restoring the MPEG2 program stream.

[Embodiment 2]

Figure 5:
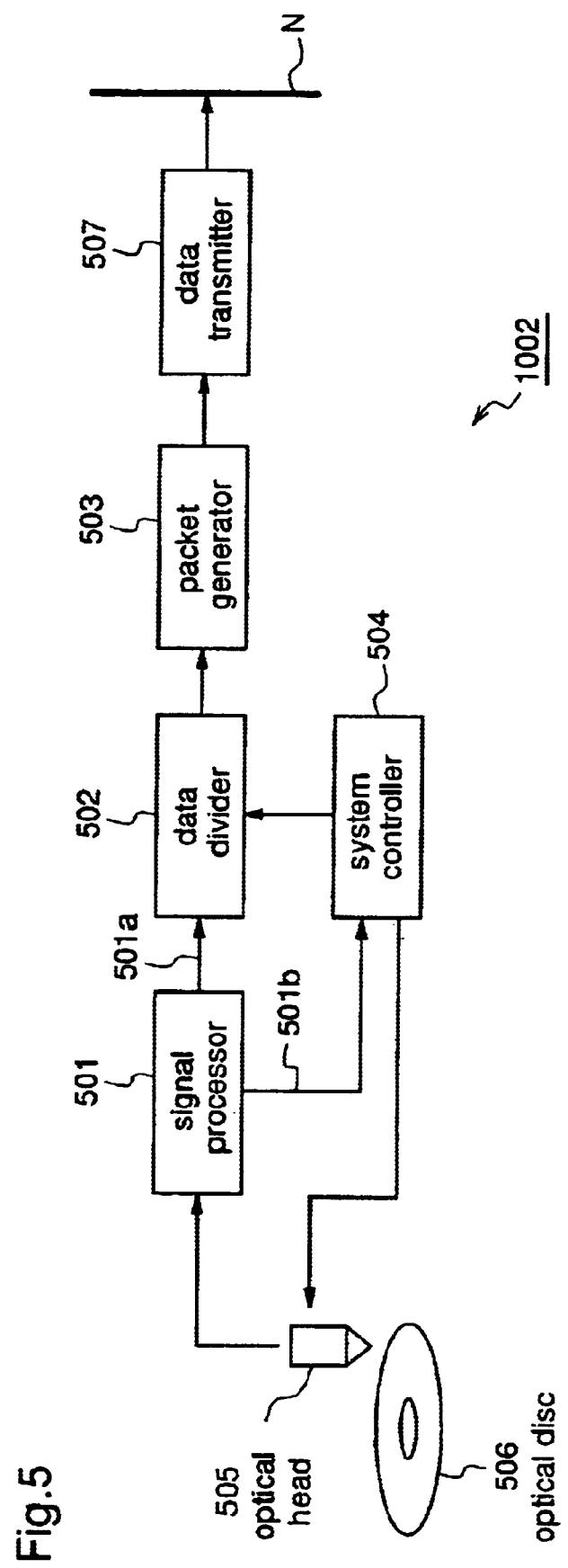
FIG. 5 is a block diagram showing a data transmitting device according to a second embodiment of the present invention.

FIG. 5 is a block diagram showing a data transmitting device according to a second embodiment of the present invention. First, construction of the device will be described.

Referring to FIG. 5, there is shown a data transmitting device 1002. The data transmitting device 1002 includes an optical head 505 for reading data from an optical disk 506 as a recording medium, a signal processor 501 for subjecting the read data to demodulation and ECC decoding, a data divider 502 for dividing an MPEG2 program stream data (MEPEG2-PS data) 501a output from the signal processor 501 into packs so that each pack has a prescribed size, a packet generator 502 for adding headers to the divided packs to generate packets, and a data transmitter 507 for outputting the packets toward the network N. The data transmitter 507 has construction identical to that of the conventional 1394I/F.

The data transmitting device 1002 further includes a system controller 504 for receiving disk management information 501b obtained by the signal processor 501, and controlling the data divider 502 and the optical head 505.

Figure 6:
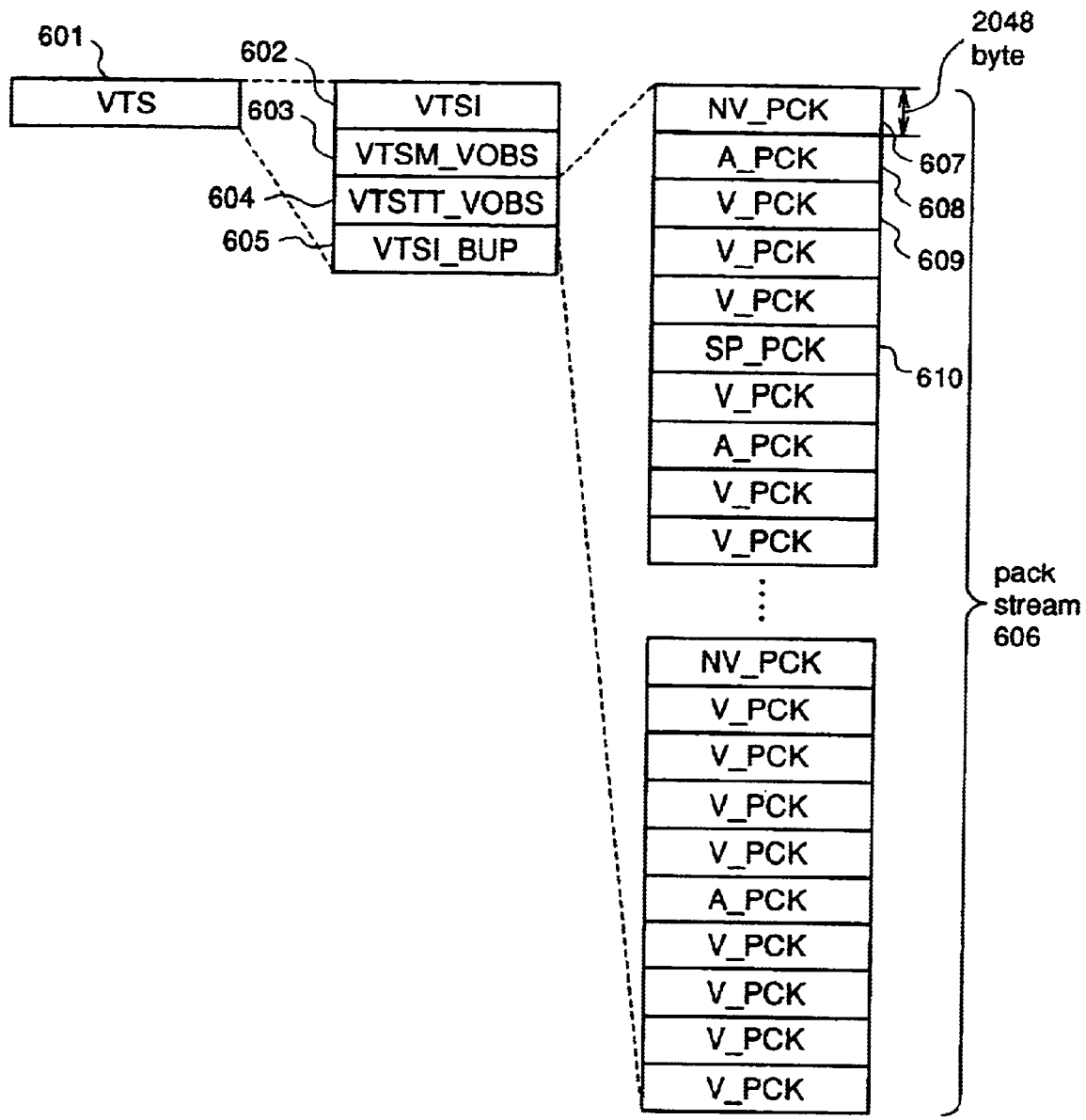
FIG. 6 is a diagram for explaining a data transmitting device of the second embodiment and showing a data structure of DVD-Video data.

Here, assume that data of a data structure in FIG. 6 is recorded in the optical disk 506. In actuality, data recorded in an optical disk has been subjected to ECC coding or modulation, and therefore output data of the signal processor 501 has a data structure shown in FIG. 6.

FIG. 6 schematically shows a part of a data structure according to a DVD-Video standard. According to the DVD-Video standard, a video title set (VTS) 601 is composed of VTSI 602, VTSM_VOBS 603, VTSTT_VOBS 604, and VTSI_BUP 605.

The VTSI 602 is management information for the VTS 601. The VTSI_BUP 605 is a duplicate of the VTSI 602, and is its backup data. The VTSM_VOBS 603 is menu data for the VTS 601. The VTSTT_VOBS 604 is data such as video data, audio data, subtitle data, and so forth of the VTS 601. The VTSTT_VOBS 604 has a structure of the MPEG2 program stream.

The VTSTT_VOBS 604 has a content of a hierarchical structure. Shown in FIG. 6 is a hierarchical structure in pack (PCK) units. The pack is a data unit of 2048 bytes (2 k bytes), including a header or the like. The pack is as large as a sector of the DVD disk. The packs are classified in terms of types of data contained therein. In the figure, there are shown a navigation pack (NV_PCK) 607 which describes data retrieval information or high light information, a video pack (V_PCK) 609 containing video data, an audio pack (A_PCK) 608 containing audio data, and a sub picture pack (SP_PCK) 610 containing subtitle data. These packs are multiplexed so that AV, and so forth which are correctly synchronized are obtained on condition that they are decoded in the order they are recorded in the disk.

Subsequently, operation of the data transmitting device 1002 in FIG. 5 will be described. Suppose that disk management information or the VTS 601 in FIG. 6 is recorded in the optical disk 506.

First, the disk management information is read from the optical disk 506. The disk management information is input to the signal processor 501, where it is subjected to demodulation and ECC decoding, and then input to the system controller 504, which obtains information of a position where VTS 601 to-be-reproduced is recorded, from the disk management information. The controller 504 controls the optical head 505 using the positional information, and thereby data of the VTS 601 is sequentially read from the optical disk 506 in sector units. The VTSI 602, i.e., data management information in the VTS 601, is processed as in the case of the disk management information, and input to the controller 501.

Next, processing of video data or audio data in the VTS 601 such as the VTSTT_VOBS 604 will be described.

The read data is input to the signal processor 501, where it is subjected to demodulation and ECC decoding, resulting in a pack stream 606 shown in FIG. 6, which is input to the data divider 502. Here, suppose that the NV_PCK 607, i.e., head pack of the pack stream 606 is input. The data divider 502 divides the NV_PCK 607 into packs so that each pack has a size specified by the controller 504.

Figure 7:
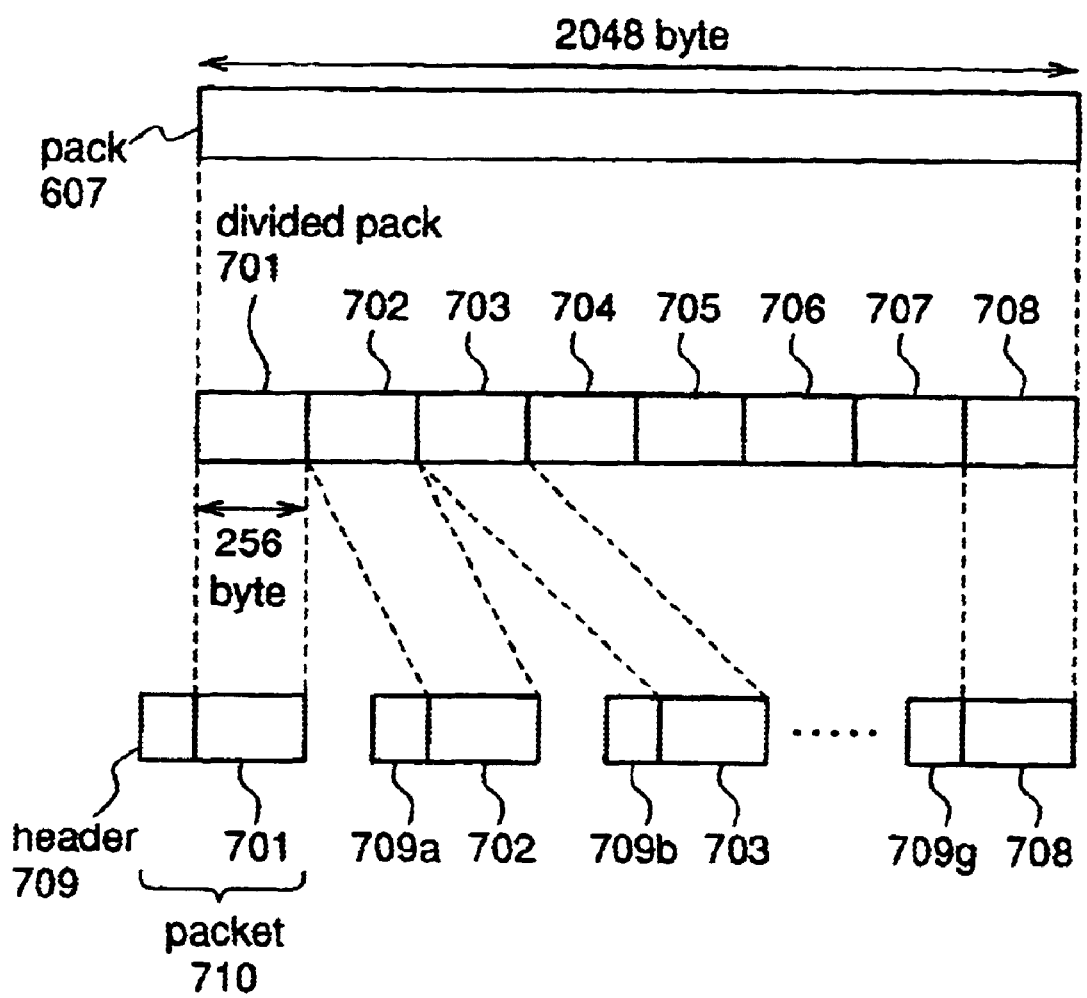
FIG. 7 is a diagram for explaining packet generation in the data transmitting device of the second embodiment.

FIG. 7 is a diagram for explaining an example of data dividing method of the data divider 502, and shows that a pack is divided into 8 packs.

More specifically, the data divider 502 divides the NV_PCK 607 into packs 701~708 of 256 bytes, which are sequentially input to the packet generator 503. To a divided pack 701, a header 709 for transmission is added, and the resulting packet 710 is output toward the network N. In a like manner, to the other divided packs 702~708, headers 709a, 709b, . . . , 709q are added, to be output toward the network N.

When the NV_PCK 607 has been thus transmitted, subsequently, an A_PCK 608 is transmitted. On this occasion, operation of the data transmitting device in FIG. 5 is identical to that of transmitting the NV_PCK 607. Thereafter, A V_PCK 609 and the following data are also transmitted in the same manner.

Figure 8:
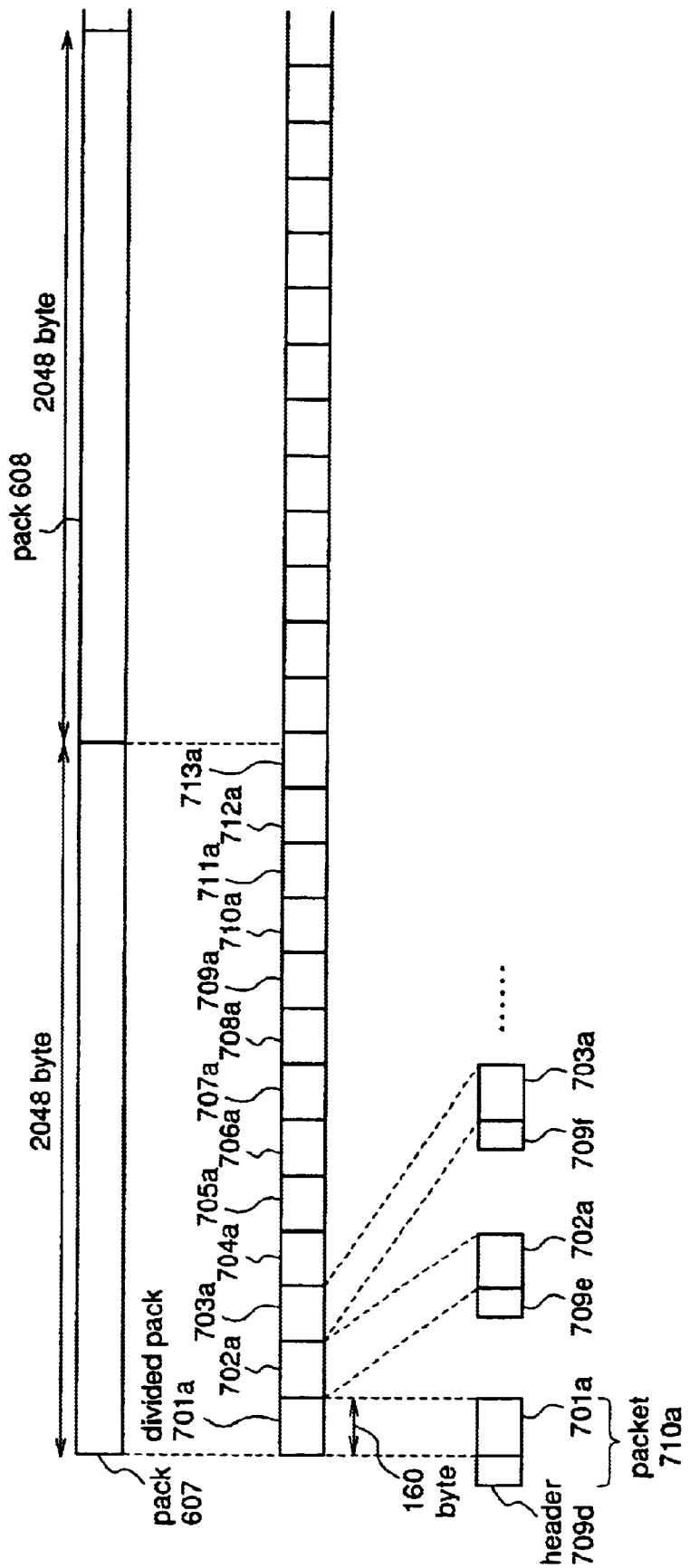
FIG. 8 is a diagram for explaining another packet generation in the data transmitting device of the second embodiment.
Figure 9:
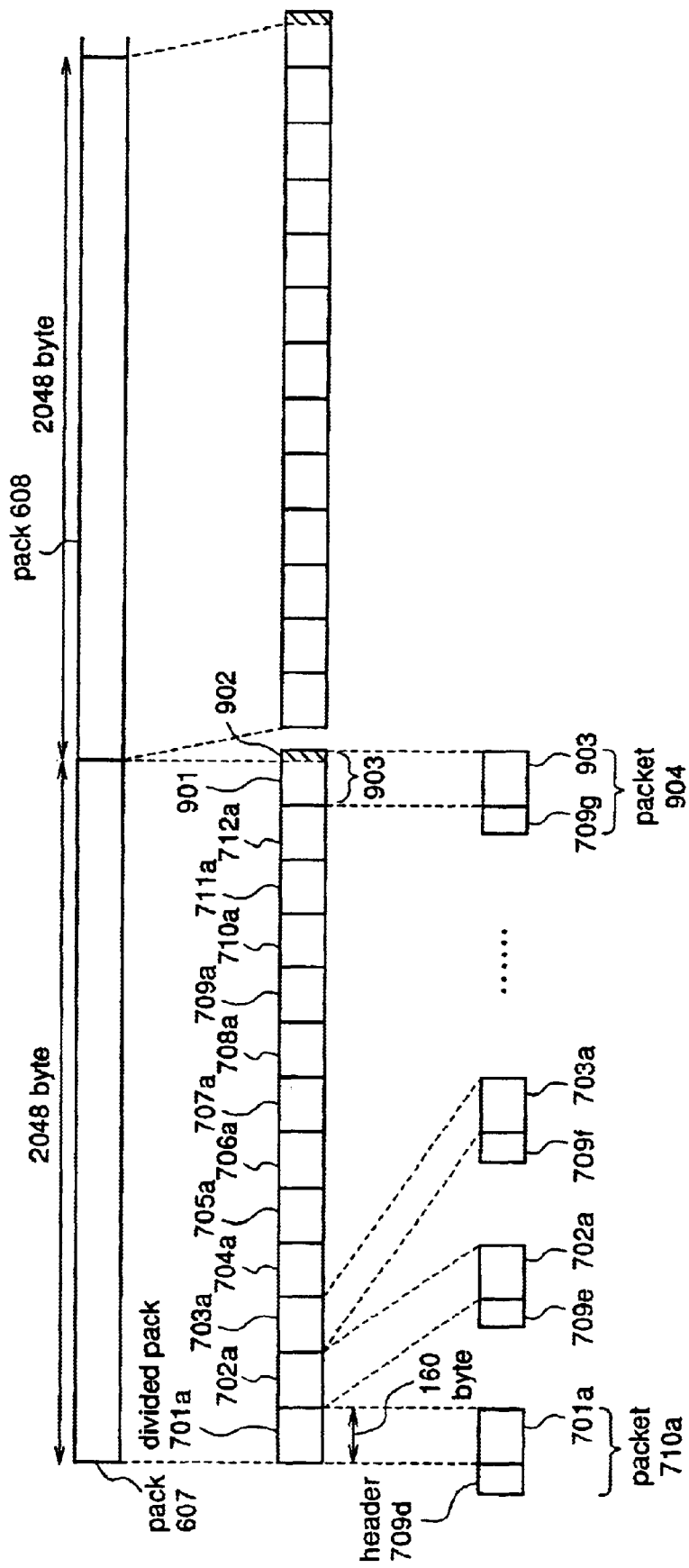
FIG. 9 is a diagram for explaining another packet generation in the data transmitting device of the second embodiment.

While in the second embodiment, the pack of 2048 bytes is divided into packs of 256 bytes by the data divider 502, the dividing method is not restricted thereto, and a dividing method in FIGS. 8 or 9 may be employed.

FIG. 8 shows an example in which a pack of 2048 bytes is divided in 160 byte units. Starting with its head, the pack 607 is divided in 160 byte units, resulting in divided packs 701a–712a, and a divided pack 713a corresponding to the remaining data of the pack 607 and a head portion of the pack 608. To these divided packs 701a–713a, headers are added by the packet generator 503, and the resulting packets are output toward the network N. For example, to the pack 701a, a header 709d is added, resulting in a packet 710a, which is output toward the network N.

FIG. 9 shows another example where a pack of 2048 bytes is divided in 160 byte units. The dividing method shown in FIG. 9 differs from that shown in FIG. 8 in that a head of the pack of 2048 bytes always matches a head of the corresponding divided pack of 160 bytes.

Starting with its head, the pack 607 is divided in 160 byte units, resulting in divided packs 701a–712a, and data of 128 bytes as the remaining data 901 of the pack 607. In order to make the remaining data 901 into data of 160 bytes, to the data 901, stuffing data 902 of 32 bytes is added, to create a divided pack 903.

To so created divided packs 701a–712a, and 903, headers are added by the packet generator 503 as in the case of the dividing method shown in FIG. 7, and the resulting packets are output toward the network N.

For example, to the divided pack 701a, a header 709d is added, to create a packet 710a, which is output toward the network N. Also, to the divided pack 903, a header 709g is added, to create a packet 904, which is output toward the network N.

Thus, in the data transmitting device according to the second embodiment, the MPEG2 program stream format data recorded in the recording medium such as the DVD in sector units is divided into packs which are almost as large as packets of the MPEG2 transport stream. Therefore, it is possible to transmit the data recorded in the recording medium such as the DVD through the digital interface such as the conventional IEEE1394I/F which handles the MPEG2 transport stream data.

In this case, packs of a program stream are divided and transmitted so that their heads always match heads of the corresponding divided packs as shown in FIGS. 8 and 9. Thereby, at a receiving end, from the divided packs, the program stream can be decoded.

In addition, as shown in FIGS. 8 and 9, the program stream is divided in arbitrary byte units, thereby realizing effective use of a band of a digital interface. In a case where a size of the divided pack is 160 bytes, since an access rate of data recorded in the DVD is 10.08 Mbps at maximum, a band required for the isochronous transfer by the use of the 1394I/F is 10.24 Mbps (=160 bytes×8 kHz). As a result, the 1394I/F band is effectively utilized for access to the data recorded in the DVD.

[Embodiment 3]

Figure 10:
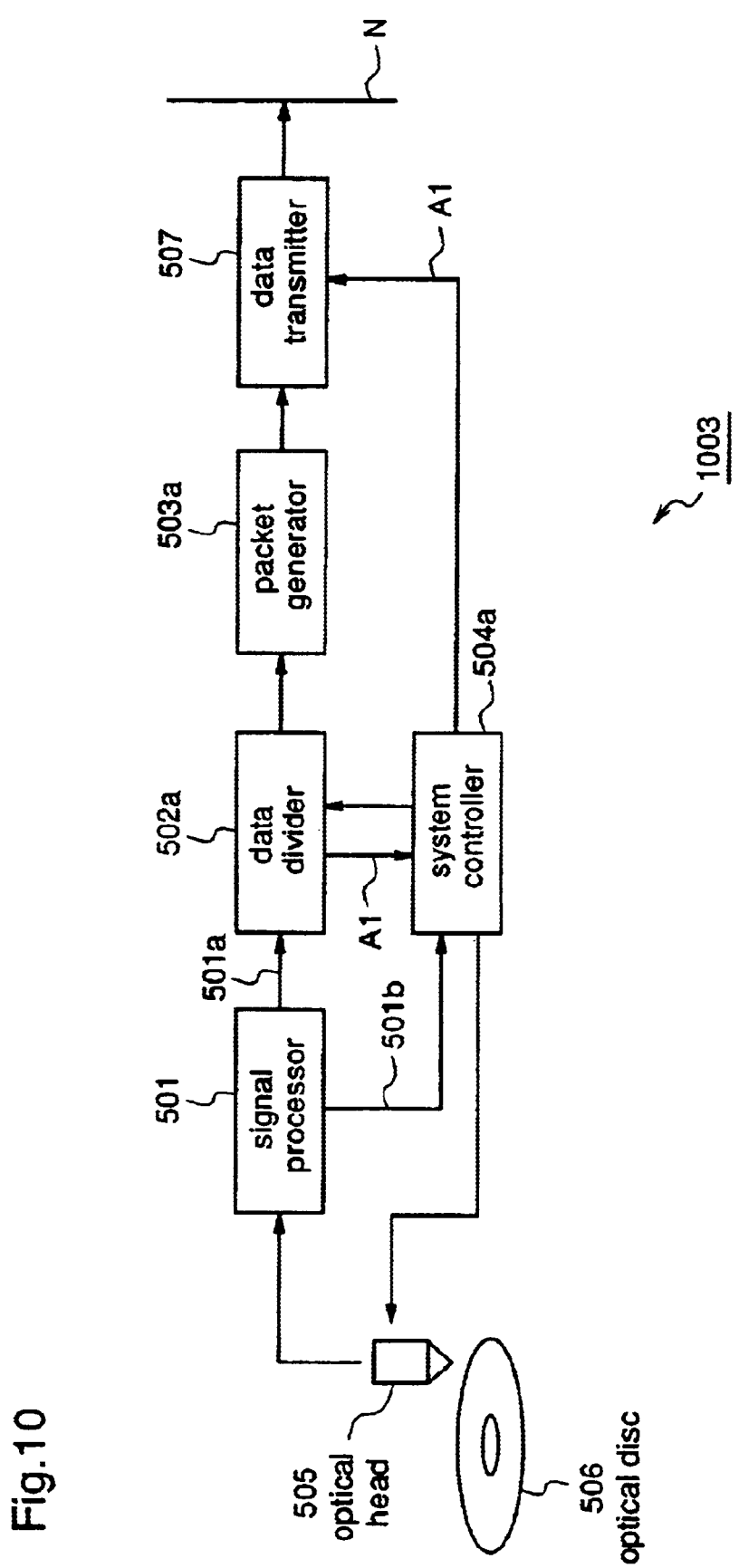
FIG. 10 is a block diagram for explaining a data transmitting device according to a third embodiment of the present invention.

FIG. 10 is a block diagram showing a data transmitting device according to a third embodiment of the present invention. First, construction of the device will be described.

Referring to FIG. 10, there is shown a data transmitting device 1003. The data transmitting device 1003 includes an optical head 505 for reading data from an optical disk 506 as a recording medium, a signal processor 501 for subjecting the read data to demodulation and ECC decoding, a data divider 502a for dividing MPEG2 program stream data (MEPEG2-PS data) 501a output from the signal processor 501 into packs so that each pack has a prescribed size, a packet generator 503a for adding headers to the divided packs to generate packets, and a data transmitter 507 for outputting the packets toward the network N. The data transmitter 507 has construction identical to that of the conventional 1394I/F.

The data transmitting device 1003 further includes a system controller 504a for receiving disk management information 501b obtained by the signal processor 101, and controlling the data divider 502a and the optical head 505.

In the third embodiment, the data divider 502a is used for outputting information A1 indicating that a divided pack contains head data of the corresponding pack on outputting the head data of the pack. The system controller 504a is used for outputting the information A1 to the packet generator 503a when the divided pack containing the head data is output to the packet generator 503a. The packet generator 503a is used for adding information indicating that the divided pack contains the head data to a header to-be-added to the divided pack, upon receiving the information A1.

The other components of the data transmitting device of the third embodiment is identical to that of the second embodiment.

Next, operation of the device 1003 will be described.

Suppose that data is read from the optical disk 506 in which data of a data structure in FIG. 6 is recorded.

First, procedure for processing disk management information of the optical disk 506 and data management information such as the VTS 1602 is identical to that described in the second embodiment.

Next, processing video or audio data in the VTS 601, such as the VTSTT_VOBS 604, will be described.

The data which has been read is input to the signal processor 501, where the data is subjected to demodulation and ECC decoding, to create the pack stream 606 in FIG. 6, which is input to the data divider 502a.

Figure 11:
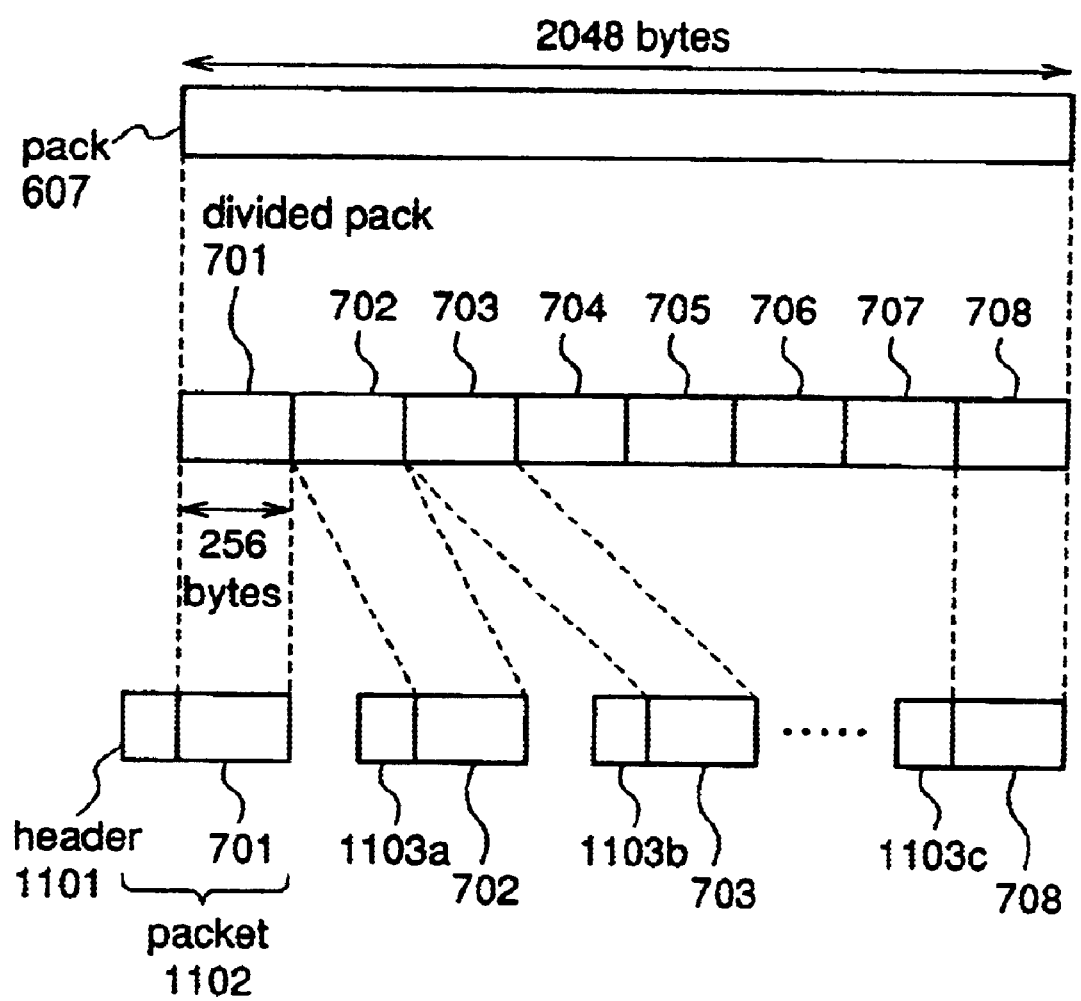
FIG. 11 is a diagram for explaining another packet generation in the data transmitting device of the third embodiment.

Here, suppose that the NV_PCK 607, i.e., a head pack of the pack stream 606 in FIG. 6 is input. Upon input of the NV_PCK 607, the data divider 502a divides the NV_PCK 607 into packs so that each pack has a size set by the system controller 504a. FIG. 11 schematically shows a method of dividing the pack 607 into 8 packs. The NV_PCK 607 is divided into divided packs 701–708 of 256 bytes.

The divided packs 701–708 are sequentially output from the data divider 502a. When the data divider 502a outputs a divided pack containing head data of a pack, it notifies the system controller 504a of the information A1. The system controller 504a notifies the packet generator 503a of the information A1 indicating that the divided pack containing the head data of the pack has been output from the data divider 502a.

Here, suppose that a divided pack 701 is input from the data divider 502a to the packet generator 503a. Since the pack 701 contains the head data of the pack 607, the data divider 502a notifies the packet generator 503a of the information A1 through the system controller 504a. Knowing that the pack 701 contains the head data of the pack, the packet generator 503a adds information that the pack contains the head data to a header 1101, and adds the resulting header 1101 to the pack 701, to generate a packet 1102 as shown in FIG. 11, and outputs the packet 1102 to the data transmitter 507, which outputs the pack 1102 toward the network N.

Figure 12:
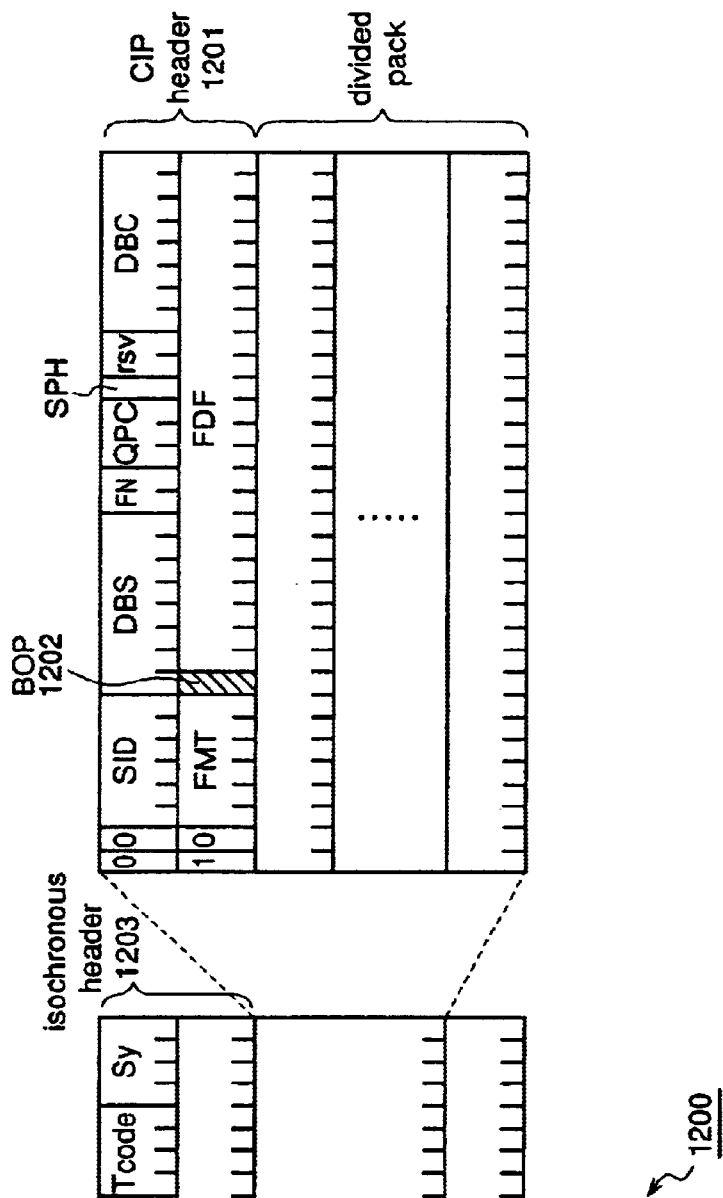
FIGS. 12(a) and 12(b) are diagrams for explaining a structure of a packet generated by the data transmitting device of the third embodiment.

FIGS. 12(a) and 12(b) show that a packet contains head data of a pack. FIG. 12(a) shows a structure of an IEEE 1394 isochronous packet (a packet for use in the isochronous transfer), and shows a 32-bit data stream in the lateral direction.

FIG. 12(b) shows a structure of a Data Field of an isochronous packet. The Data Field is composed of divided pack data and a Common Isochronous Packet (CIP) header 1201. Since the divided pack is 256 bytes in size, it corresponds to a data stream of 64 columns.

The CIP header 1201 is determined according to an IEC 61883 standard. In the second quadrate (second line) of the CIP header 1201, the 9th and the following bits is a Format Dependent field (FDF), which depends on a type of data. A head bit of the FDF is used as a BOP bit 1202. Whether or not a packet contains head data of a pack is indicated by setting the BOP bit 1202 to "1" or by setting it to "0", respectively. The isochronous header 1203 and the CIP header 1201 make the header 1101.

Subsequently, the divided pack 702 is processed. Since the divided pack 702 does not contain head data of the pack 607, the packet generator 503*a* adds information that the pack does not contain the head data to a header 1103*a*, and adds the resulting header 1103*a* to the pack 702, to generate a packet 1102 as shown in FIG. 11, and outputs the packet 1102 to the data transmitter 507, which outputs the packet 1102 toward the network N. Thereafter, the divided packs 703–708 are processed as in the case of the pack 702.

The NV_PCK 607 having been thus transmitted, subsequently, an A_PCK 608 is transmitted. In this case, the data transmitting device 1003 in FIG. 10 operates in the same manner that it transmits the NV_PCK 607. Thereafter, a V_PCK 609 and the following data are transmitted in the same manner.

Thus, in the data transmitting device 1003 of the third embodiment, the MPEG2 program stream data recorded in the recording medium such as the DVD in sector units is divided into packs which are almost as large as packets of the MPEG2 transport stream. Therefore, it is possible to transmit the data recorded in the DVD through a digital interlace such as the conventional IEEE1394 which handles the MPEG2 transport stream.

In addition, to a packet which contains head data of a pack, information indicating that it contains the head data is added, and therefore, a program stream can be restored from divided packs with ease at a receiving end.

[Embodiment 4]

Figure 13:
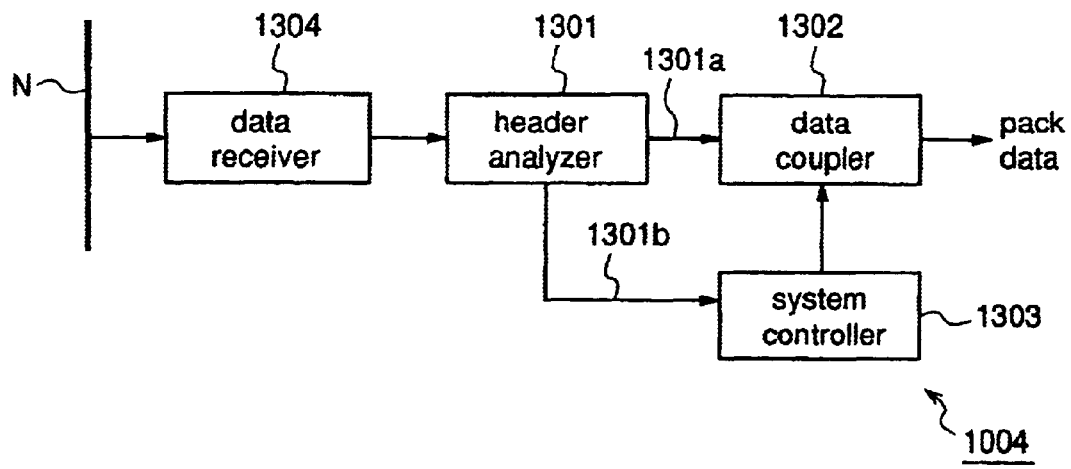
FIG. 13 is a block diagram showing a data transmitting device according to a fourth embodiment of the present invention.

FIG. 13 is a block diagram showing a data receiving device according to a fourth embodiment of the present invention. First, construction of the device will be described.

Referring now to FIG. 13, there is shown a data receiving device 1004. The data receiving device 1004 includes a data receiver 1304 for receiving packets output from the data transmitting device 1002 of the second embodiment output toward the network N, and a header analyzer 1301 for analyzing a header of the received packet and outputting divided pack data 1301*a* according to the analysis result, and divided pack size data 1301*b*. The data receiving device 1004 further includes a data coupler 1302 for coupling divided packs to generate a pack of 2048 bytes of the MPEG2 program stream in accordance with a control signal, and a system controller 1303 for outputting the size data 1301*b* to the data coupler 1302 as the control signal.

Figure 14:
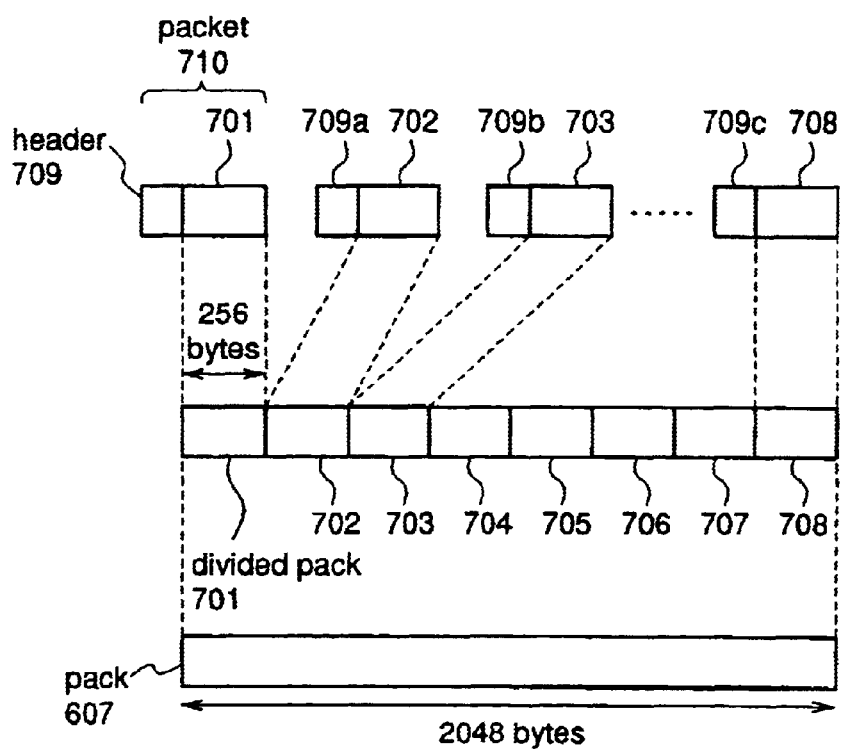
FIG. 14 is a diagram for explaining packet generation in the data transmitting device of the fourth embodiment.

FIG. 14 schematically shows structures of packets received by the data receiving device of the fourth embodiment.

Next, operation of the device 1004 will be described.

When the packet 710 is received by the data receiver 1304 over the network N, the header analyzer 1301 provided at a next stage of the data receiver 1304 analyzes a header 709 of the packet 710, and decides whether or not the packet 710 is directed to the data receiving device 1004. Where the packet 710 is directed to the data receiving device 1004, the header analyzer 1301 removes the header 709 from the packet 710, and outputs the divided pack 701 to the data coupler 1302. In addition, the header analyzer 1301 notifies the system controller 1303 of the size data 1301*b* indicating a size of a divided pack according to information contained in the header 709. The system controller 1303 also notifies the data coupler 1302 of a size of a divided pack using the control signal.

The data receiver 1304 and the header analyzer 1301 process the following packets as in the case of the packet 710, and outputs the divided packs 702–708 to the data coupler 1302. Upon receipt of the packs 701–708, the data coupler 1302 couples the divided packs according to their sizes posted by the system controller 1303. The divided packs are each 256 bytes in size. The 8 divided packs are coupled to create a pack of 2048 bytes of the MPEG2 program stream. From the data coupler 1302, the pack 607 of 2048 bytes in which divided packs 701–708 have been coupled.

Thus, in the data receiving device of the fourth embodiment, packets output toward the network N from the data transmitting device 1002 of the second embodiment are received, and divided packs contained in the packets are coupled according to analysis result of the corresponding headers. Thereby, the MPEG2 program stream read from the recording medium such as the DVD can be restored from the packet data.

[Embodiment 5]

Figure 15:
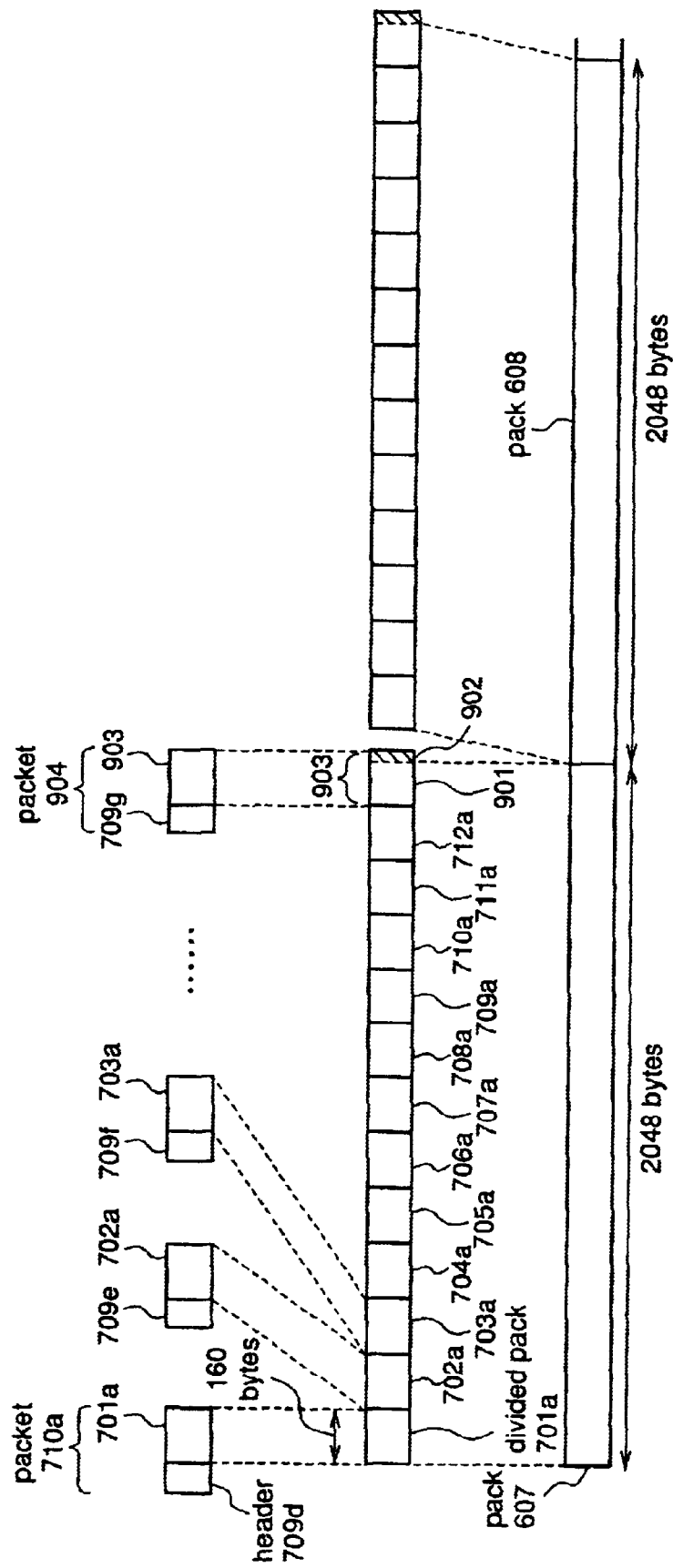
FIG. 15 is a diagram for explaining packet generation in the data transmitting device of the fifth embodiment.

FIG. 15 is a diagram for explaining a data receiving device according to a fifth embodiment of the present invention, and schematically shows structures of packets received by the data receiving device.

The data receiving device of the fifth embodiment is used to receive packets output in a data format in FIG. 9 from the data transmitting device of the second embodiment, and comprises a data receiver, a header analyzer, a data coupler, and a system controller as in the case of the data receiving device 1004 of the fourth embodiment. Note that the data coupler is used for removing stuffing data from the divided pack 903 in the fifth embodiment.

Subsequently, operation of the receiving device will be described.

When the packet 710*a* is input to the data receiver 1304 over the network N, the header analyzer 1301 analyzes a header 709*d* of a packet 710*a* and decides whether the packet 710*a* is directed to the data receiving device. Where the packet 710*a* is directed to the data receiving device, the header analyzer 1301 removes the header 709*d* from the packet 710*a*, and outputs the divided pack 701*a* (data 1301*a*) to the data coupler 1302. Also, the header analyzer 1301 notifies the system controller 1303 of a size of a divided pack (data 1301*b*) obtained from information contained in the header 709*d*. The system controller 1303 notifies the data coupler 1302 of the size of the divided pack. The data receiver 1304 and the header analyzer 1301 respectively process the following packets as in the case of the packet 710*a*, and outputs the divided packs 702*a*–712*a*, and 903 to the data coupler 1302.

Upon receipt of the divided packs 701*a*–712*a*, and 903, the data coupler 1302 couples these divided packs according to the size of the divided pack posted by the system controller 1303. In this embodiment, the divided packs are each 160 bytes, and these divided packs are coupled to create a pack of 2048 bytes.

On this occasion, the data coupler 1302 first couples the divided packs 701*a*–712*a* to create data of 1920 bytes, and then couples data 901 of 128 bytes as a head portion of the divided pack 903 thereto, to create the pack 607 of 2048 bytes. At this time, the data coupler 1302 abandons the remaining data 902 of the divided pack 903 because it is stuffing data.

So created pack 607 is output from the data coupler 1302. In a like manner, the following packets are processed, to create pack data.

Thus, in the data receiving device of the fifth embodiment, packets output from the data transmitting device 1002 of the second embodiment in a data format shown in FIG. 9 toward the network N, and according to the analysis result of headers, divided packs contained in the packets are coupled and stuffing data is abandoned. Therefore, packet data in a data format in FIG. 9 can be received, and from the packet data, the MPEG2 program stream recorded in the recording medium such as the DVD in sector units can be restored.

[Embodiment 6]

Figure 16:
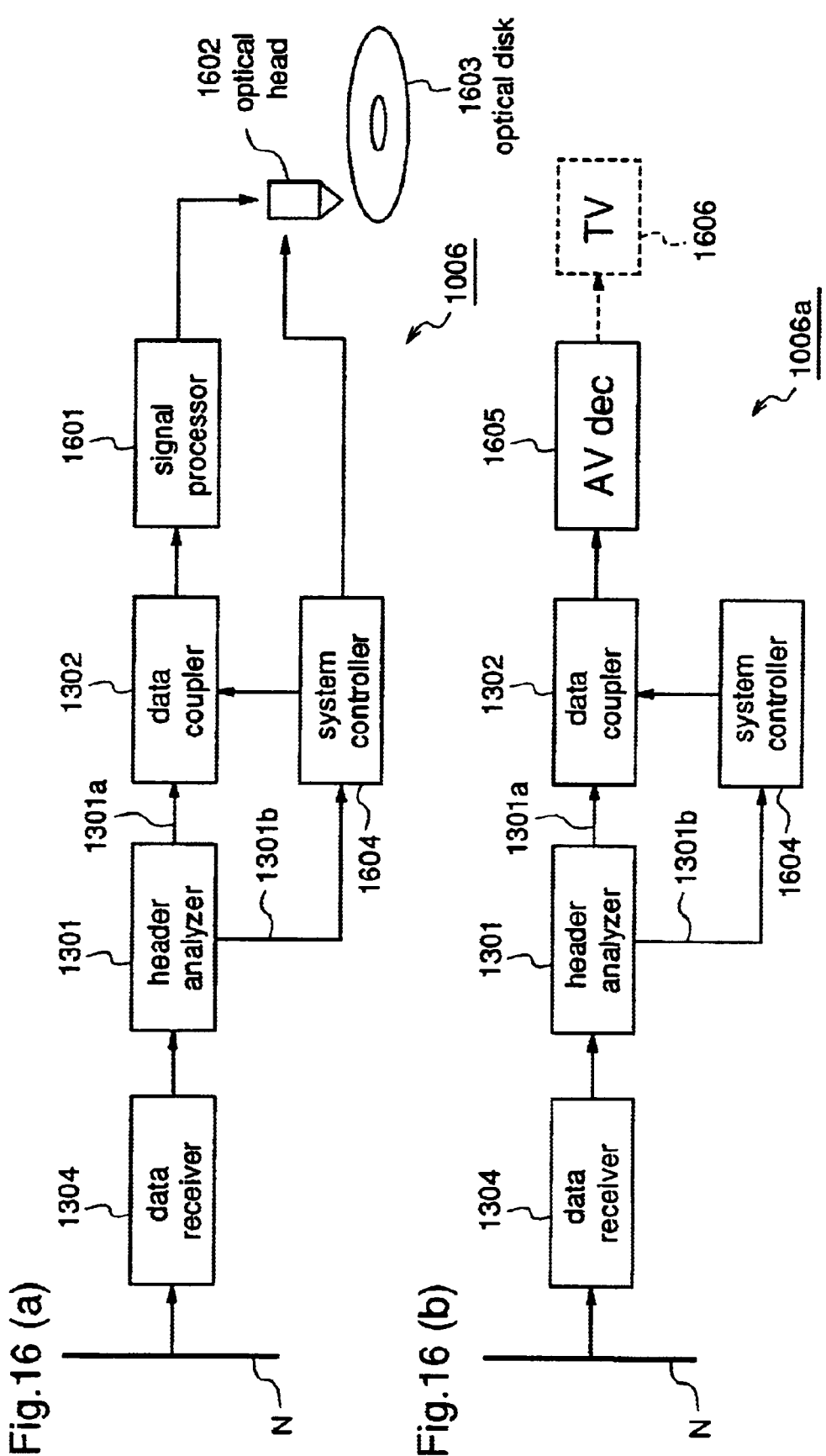
FIGS. 16(a) and 16(b) are diagrams for explaining a data receiving device and a data recording device according to a sixth embodiment of the present invention.

FIG. 16(*a*) is a block diagram showing a data recording device according to a sixth embodiment of the present invention. First, construction of the device will be described.

Referring to FIG. 16(*a*), there is shown a data recording device 1006. The data recording device 1006, as in the case of he data receiving device 1004, includes a data receiver 1304 for receiving packets output from the data transmitting device 1002 of the second embodiment toward the network N, and a header analyzer 1301 for analyzing a header of the received packet, and outputting divided pack data 1301*a* and size data 1301*b* of the divided pack according to the analysis result. The data recording device 1006 further includes a data coupler 1302 for coupling divided packs to generate a pack of 2048 bytes of the MPEG2 program stream in accordance with a control signal, a system controller 1604 for outputting the size data 1302*b* to the data coupler 1302 as the control signal, and a signal processor 1601 for subjecting an output of the data coupler 1302 to ECC coding and recording modulation, and data to-be-recorded to an optical head 1602. The system controller 1604 is used for controlling the optical head 1602.

FIG. 14 schematically shows structures of packets received by the data recording device 1006 of the sixth embodiment.

Next, operation of the device will be described. In the recording device 1006 of the sixth embodiment, the receiver 1304 receives packets over the network N, the header analyzer 1301 analyzes headers of the packets, and the data coupler 1302 restores pack data, as in the case of the data receiving device 1004 of the fourth embodiment.

When the pack 607 of 2048 bytes in which the divided packs 701–708 have been coupled by the data coupler 1302, is input to the signal processor 1601, the signal processor 1601 subjects the packs to ECC coding and modulation, or the like. Then, under the control of the system controller 1604, the optical head 1602 records the pack 607 onto a recording position of the optical disk 1603.

The following received packets are processed in the same manner. From packets, pack data is restored and then recorded in the optical disk 1603.

Thus, in the data recording device 1006 of the sixth embodiment, packets output from the data transmitting device 1002 of the second embodiment toward the network N through the 1394I/F are received, and according to the analysis result of their headers, divided packs contained in the packets are coupled, and the resulting coupled back data is recorded in the recording medium. Therefore, packets transmitted through the digital interface such as the IEEE1394 can be received, and from the packets, the MPEG2 stream data can be restored, and recorded in the recording medium such as the DVD in sector units.

While in the sixth embodiment, the data recording device 1006 receives packets transmitted from the data transmitting device 1002 of the second embodiment through the 1394I/F, and restores and records the MPEG2 program stream data, the signal processor 1601 and the optical head 1602 of the device 1006 may be replaced with an AV data decoder (AV data decoder) 1605, thereby realizing an device 1006*a* for image display of restored program stream data as shown in FIG. 16(*b*). Besides, format of data recorded in the optical disk is not limited to the data format shown in FIG. 6.

In addition, while in the data transmitting device and the data recording device of the second, third and sixth embodiments respectively use the optical disk as the recording medium, this is not restricted to the optical disk so long as it records and reproduces data in sector units. As an example of this, a magnetic disk is possible.

Yet in addition, while in the data transmitting device, the data receiving device, and the data recording device of the second through sixth embodiments, packs of the program stream are 2048 bytes in size, the size is not limited thereto.

Further, while in the second and third embodiments, pack data of 2048 bytes is divided into packs of the same size, this may be divided into packs of different sizes.

Still further, in the data transmitting device of the second and third embodiments, whether or not a divided pack contains head data of a pack is indicated by a flag contained in a header. As a possible alternative, count number of divided packs is set in a header, thereby indicating that a divided pack contains head data of a pack of a program stream.

Moreover, while in the second and third data transmitting device, the packet generator 503 is notified of information indicating that a divided pack contains head data of a pack through the system controller 504, the data divider 502 may directly notify the packet generator 503 of this without the system controller 503.

[Embodiment 7]

Figure 17:
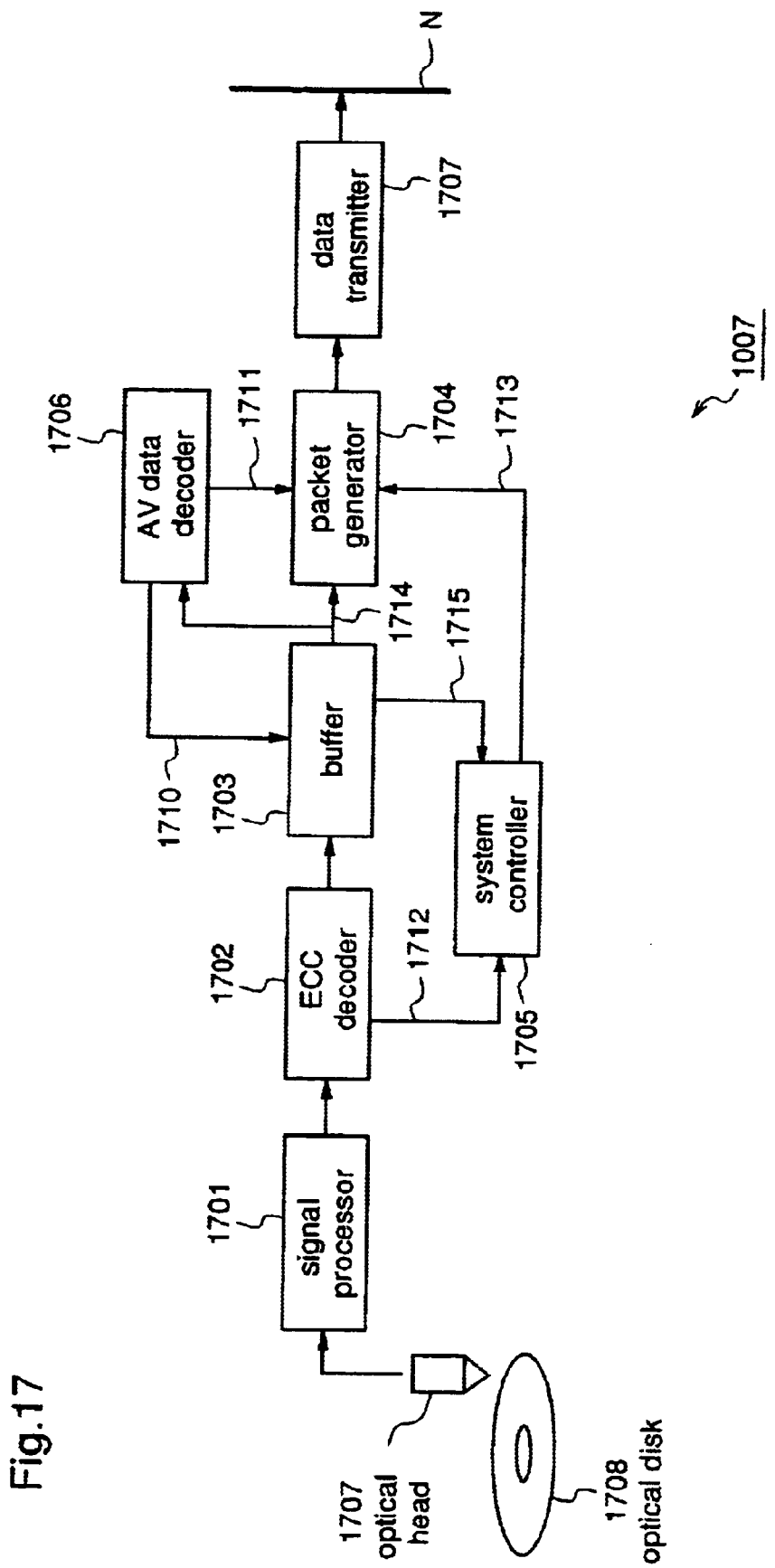
FIG. 17 is a block diagram showing a data transmitting device according to a seventh embodiment of the present invention.

FIG. 17 is a block diagram illustrating a data transmitting device 1007 according to a seventh embodiment of the present invention.

The data transmitting device 1007 includes an optical head 1707 for reading data from an optical disk 1708 as a recording medium; a signal processor 1701 for subjecting the read data to binarization and demodulation; and an ECC decoder 1702 for subjecting the output from the signal processor 1701 to ECC decoding.

The data transmitting device 1007 further includes a buffer 1703 for storing the data output from the ECC decoder 1702; a packet generator 1704 for packetizing the data output from the buffer 1703 and clock information, and adding header information or the like to the generated packets, which information is for transmitting data through a digital interface such as the 1394I/F; and a data transmitter 1709 for outputting the packets output from the packet generator 1704, toward the network N. The structure of the data transmitter 1709 is identical to that of the conventional 1394I/F.

The data transmitting device 1007 further includes an AV (audio/video) data decoder 1706 for requesting data from the buffer 1703, and decoding the data output from the buffer 1703; and a system controller 1705 for controlling the packet generator 1704 according to the amount of data stored in the buffer.

A description is given of the operation of the data transmitting device.

The data read from the optical disk by the optical head 1707 is subjected to binarization and demodulation in the signal processor 1701, and sent to the ECC decoder 1702. The data input to the ECC decoder 1702 is subjected to ECC decoding, and input to the buffer 1703.

Whether the above-mentioned data readout operation, i.e., the operation of reading data from the optical disk 1708 and then inputting the data to the buffer 1703, is performed or not depends on the amount of data stored in the buffer 1703.

To be specific, when the amount of data stored in the buffer 1703 becomes smaller than a first prescribed amount, data are continuously read from the optical disk 1708 and stored in the buffer 1703. When the amount of data stored in the buffer 1703 exceeds a second prescribed amount, readout of data from the optical disk 1708 is stopped.

Further, readout of data from the buffer 1703 into the AV data decoder 1706 is performed according to a request for data transfer 1710, which is output from the AV data decoder 1706 to the buffer 1703. On receipt of the data transfer request 1710, the buffer 1703 outputs the data in rotation as input. The output data 1714 are successively decoded by the AV data decoder 1706. Simultaneously, the data 1714 output from the buffer 1703 are input to the packet generator 1704 as well. Further, clock information 1711 generated by the AV data decoder 1706 is input to the packet generator 1704.

The packet generator 1704 packetizes the data from the buffer 1703 and the clock information 1711, adds header information or the like to the packets so generated, which information is for transmitting data through a digital interface, and outputs the packets to the data transmitter 1709. The data transmitter 1709 output the packets from the packet generator 1704 toward the network N.

Hereinafter, the operation of the data transmitting device will be described in more detail using a timing chart shown in FIGS. 18(*a*)–18(*e*).

Figure 18:
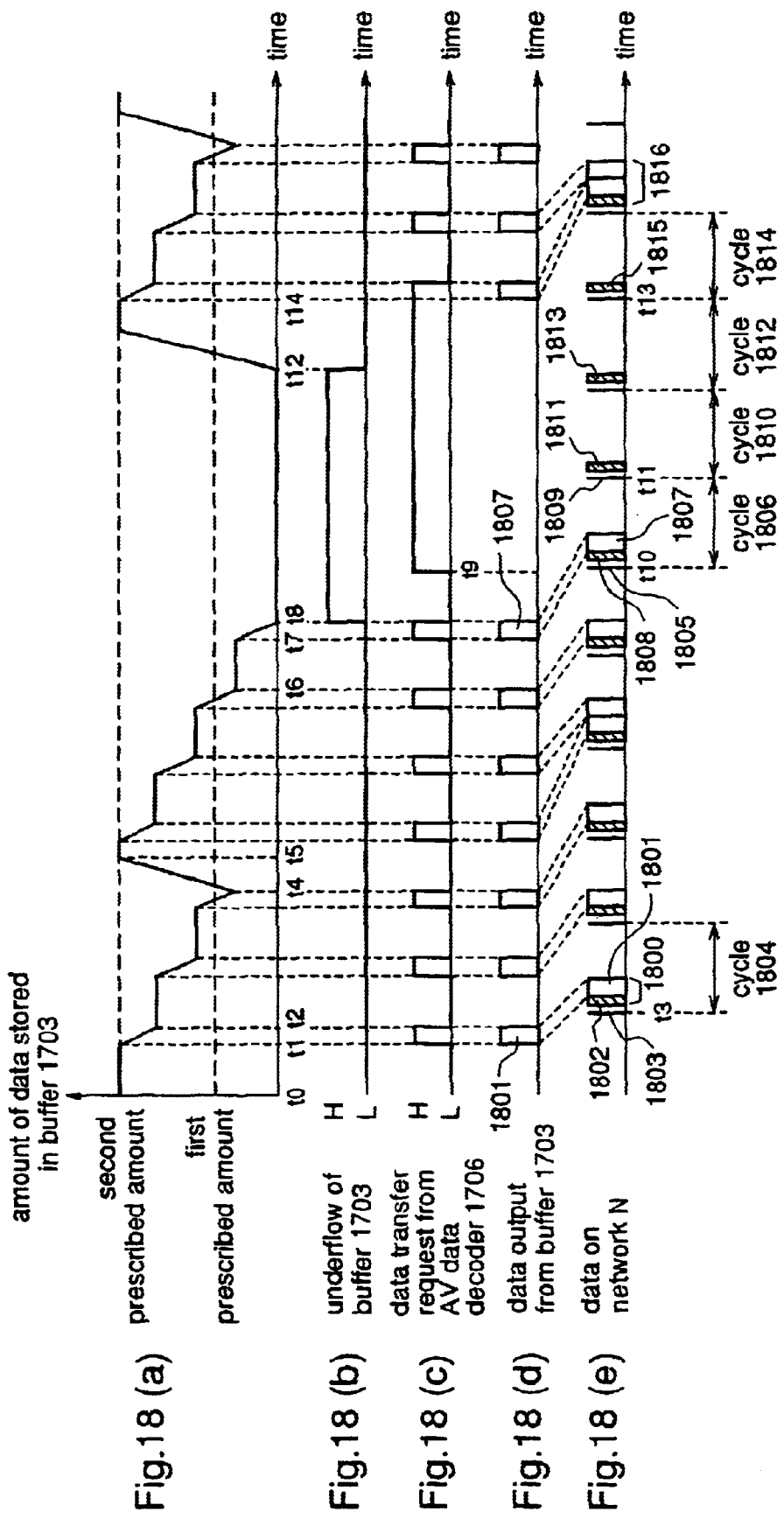
FIGS. 18(a)–18(e) are a timing chart diagram for explaining operation if the data transmitting device of the seventh embodiment.

FIG. 18(*a*) is a graph showing how the amount of data stored in the buffer 1703 changes with time, and FIG. 18(*b*) shows wether the buffer 1703 is in the underflow state or not, with "H" level and "L" level. That is, the period of H level shows that the buffer 1703 is in the underflow state while the period of L level shows that the buffer 1703 is not in the underflow state.

Further, FIG. 18(*c*) shows the data transfer request output from the AV data decoder 1706 to the buffer 1703, and the transfer request is output in the period of H level. FIG. 18(*d*) shows the output of data from the buffer 1703, and the data is output in the period of H level. FIG. 18(*e*) shows data output from the data transmitter to the network N.

At time t0, data of the same amount as the second prescribed amount are stored in the buffer 1703. At time t1, a data transfer request is output from the AV data decoder 1706 to the buffer 1703. It is premised that the data transfer request from the AV data decoder 1706 is output at equal intervals. When the data transfer request is output from the AV data decoder 1706 to the buffer 1703, the operation of outputting data 1801 from the buffer 1703 to the AV data decoder 1706 and the packet generator 1704 is started. When the data transfer request is stopped at time t2, the data transfer from the buffer 1703 is stopped temporarily.

Since the data transmitter 170 9is the IEEE1394I/F, the data transmitter 1709 detects a cycle start packet 1803 at time t3, whereby a cycle 1804 is started. At time t3, the data, which has already been output from the buffer 1703 but has not been output to the network N, is the data 1801, the packet generator 1704 adds a header 1802 or the like to this data 1801, which header is for transmitting the data through the data tranmitter 1709, and then outputs the data to the data transmitter 1709.

Figure 19:
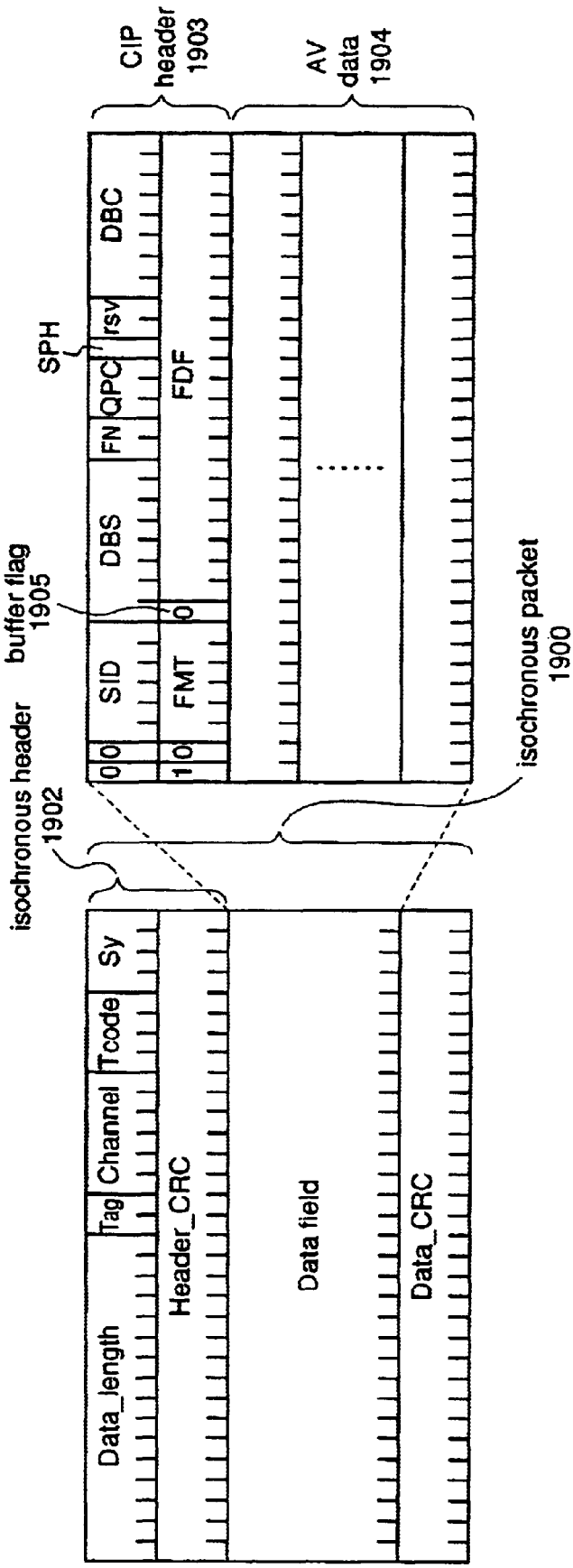
FIGS. 19(a) and 19(b) are diagrams for explaining a structure of a packet generated by the data transmitting device of the seventh embodiment.

FIGS. 19(*a*) and 19(*b*) show the structure of an isochronous packet 1900 handled in the IEEE1394I/F. This isochronous packet 1900 is composed of AV data 1904, and an isochronous header 1902 and a CIP header 1903, which headers are added to the AV data 1904. The AV data 1904 is the data 1801. The CTP header 1903 includes a buffer flag 1905, and this buffer flag 1905 indicates whether the buffer 1703 underflows or not. The buffer flag 1905 is "1" when the buffer 1703 underflows, and it is "0" when the buffer 1703 does not underflow. Accordingly, in the CIP header of the header 1902, the buffer flag 1905 is "0". Thereafter, the data, which have been similarly output from the buffer, are successively output to the data transmitter 1709 as a digital interface.

At time t4, the amount of data stored in the buffer 1703 becomes smaller than the first prescribed amount. The amount of data stored in the buffer 1703 (information 1715) is monitored by the system controller 1705. When the system controller 1705 detects that the amount of data stored in the buffer 1703 becomes smaller than the first prescribed amount, it controls the optical head 1707, the signal processor 1701 and the ECC decoder 1702 so that the readout of data from the optical disk 1708 is carried out. When the amount of data stored in the buffer 1703 reaches the second prescribed amount at time t5, the system controller 1705 controls the optical head 1707, the signal processor 1701, and the ECC decoder 1702 so that the readout of data from the optical disk 1708 is stopped.

Now it is assumed that no data is input to the buffer 1703 although the amount of data stored in the buffer 1703 becomes smaller than the first prescribed amount at time t6. For example, when accessing to data to be reproduced, if it takes a very long time to find a sector in which the data is recorded because of unsuccessful track jumping or the like, also when an ECC error occurs in the ECC decoder 1702 and the same data is again read from the optical disk 1708.

At time t7, a data transfer request is output from the AV data decoder 1706, and data is output from the buffer 1703. At time t8, the amount of data stored in the buffer 1703 becomes 0, resulting in underflow. The system controller 1705 detects that the buffer 1703 is in the underflow state, and posts this fact to the packet generator 1704 with a signal 1713.

At time t9, a data transfer request is output from the AV data decoder 1706 to the buffer 1703. Since the buffer 1703 is in the underflow state, no data is output from the buffer 1703. Even though any data is output from the buffer at this time, the output data is not effective.

At time t10, a cycle start packet 1805 is detected and a cycle 1806 is started. Since the data, which has been output from the buffer 1703 but has not yet been output to the data transmitter 1709 at time t10, is the data 1807, the data transmitter 1709 adds a header 1808 or the like to this data 1807 and outputs this data to the network N.

At time t11, a cycle start packet 1809 is detected and a cycle 1810 is started. At time t11, there is no data which has been output from the buffer 1703 but has not been output through the data transmitter 1709 to the network N and, moreover, the buffer 1703 is in the underflow state. Therefore, the packet generator 1704 transmits only the header as an isochronous packet 1811 to the data transmitter 1709, and this isochronous packet 1811 comprising only the header is output from the data transmitter 1709 toward the network N.

Figure 20:
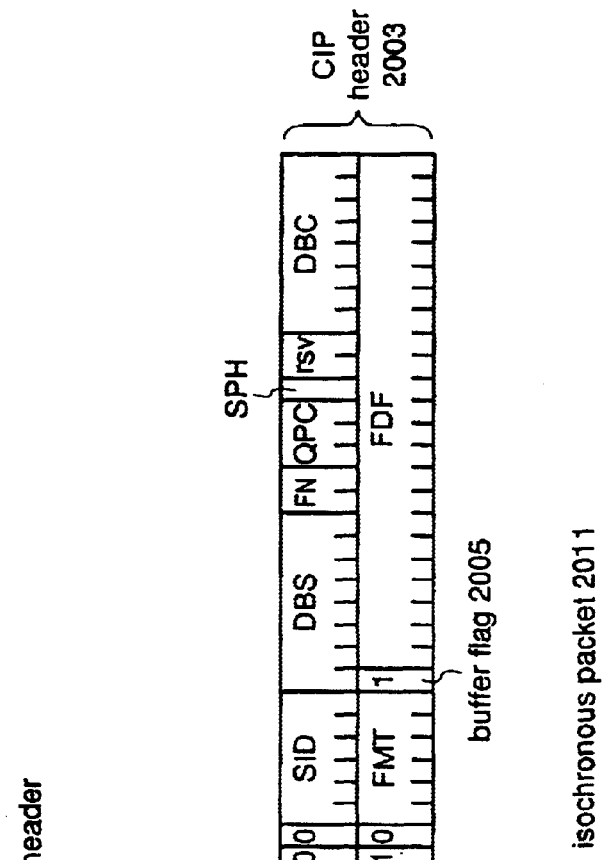
FIGS. 20(a) and 20(b) are diagrams showing a structure of a packet generated by the data transmitting device of the seventh embodiment.
Figure 20:
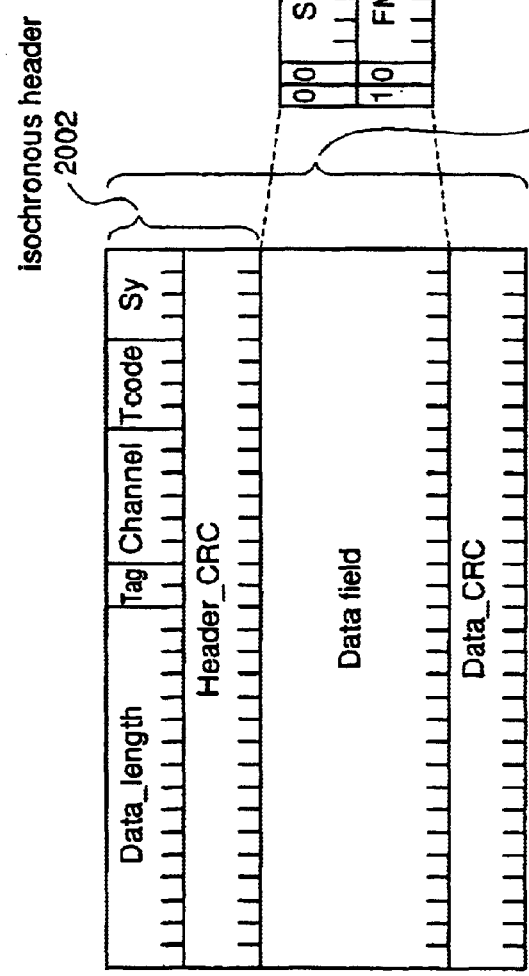

FIGS. 20(*a*) and 20(*b*) show the structure of an isochronous packet 2011 corresponding to the above-described isochronous packet 1811. As shown in these figures, the isochronous packet 2011 has no data section. Further, since the buffer 1703 is in the underflow state, the buffer flag 2205 is "1".

In a cycle 1812, as in the cycle 1810, there is no data which has been output from the buffer 1703 but has not been output to the network N, and the buffer 1703 is in the underflow state. Therefore, an isochronous packet 1813 similar to the isochronous packet 1811 is output.

At time t12, input of data to the buffer 1703 is resumed, whereby the buffer 1703 is released from the underflow state. At time t13, a cycle start packet is detected, and a cycle 1814 is started. At t13, there is no data which has been output from the buffer 1703 but has not been output to the digital interface 1709, but the buffer 1703 is not in the underflow state. Therefore, the isochronous packet 1815 generated by the packet generator 1704 and comprising only the header is output through the data transmitter 1709 toward the network N. Since the buffer 1703 is not in the underflow state, the value of the buffer flag of the isochronous packet 1815 is "0" like the buffer flag 1905 of the isochronous packet 1811.

At time t14, the amount of data stored in the buffer 1703 reaches the second prescribed amount, and output of data from the buffer 1703 is resumed. Thereafter, transmission of data is carried out in like manner as described for the cycle 1804.

As described above, in the data transmitting device 1007 according to the seventh embodiment, when the buffer 1703 underflows and the device cannot send data, information indicating that underflow has occurred in the buffer is put in the header information of the packet and transmitted, so that the receiving end can detect that underflow has occurred in the buffer at the transmitting end. Therefore, the receiving end can cope with the underflow of the buffer by converting the operation mode to the error handling mode or the like.

[Embodiment 8]

Figure 21:
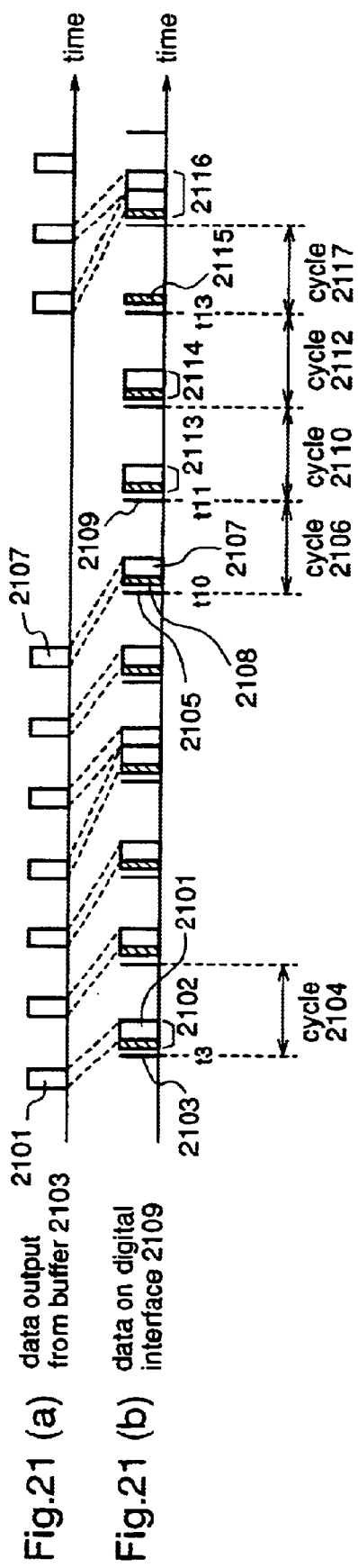
FIGS. 21(a) and 21(b) are a timing chart diagram for explaining a data transmitting device according to an eighth embodiment of the present invention.

FIGS. 21(*a*), 21(*b*), 22(*a*), 22(*b*), 23(*a*) and 23(*b*) are diagrams for explaining a data transmitted device according to an eighth embodiment of the present invention.

In the data transmitting device according to this eighth embodiment, the data output operation when the buffer 1703 does not underflow, i.e., the operation of reading data from the optical disk 1708 and then outputting a packet to the network N by the data transmitter 1709, is identical to that already described for the data transmitting device 1707 according to the seventh embodiment shown in FIG. 17.

FIG. 21(*a*) shows the manner of outputting data from the buffer 1703 of the data transmitting device according to this eighth embodiment, and FIG. 21(*b*) shows the state of the output data on the network N. FIGS. 21(*a*) and 21(*b*) correspond to FIGS. 18(*d*) and 18(*e*) explaining the operation of the data transmitting device according to the seventh embodiment, respectively.

Figure 22:
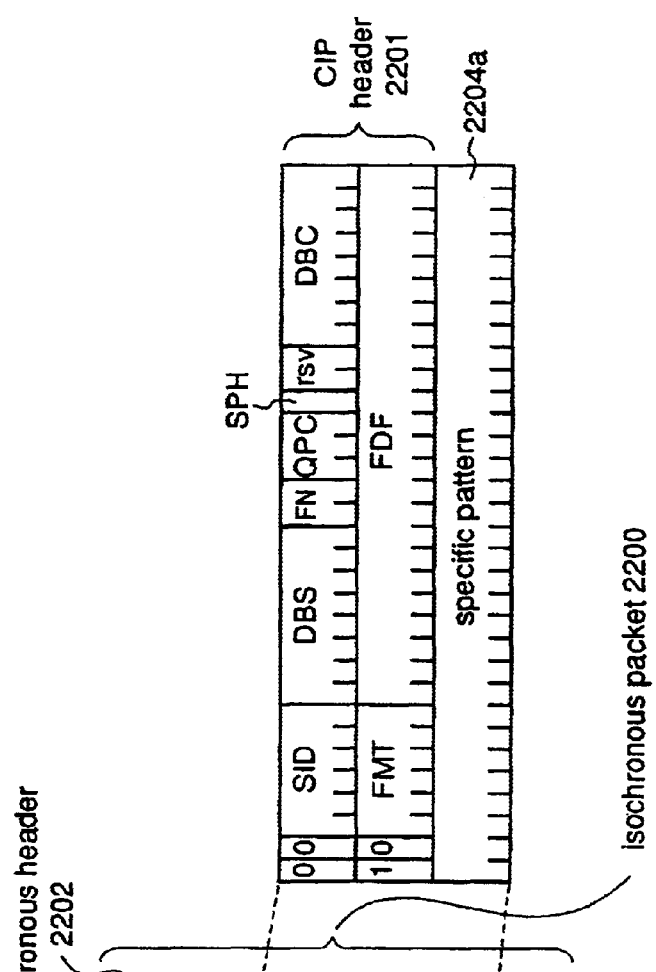
FIGS. 22(a) and 22(b) are diagrams for explaining a structure of a packet (including specific pattern data) generated by the data transmitting device of the eighth embodiment.
Figure 22:
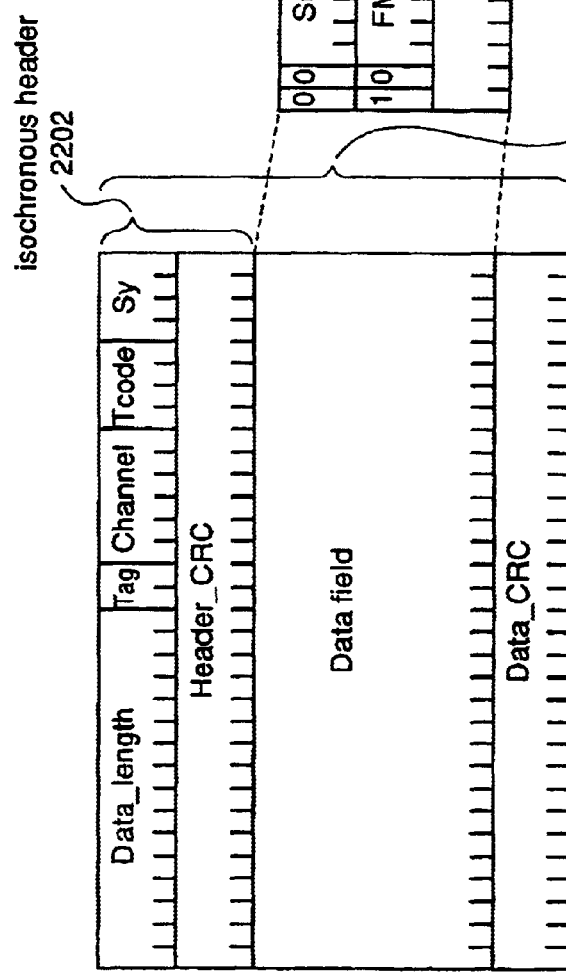

FIGS. 22(*a*) and 22(*b*) show the structure of an isochronous packet 2200 handled by the data transmitting device according to this eighth embodiment. As seen from these figures, a CIP header 2201 included in the isochronous packet 2200 is different in structure from the CIP header 1903 of the isochronous packet 1900 handled by the data transmitting device according to the seventh embodiment, namely, the CIP header 2201 has no buffer flag whereas the CIP header 1903 has the buffer flag 1905. In FIGS. 21(*a*) and 21(*b*), isochronous packets 2101 and 2107 at cycles 2104 and 2106, respectively, are identical to the isochronous packet 2200.

A description is now given of the operation of the data transmitting device.

The operation from time t0 to time t6 according to this eighth embodiment is identical to that already described for the seventh embodiment (refer to FIGS. 18(*a*)–18(*c*) and, therefore, the operation after time t6 will be described hereinafter.

Now it is assumed that no data is input to the buffer 1703 though the amount of data stored in the buffer 1703 becomes smaller than the first prescribed amount. At time t6, the data transmitting device according to this eighth embodiment is in such status.

As shown in FIG. 18(*c*), at time t7, a data transfer request is output from the AV decoder 1706, and data is output from the buffer 1703. At time t8, the amount of data stored in the buffer 1703 becomes 0, and the buffer 1703 goes into the underflow state. When the system controller 1705 detects that the buffer 1703 is in the underflow state, it posts this fact to the packet generator 1704 by a prescribed signal 1713.

Although a data transfer request is output from the AV data decoder 1706 to the buffer 1703 at time t9, since the buffer 1703 is in the underflow state, no effective data is output.

Turning to FIGS. 21(*a*) and 21(*b*), at time t10, a cycle start packet 2105 is detected and a cycle 2106 is started. Since the data, which has been output from the buffer 1703 but has not been output to the network N at time t10, is the data 2107, the packet generator 1704 adds a header for transmission 2108 or the like to this data 2107 and generates a packet, and the data transmitter 1709 outputs this packet to the network N.

At time t11, a cycle start packet 2109 is detected, and a cycle 2110 is started. At time t11, there is not data which has been output from the buffer 1703 but has not been output to the network N and, moreover, the buffer 1703 is in the underflow state.

Hence, the packet generator 1704 generates an isochronous packet 2200 including data of a prescribed specific pattern 2204*a* indicating that underflow of the buffer has occurred, instead of the AV data 1904 of the isochronous packet 1900 (refer to FIG. 19(*a*)), as shown in FIG. 22(*a*) and 22(*b*). Employed as a specific pattern indicating that underflow of the buffer has occurred is as follows: data of a pattern in which all bits (32 bits) in one horizontal line of the isochronous packet shown in FIG. 22 ARE 0; or a 32-bit sequence error code 000001B4h (h means hexadecimal) defined in MPEG2. When this packet is output as an isochronous packet 2113 to the data transmitter 1709, the data transmitter 1709 outputs the isochronous packet 2113 to the network N.

In a cycle 2112, as in the cycle 2110, there is not data which has been output from the buffer 1703 but has not been output to the network N, and the buffer 1703 is in the underflow state. Therefore the packet generator 1704 generates an isochronous packet 2114 including the above-mentioned data of a specific pattern 2204*a*, instead of the AV data 1904, and outputs this packet 2114 to the data transmitter 1709. Thereby, the isochronous packet 2114 is output from the data transmitter 1709 to the network N.

As shown in FIG. 18(*a*), at time t12, input of data into the buffer 1703 is resumed, whereby the buffer 1703 is released from the underflow state. Then, as shown in FIG. 21(*b*), a cycle start packet is detected at time t13, and a cycle 2117 is started. At time t13, there is no data which has been output from the buffer 1703 but has not been output to the data transmitter 1709, but the buffer 1703 is not in the underflow state. Therefore, the packet generator 1704 outputs an isochronous packet 2115 comprising only a header toward the data transmitter 1709. Since the buffer 1703 is not in the underflow state, the isochronous packet 2115 is identical to the isochronous packet 2301 which comprises only the isochronous header 2302, the CIP header 2301, and the Data_CRC.

As shown in FIG. 18(*a*), at time t14, the amount of data stored in the buffer 1703 reaches the second prescribed amount, and output of data from the buffer 1703 is resumed.

Thereafter, data transmission is carried out in like manner as already described for the cycle 2104.

As described above, in the data transmitting device according to the eighth embodiment, when the device cannot transmit data because the buffer 1703 underflows, data of a specific pattern is inserted in the data section of the packet, as information indicating that underflow of the buffer has occurred, and then the packet is transmitted. Therefore, like the seventh embodiment of the invention, it is possible to post that underflow of the buffer has occurred to the receiving end.

[Embodiment 9]

Figure 24:
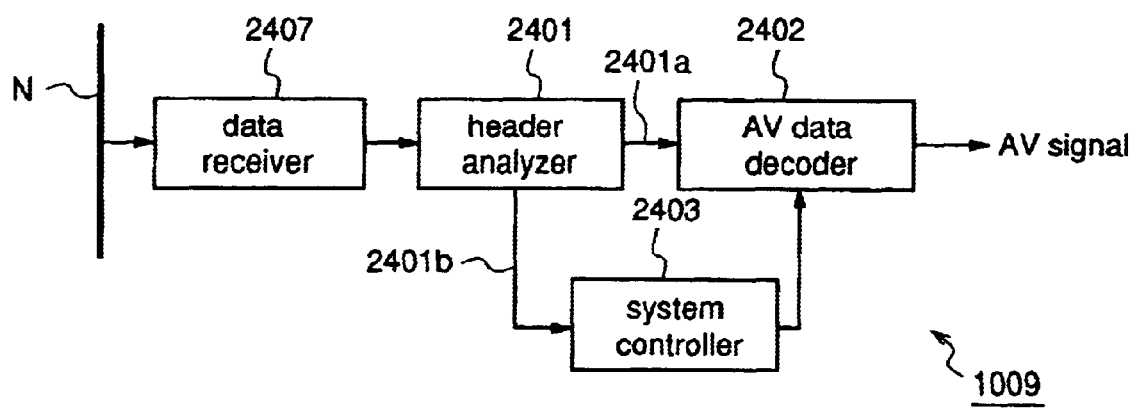
FIG. 24 is a block diagram showing a data receiving device according to a ninth embodiment of the present invention.

FIG. 24 is a block diagram illustrating a data receiving device according to a ninth embodiment of the present invention.

A data receiving device 1009 according to this ninth embodiment receives a packet which has been output from the data transmitting device 1007 according to the seventh embodiment toward the network N. The device 1009 comprises a data receiver 2407 which receives a packet on the network N; a header analyzer 2401 which analyzes the header of the received packet, and outputs data 2401a corresponding to the buffer output of the transmitting device, and a header analysis results 2401b; an AV data decoder 2402 which decodes the data 2401a from the header analyzer 2401 and outputs an AV signal; and a system controller 2403 which controls the decoder 2402 on the basis of the header analysis result 2401b.

A description is given of the operation of the data receiving device 1009.

When the data receiver 2407 receives a packet on the network N, the header analyzer 2401 in the subsequent stage checks the header of the packet. To be specific, when the data receiver 2407 receives a packet like the packet 1800, i.e., the packet having the structure shown in FIG. 19, the header analyzer 2401 checks the isochronous header 1902 and then checks the CIP header 1903. When checking the CIP header 1903, the header analyzer 2401 checks the buffer flag 1905 included in the CIP header 1903. When the buffer flag 1905 shows "no underflow of buffer", the AV data 1904 is subjected to CRC (Cyclic Redundancy Check). When the result of the CRC is correct, the AV data 1904 in the packet is output to the AV data decoder 2402. The AV data decoder 2402 decodes the AV data and output an AV signal.

A description is given of a case where the buffer flag 1905 included in the CIP header 1901 indicates "underflow of buffer" when it is checked. In this case, the data receiving device receives the packet 1811 shown in FIG. 18(e), i.e., the packet 2011 having the structure of FIGS. 20(a) and 20(b), and operates as follows.

The header analyzer 2401 posts that underflow has occurred in the buffer at the transmitted and, to the system controller 2403, by the header analysis result 2401b. Then, the system controller 2403 posts that underflow has occurred in the buffer at the transmitting end, to the AV data decoder 2402. Thereby, the AV data decoder 2402 stops the operation in normal decoding mode, and starts the operation in error handling mode. For example, the operation in error handling mode is to still and display a previous image, or to mute the audio signal.

Next, the data receiver 2407 receives a packet 1813, and this packet 1813 is input to the header analyzer 2401. The buffer flag 1905 included in the CIP header of this packet 1813 indicates "underflow of buffer". So, the header analyzer 2401 posts that underflow has occurred in the buffer at the transmitting end, to the system controller 2403, as the header analysis result 2401b. On receipt of this information, the system controller posts that underflow has occurred in the buffer at the transmitting end, to the AV data decoder 2402. Since the AV data decoder 2402 has already been operating in the error handling mode, it continues the error handling mode operation.

Next, the data receiver 2407 receives a packet 1815, and this packet is input to the header analyzer 2104. The buffer flag 1905 included in the CIP header of this packet 1815 indicates "no underflow of buffer". Accordingly, the header analyzer 2401 posts that underflow has not occurred in the buffer at the transmitting end, to the system controller 2403, as the header analysis result 2401b. Then, the system controller 2403 posts that the buffer at the transmitting end has been released from the underflow state, to the AV decoder 2402. Thereby, the AV data decoder 2402 stops the operation in error handling mode, and resumes the operation in normal decoding mode.

As described above, in the data receiving device 1009 according to the ninth embodiment, when the packet, which has been received through the digital interface, includes information indicating that underflow has occurred in the buffer at the transmitting end, this information is detected, and the operating mode in decoding of AV data is converted from the normal mode to the error handling mode. Therefore, the receiving end can perform speedy error handling, whereby disorder of video and audio signals due to underflow of the buffer at the transmitting end can be effectively suppressed.

[Embodiment 10]

A data receiving device according to a tenth embodiment of the present invention will be described using FIGS. 24, 18(a)–18(e), 21(a), 21(b), 22(a) and 22(b).

A data receiving device according to this tenth embodiment receives a packet stream shown in FIG. 21(b) which has been output from the data transmitting device according to the eighth embodiment toward the network N.

The data receiving device according to this tenth embodiment is different from the data receiving device according to the ninth embodiment only in the process of analyzing the information indicating that underflow has occurred, in the header analyzer.

A description is given of the operation of the data receiving device.

When the data receiver 2407 receives a packet, the header analyzer 2401 in the subsequent stage checks the header of the packet. To be specific, when the data receiver 2407 receives a packet like the packet 2102, i.e., the packet 2200 having the structure shown in FIG. 22, the header analyzer 2401 checks the isochronous header 1902 and then checks the CIP header 2201. Then, the AV data 1904 is subjected to CRC. When the result of the CRC is correct, it is checked whether the AV data 1904 includes a specific pattern or not. Included as a specific pattern is, for example, data of a pattern in which all of 32 bits are 0, or a 32-bit sequence error code 000001B4h (h means hexadecimal) defined in MPEG2.

When the AV data 1904 does not includes such specific pattern, the header analyzer 2401 outputs the AV data 1904 to the AV data decoder 2402. The AV data decoder 2402 decodes the AV data and outputs an AV signal.

A description is given of a case where the AV data 2204 includes a specific pattern. This case corresponds to the case of receiving the packet 2103 shown in FIG. 21(b). The structure of this packet 2103 is identical to that of the isochronous packet 2202 shown in FIGS. 22(a) and 22(b). The specific pattern 2204a included in the AV data 2204 of the packet 2200 indicates that underflow has occurred in the buffer at the transmitting end. In this case, the header analyzer 2401 posts that underflow has occurred in the buffer at the transmitting end, as the header analysis result 2401b, to the system controller 2403. Then, the system controller 2403 posts that underflow has occurred in the buffer at the transmitting end, to the AV decoder 2402. On receipt of this information, the AV decoder 2402 stops the operation in normal decoding mode, and starts the operation in error handling mode. For example, the operation in error handling mode is to still and display a previous image, or to mute the audio signal.

Next, the data receiver 2407 receives a packet 2114. The AV data of the packet 2114 includes a specific pattern which indicates that underflow has occurred in the buffer at the transmitting end. Accordingly, the header analyzer 2401 posts that underflow has occurred in the buffer at the transmitting end, as the header analysis result 2401b, toward the system controller 2403. Then, the system controller 2403 posts that underflow has occurred in the buffer at the transmitting end, to the AV data decoder 2402. Since the AV data decoder 2402 has already been operating in the error handling mode, it continues the error handling mode operation.

Figure 23:
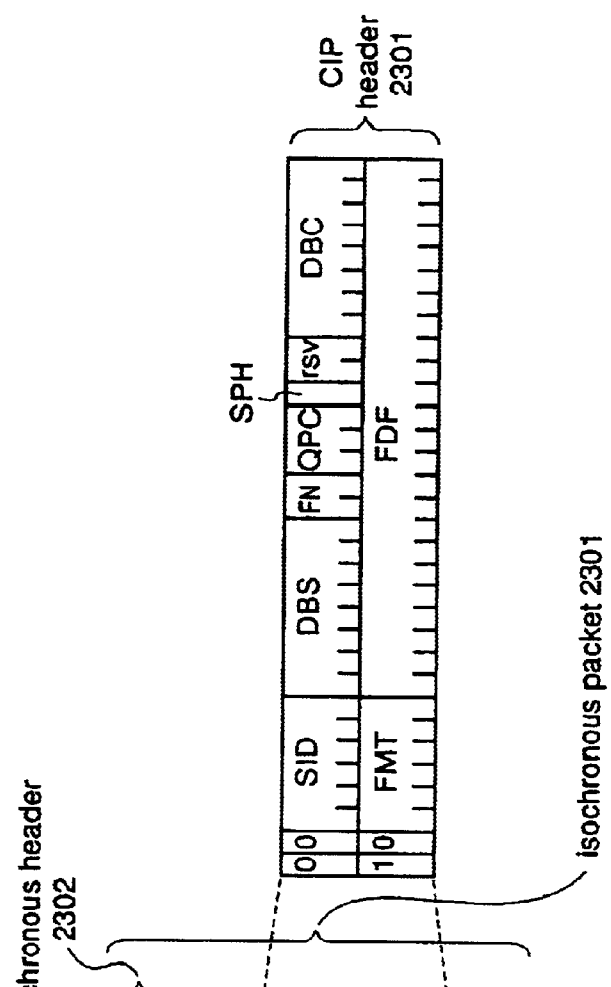
FIGS. 23(a) and 23(b) are diagrams for explaining a structure of a packet (including no specific pattern data) generated by the data transmitting device of the eighth embodiment.
Figure 23:
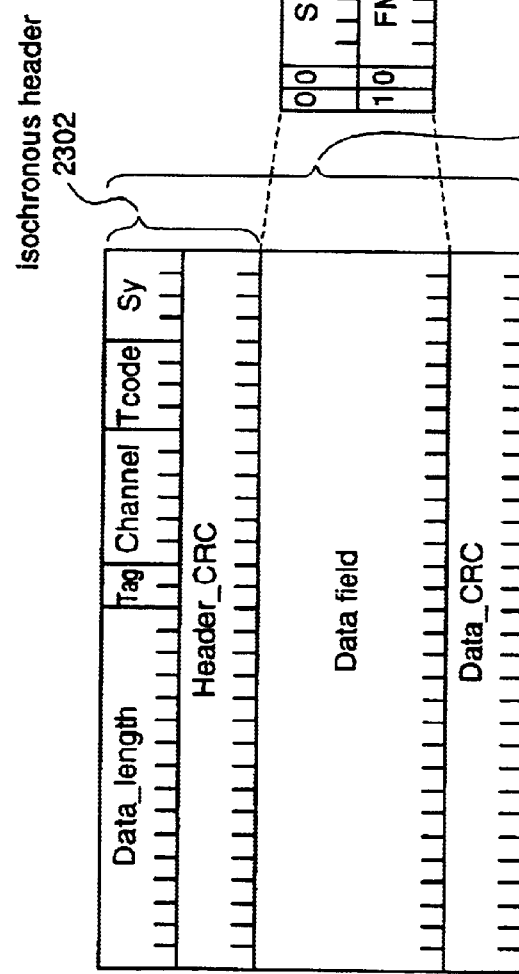

Next, the data receiver 2407 receives a packet 2115. The structure of this packet 2115 is identical to that of the isochronous packet 2301 shown in FIGS. 23(*a*) and 23(*b*) and, therefore, this packet 2115 does not include AV data, which means that no underflow has occurred in the buffer at the transmitting end. Therefore, the header analyzer 2401 posts that the buffer at the transmitting end has been released from the underflow state, as the header analysis result 2401b, to the system controller 2403. Then, the system controller 2403 posts that the buffer at the transmitting end has been released from the underflow state, to the AV decoder 2402. On receipt of this information, the AV data decoder 2402 stops the operation in error handling mode, and resumes the operation in normal decoding mode.

As described above, in the data transmitting device according to the tenth embodiment, when a packet, which has been received by the data transmitter (digital interface), includes data of a specific pattern indicating that underflow has occurred in the buffer at the transmitting end, this data is detected, and the operating mode of decoding of AV data is converted to the error handling mode. Therefore, as in the ninth embodiment of the invention, the receiving end can perform speedy error handling, whereby disorder of video and audio signals due to underflow of the buffer at the transmitting end can be minimized.

While in the seventh to tenth embodiments the IEEE1394I/F is employed as a digital interface, other digital interfaces may be employed.

Further, while in the seventh to tenth embodiment audio and video data are described as data recorded in a recording medium, subtitle data or the like may be included. Further, the data recorded on the medium may be one of video data and audio data.

Further, while in the seventh and eighth embodiments an optical disk is employed as a recording medium, other recording media, such as a magnetic disk, may be employed.

Furthermore, while in the seventh and ninth embodiments the buffer flag 1905 uses "1" to show that underflow of buffer has occurred and uses "0" to show that underflow of buffer has not occurred, "1" and "0" may be inverted.

Moreover, while in the seventh and eighth embodiments the output from the buffer is output to the packet generator as it is, the output from the buffer may be divided as described for the second embodiment before being input to the packet generator.

Furthermore, the temporal relationship between the data transfer request from the AV data decoder 1706 and the isochronous cycle is not restricted to that shown in FIGS. 18(*a*)–18(*e*).

[Embodiment 11]

Figure 25:
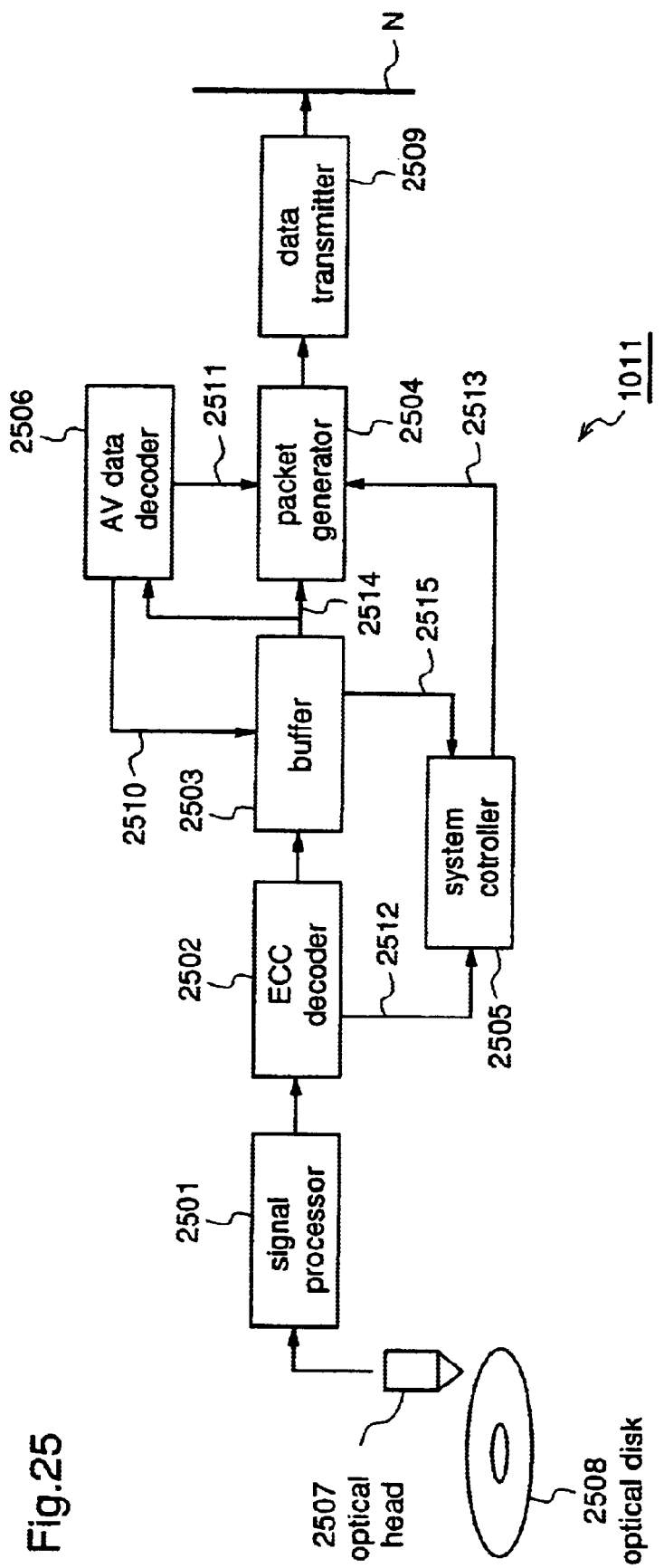
FIG. 25 is a block diagram for showing a data transmitting device according to an eleventh embodiment of the present invention.

FIG. 25 is a block diagram for explaining a data transmitting device 1011 according to an eleventh embodiment of the present invention.

The data transmitting devices 1011 comprises an optical head 2507 for reading data from an optical disk 2508 as a record medium; a signal processor 2501 for subjecting the read data to binarization and demodulation; and an ECC decoder 2502 for subjecting the output from the signal processor 2501 to ECC decoding. In this data transmitting device 1011, readout of data from the optical disk 2508 to the signal processor 2501 is carried out for each unit of ECC processing.

The data transmitting device 1011 further includes a buffer 2503 for storing the data output from the ECC decoder 2502; a packet generator 2504 for packetizing the data output from the buffer 2503 and clock information, and adding header information or the like to the generated packets, which information is for transmitting data through a digital interface such as the 1394I/F; and a data transmitter 2509 for outputting the packets from the packets generator 2504 toward the network N. The structure of the data transmitter 2509 is identical to that of the 1394I/F.

The data transmitting device 1011 further includes an AV data decoder 2506 for requesting data from the buffer 2503, decoding the data output from the buffer 2503, and outputting the clock information; and a system controller 2505 for controlling the packet generator 2504 according to the amount of data stored in the buffer 2503.

FIG. 26(*a*) is a diagram for explaining the sector structure of the optical disk 2508, wherein a track formed on the optical disk 2508 is straightened.

FIG. 26(*a*) shows that the sector size is 2 k bytes (2048 bytes) as the user data size, and a unit of ECC processing is 16 sectors (user data size=32 k bytes). Hereinafter, this one-block unit of ECC processing is called a cluster. The size of data actually recorded in one sector of the optical disk 2508 is equivalent to the user data of 2 k bytes to which ECC data is added.

A description is given of the operation of the data transmitting device 1011.

Readout of data from the optical disk 2508 is carried out for each cluster. The data read from the optical disk 2508 is subjected to binarization and demodulation in the signal processor 2501, and input to the ECC decoder 2502. The data input to the ECC decoder 2502 is subjected to ECC decoding and then input to the buffer 2503.

The above-mentioned data readout operation, i.e., the operation of reading data from the optical disk 2508 and then inputting the data into the buffer 2503, is carried out intermittently according to the amount of data stored in the buffer 2503. That is, when the amount of data stored in the buffer 2503 becomes smaller than the first prescribed amount, data are continuously read from the optional disk 2508 and stored in the buffer 2503. When the amount of data stored in the buffer 2503 exceeds the second prescribed amount, readout of data from the optical disk 2508 is stopped.

Readout of data from the buffer 2503 to the AV data decoder 2506 is performed according to the request for data transfer 2510 output from the AV data decoder 2506. On receipt of the request 2510, the buffer 2503 outputs data in rotation as input. The output data 2514 is successively decoded by the AV data decoder 2506. Simultaneously, the data 2514 output from the buffer 2503 is input to the packet generator 2504 as well. Further, the clock information 2511 generated by the AV data decoder 2506 is input to the packet generator 2504. The packet generator 2504 packetizes the input data and the clock information, adds header information or the like to the packets so generated, and outputs the packets to the data tranmitter 2507. Then, the data transmitter 2507 outputs the packets to the network N.

The above-mentioned operation will be described in more detail.

It is assumed that data of a cluster 2617 read from the optical disk 2508 (refer to FIG. 26(*a*)) is processed by the signal processor 2501 and, thereafter, this data is subjected to ECC decoding by the ECC decoder 2502 with no occurrence of error. In this case, the data of the cluster 2617 which has been subjected to ECC decoding is read into the AV data decoder 2506 and, simultaneously, input to the buffer 2503. The data of the cluster 2617 output from the buffer 2503 is packetized by the packet generator 2504 and output through the data transmitter 2507 to the network N.

As shown in FIG. 26(*a*), the cluster 2617 is composed of sectors 2601–2616, each sector having the size of 2048 of the cluster 2617 so that the date can be transmitted through the data transmitter 2507 within an obtained band, and adds header information or the like to the data of the divided clusters. Then, the packet generator 2504 packetized the data of the divided clusters, and outputs the packets so generated to the data transmitter 2507.

Figure 27:
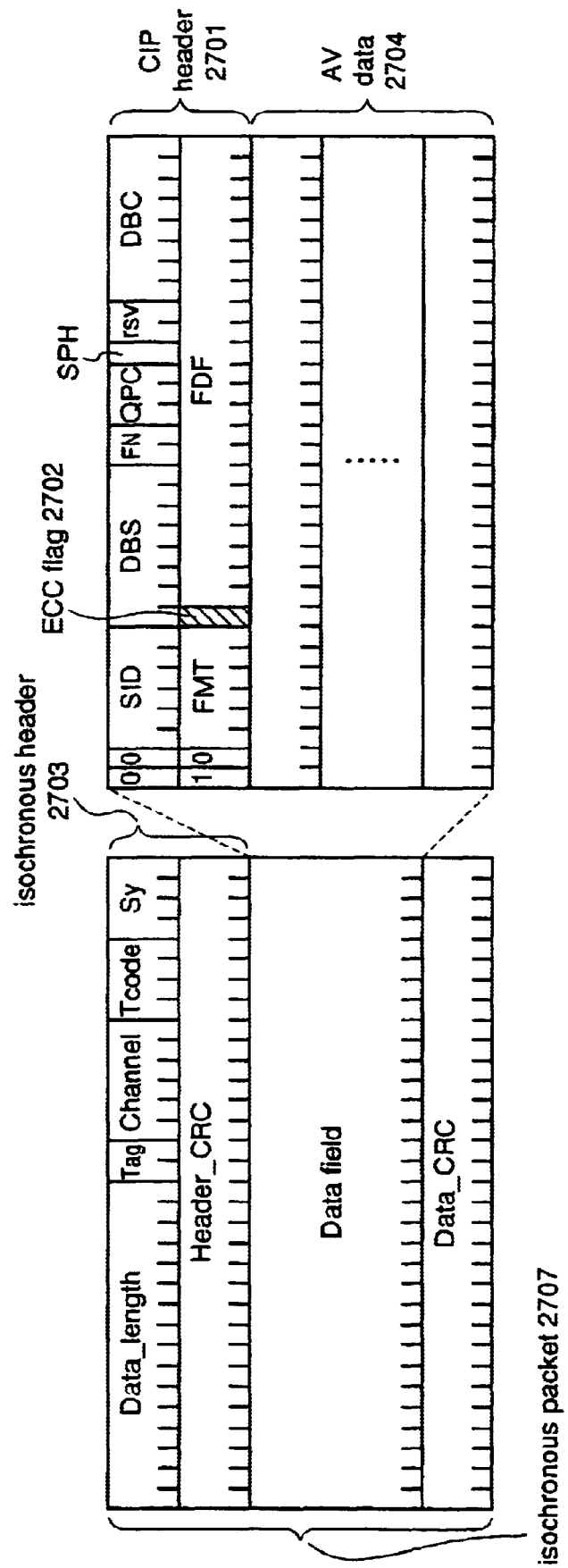
FIGS. 27(a) and 27(b) are diagrams showing a structure of a packet (ECC flag 0) generated by the data transmitting device of the eleventh embodiment.

FIGS. 27(*a*) and 27(*b*) are diagrams showing the structure of an isochronous packet 2700 handled in the IEEE1394I/F. The isochronous packet 2700 is composed of AV data 2704, and an isochronous header 2703 and a CIP header 2701, which headers are added to the AV data 2704. The AV data 2704 corresponds to the data of the cluster 2617.

Figure 28:
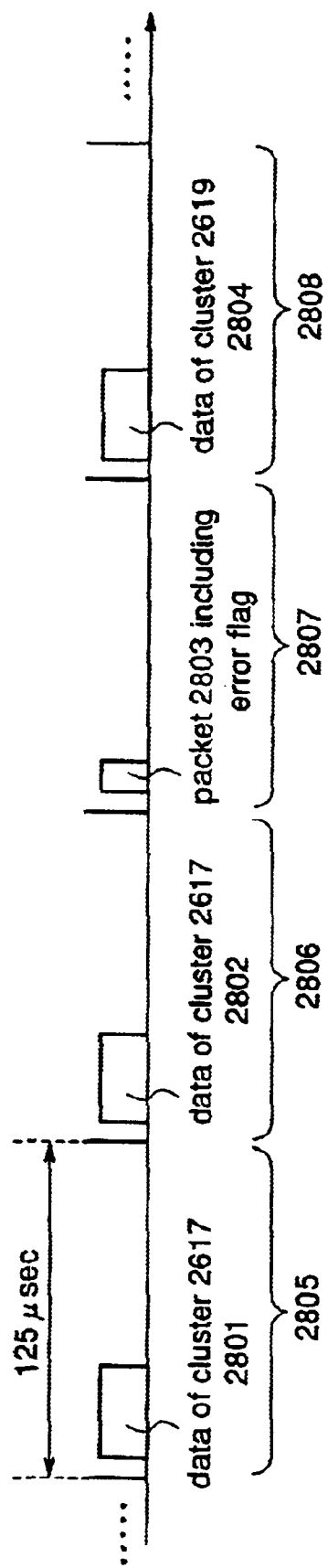
FIG. 28 is a diagram showing a structure of a packet output onto a network N from the data transmitting device of the eleventh embodiment.

FIG. 28 shows isochronous data flowing on the network N. In cycles 2805 and 2806, data 2801 and 2802 of the cluster 2617 flow, respectively, and the data 2802 in the cycle 2806 is the last data of the cluster 2617.

Figure 36:
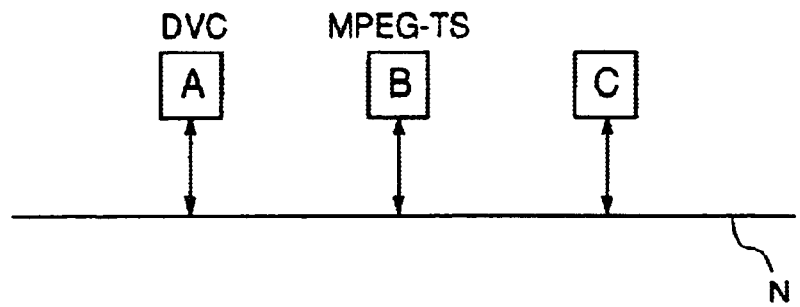
FIGS. 36(a) and 36(b) are diagrams for explaining data communication by an 1394I/F.
Figure 36:
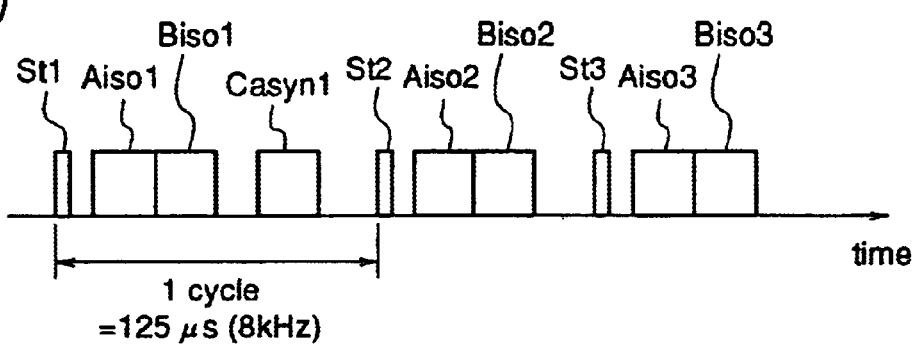
Figure 37:
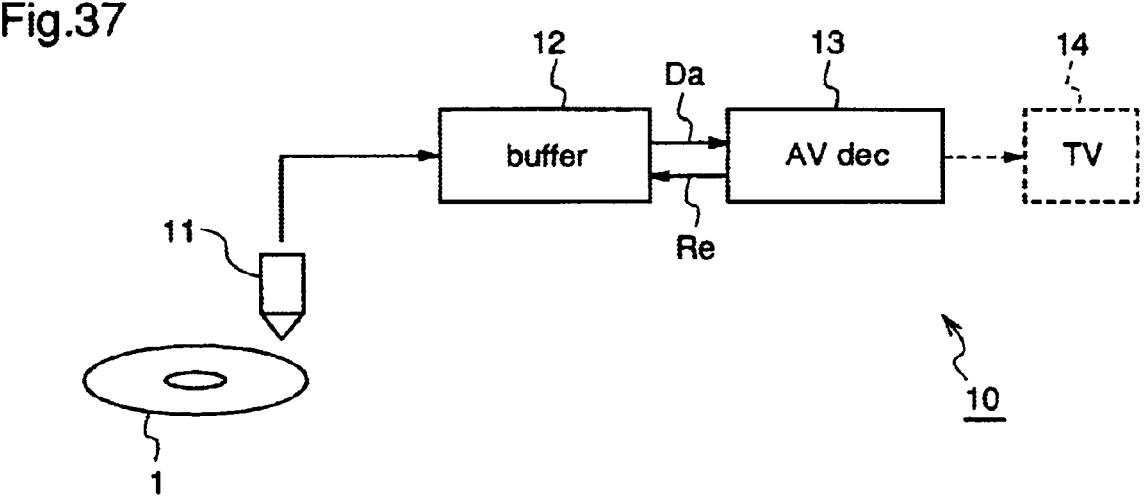
FIG. 37 is a block diagram showing a reproducing device such as a DVD player.
Figure 38:
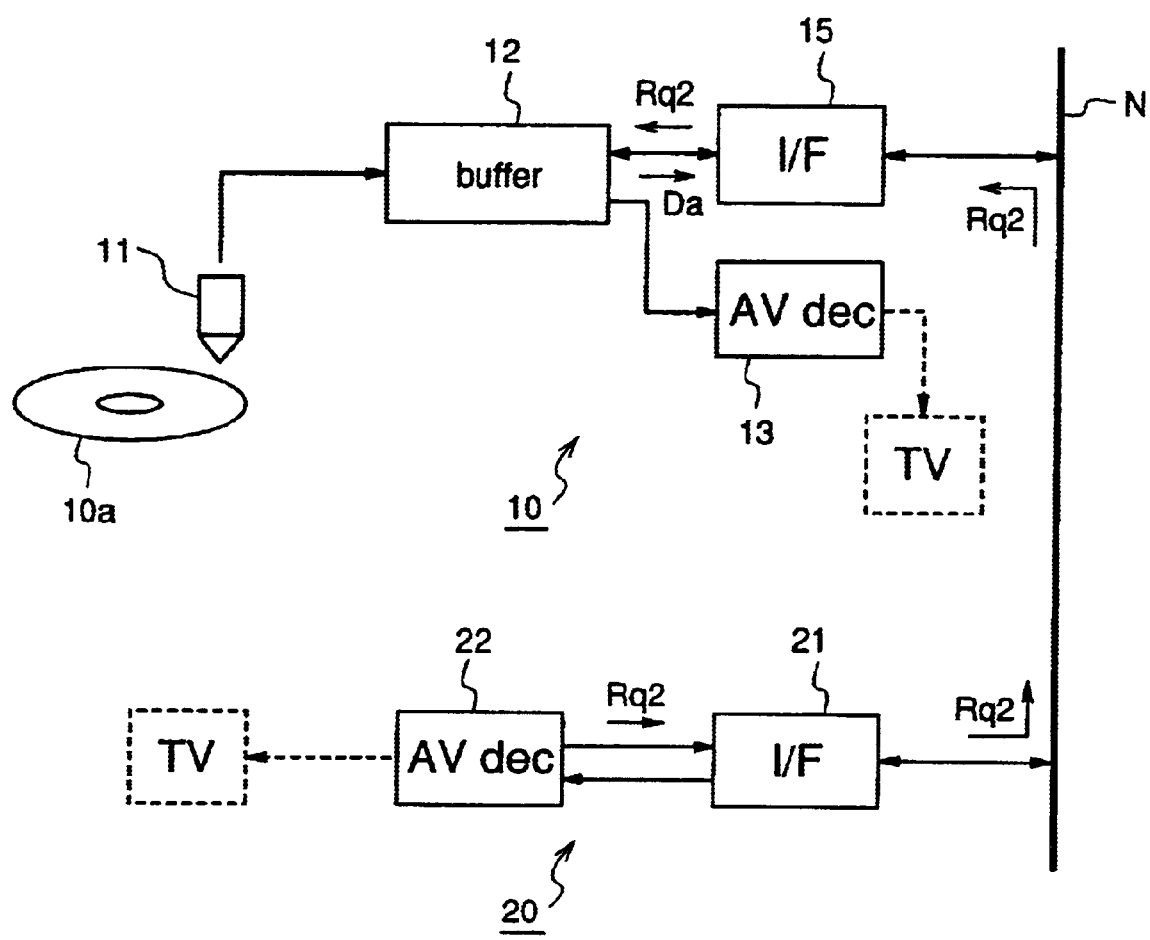
FIG. 38 is a block diagram showing a reproducing device such as a DVD player to which a digital interface (1394I/F) is added.
Figure 39:
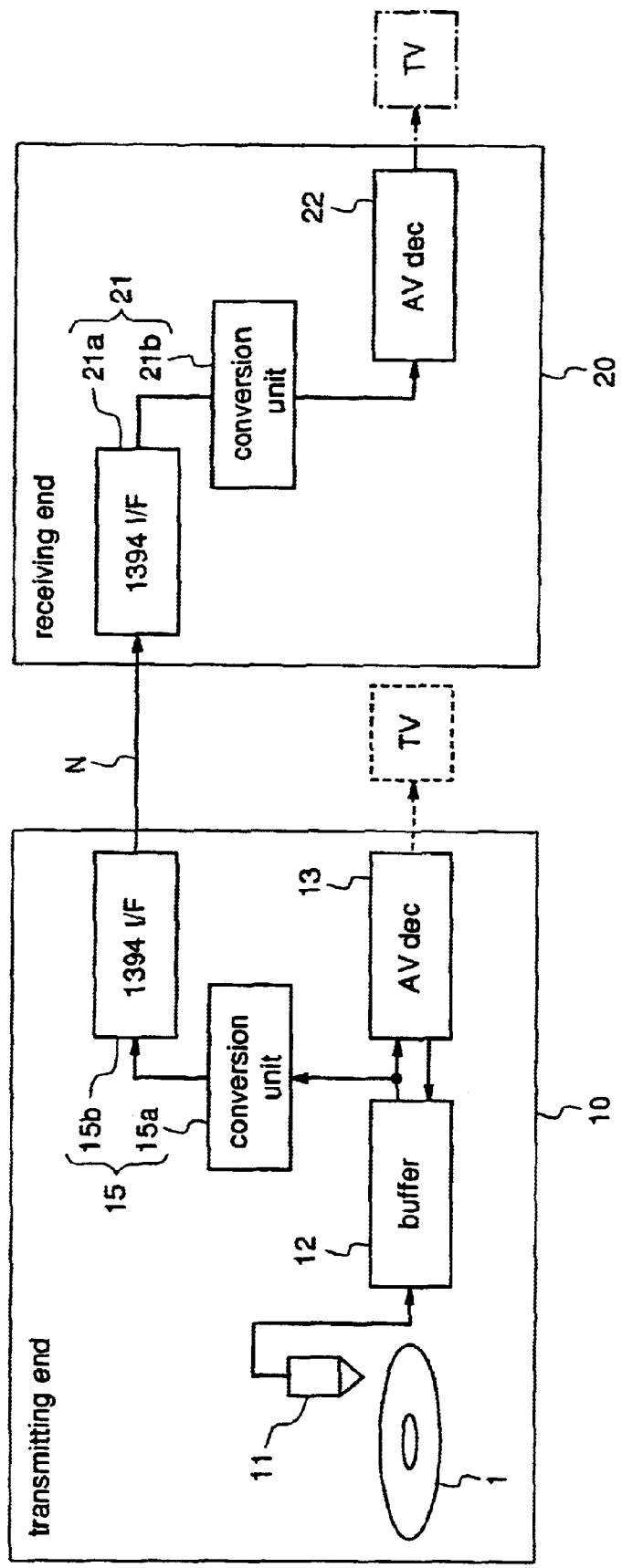
FIG. 39 is a diagram showing transmitting device 10 in FIG. 38 and receiving device 20 in FIG. 38.
Figure 40:
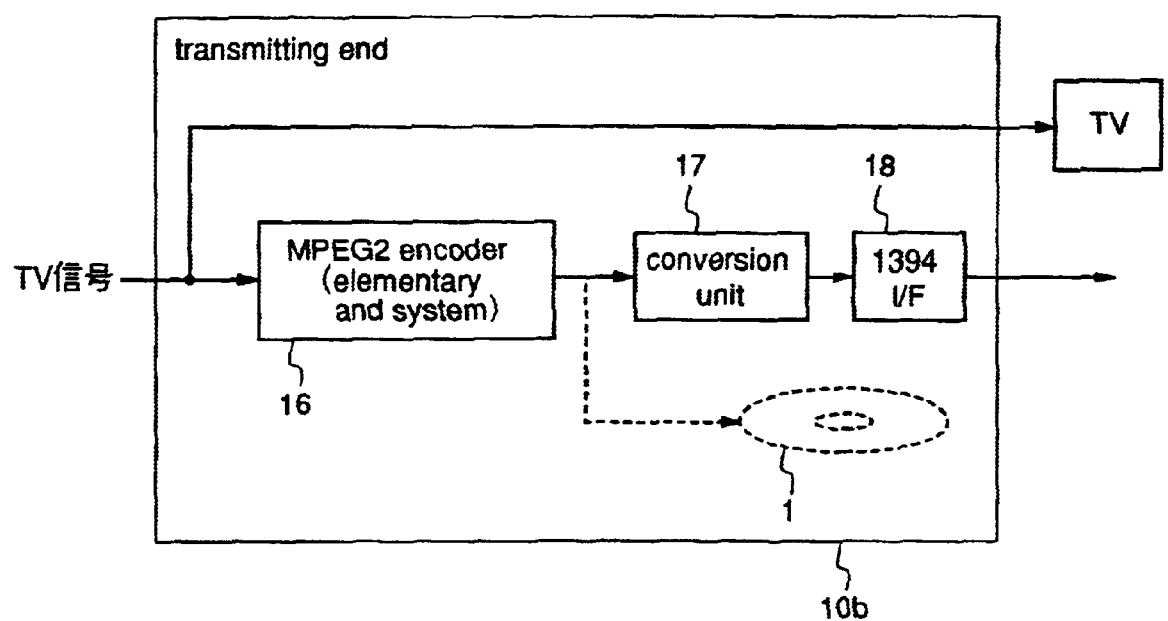
FIG. 40 is a diagram showing a DVD recorder which performs coding to a TV signal and records a coded TV signal in a recording medium such as the DVD.

Next, it is assumed that an ECC error occurs when data of the cluster 2618 (refer to FIG. 36(*a*)) read from the optical disk 2507 is subjected to ECC decoding by the ECC decoder 2502. Then, the ECC decoder 2502 posts the occurrence of the ECC error to the system controller 2505 by a signal 2512. In this case, re-reading of the cluster 2618 from the optical disk 2508 is not carried out, but readout of the next cluster 2619 is carried out.

Accordingly, in the data input to the buffer 2503, the cluster 2619 follows the cluster 2617 as shown in FIG. 26(*b*). When the ECC decoder 2502 posts the occurrence of the ECC error to the system controller 2505, the system controller 2505 detects a point of time at which the last data of the cluster 2617 is output from the buffer 2503, according to a monitor signal 2515 showing the amount of the data stored in the buffer 2503. When the last data of the cluster 2617 has been output from the buffer 2503, the system controller 2505 posts that an ECC error has occurred in the next cluster, to the packet generator 2504, by a signal 2513. Thereby, the packet generator 2504 knows that the data of the cluster to be input will not be input because of the ECC error. Then, the packet generator 2504 sets the ECC flag 2702 the CIP header 2701 to ECC error state, and generates a packet including no AV data 2704.

The ECC flag 2702 uses "1" to show that an ECC error has occurred, and "0" to show that no ECC error has occurred. In this case, the ECC flag 2702 is set to "1".

FIGS. 29(*a*) and 29(*b*) show the structure of a packet 2900 when an ECC error occurred. As shown in FIG. 28, in a cycle 2807, the packet generated by the packet generator 2504 is output as a packet 2803 through the data transmitter 2507 to the network N.

Next, the data of the cluster 2619 is output from the buffer 2503 as shown in FIG. 26(*b*). Since the data of the cluster 2619 has no ECC error, it is packetized by the packet generator 2504, like the cluster 2617. At this time, the ECC flag 2702 of the CIP header 2701 is "0". Then, the packet generated by the packet generator 2504 is output through the data transmitter 2507 to the network N.

As described above, in the data transmitting device according to the eleventh embodiment, when transmitting data, which has been read from a recording medium for each cluster (a unit of ECC processing) and subject to ECC decoding and packetization, if the device cannot transmit the data because of an ECC error, information indicating that the ECC error has occurred is added to the header information of the packet and then the packet is transmitted. Therefore, it is possible to post the occurrence of the ECC error to the receiving end, and the receiving end can speedily cope with the ECC error at the transmitting end.

[Embodiment 12]

Figure 31:
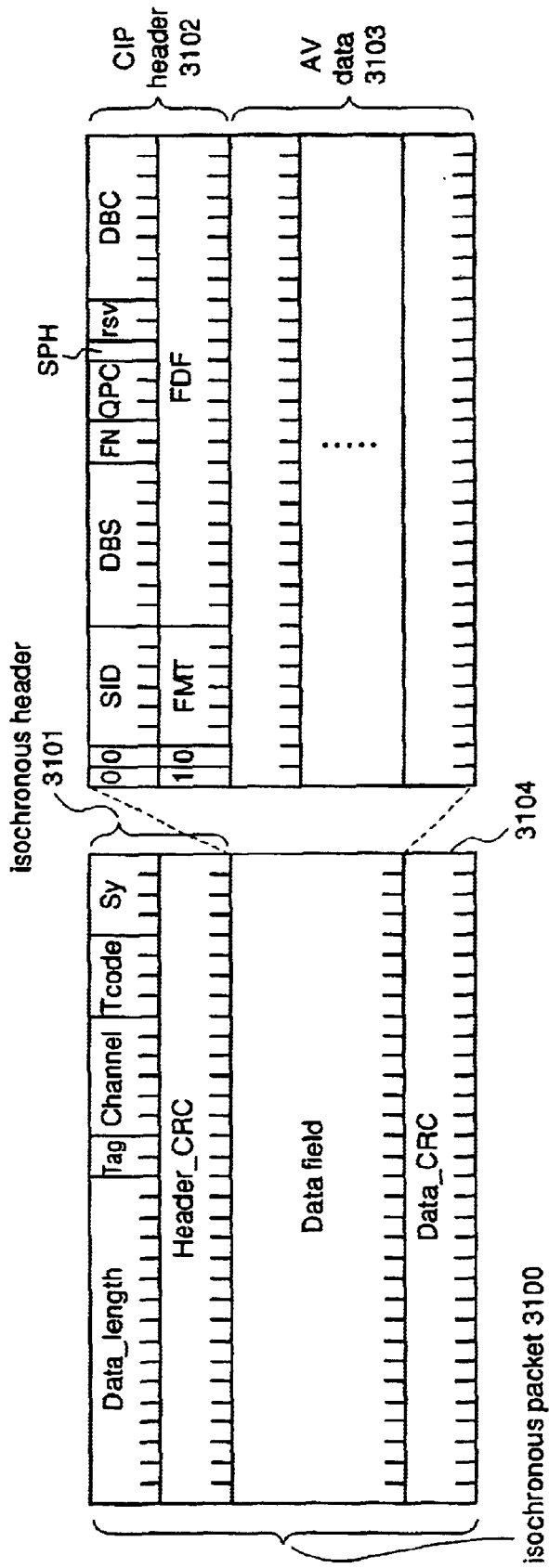
FIGS. 31(a) and 31(b) are diagrams showing a structure of a packet which contains no specific pattern data generated by the data transmitting device of the twelfth embodiment.

FIGS. 30, 31(*a*), 31(*b*), 32(*a*) and 32(*b*) are diagram for explaining a data transmitting device according to a twelfth embodiment of the present invention.

The sector structure of an optical disk as a recording medium employed in this twelfth embodiment is identical to that shown in FIG. 26(*a*).

The structure of the data transmitting device according to this twelfth embodiment is fundamentally identical to that of the data transmitting device 1011 according to the eleventh embodiment shown in FIG. 25. Further, the data outputting operation in the case where no ECC error is detected by the ECC decoder 2502, i.e., the operation of reading data from the optical disk 2508 and then outputting a packet to the network N by the data transmitter 2507, is identical to that already described for the data transmitting device 1011 of the eleventh embodiment.

The data transmitting device according to the twelfth embodiment is different from the device according to the eleventh embodiment only in that, when the ECC error is detected, the packet generator inserts data of a specific pattern into a packet, as information indicating the occurrence of ECC error.

Further, FIGS. 31(*a*) to 32(*b*) show the structures of isochronous packets 3100 and 3200, respectively, handled by the data transmitting device according to this twelfth embodiment. As can be seen from these figures, in the isochronous packets 3100 and 3200, the structure of CIP headers 3102 and 3202 are different from those of the CIP headers 2701 and 2901 of the isochronous packets handled in the data transmitting device according to the eleventh embodiment, respectively. That is, the CIP headers 3102 and 3202 have no ECC flags whereas the CIP headers 2701 and 2901 have the ECC flags 2702 and 2902, respectively.

Also in this twelfth embodiment, the data transmitter as a digital interface employed in the data transmitting device is the IEEE1394I/F.

A description is given of the operation of the data transmitting device.

It is assumed that data of a cluster 2617 is read from the optical disk 2508, processed by the signal processor 2501 and subjected to ECC decoding by the ECC decoder 2502 with no occurrence of error. In this case, the data of the cluster 2617 which has been subjected to ECC decoding is read into the AV data decoder 2506 and, simultaneously, input to the buffer 2503. Then, the data of the cluster 2617 output from the buffer 2503 is packetized by the packet generator 2504, and the packet so generated is output through the data transmitter 2507 to the network N.

Also in this twelfth embodiment, the cluster 2617 is composed of sectors 2601–2616, each having the size of 2048 bytes. Further, the packet generator 2504 divides the data of the cluster 2617 so that the data can be transmitted within an obtained band, packetizes the data of the divided clusters after adding header information or the like to the data of the divided clusters, and outputs the packets so generated to the data transmitter 2507.

FIGS. 31(a) and 31(b) show the structure of an isochronous packet handled in the IEEE1394I/F. The isochronous packet is composed of AV data 3103, and an isochronous header 3101 and a CIP header 3102, which headers are added to the AV data 3103. The AV data 3103 corresponds to the data of the cluster 2617.

FIG. 30 shows isochronous data flowing on the network N. In cycles 3005 and 3006, data 3001 and 3002 of the cluster 2617 flow, respectively, and the data 3002 in the cycle 3006 is the last data of the cluster 2617.

Next, it is assumed that an ECC error occurs when data of the cluster 2618 (refer to FIG. 26(a)) read from the optical disk 2507 is subjected to ECC decoding by the ECC decoder 2502. Then, the ECC decoder 2502 posts the occurrence of the ECC error to the system controller 2505 by a signal 2512. In this case, re-reading of the cluster 2618 from the optical disk 2508 is not carried out, but readout of the next cluster 2619 is carried out.

Accordingly, in the data input to the buffer 2503, the cluster 2619 follows the cluster 2617 as shown in FIG. 26(b). When the ECC decoder 2502 posts the occurrence of the ECC error to the system controller 2505, the system controller 2505 detects a point of time at which the last data of the cluster 2617 is output from the buffer 2503, according to a monitor signal 2515 showing the amount of data stored in the buffer 2503. When the last data of the cluster 2617 is output from the buffer 2503, the system controller 2505 posts that an ECC error has occurred in the next cluster to the packet generator 2504 by a signal 2513. Thereby, the packet generator 2504 knows that the data of the cluster to be input will not be input because of the ECC error. Then, the packet generator 2504 generates an isochronous packet 3200 including data of a specific pattern 3203a indicating that an ECC error has occurred, instead of the AV data 3103.

Employed as a specific pattern indicating that an ECC error has occurred is as follows: data of a pattern in which all bits (32 bits) in one horizontal line are 0; or a 32-bit sequence error code 000001B4h (h means hexadecimal) defined in MPEG2.

FIGS. 32(a) and 32(b) show the structure of the packet 3200 when an ECC error has occurred. As shown in FIG. 30, in a cycle 3007, the packet generated by the packet generator 2504 is output as a packet 3003 through the data transmitter 2507 to the network N.

Next, the data of the cluster 2619 is output from the buffer 2503 as shown in FIG. 26(b). Since the data of the cluster 2619 has no ECC error, it is packetized like the cluster 2617 by the packet generator 2504. Then, the packet generated by the packet generator 2504 is output through the data transmitter 2507 to the network N, in or after a cycle 3008.

As described above, in the data transmitting device according to the twelfth embodiment, when transmitting data, which has been read from a recording medium for each cluster (a unit of ECC processing) and subjected to ECC decoding and packetization, if the device cannot transmit the data because of an ECC error, data of a specific pattern is transmitted as information indicating that the ECC error has occurred. Therefore, it is possible to post the occurrence of the ECC error to the receiving end, and the receiving end can speedily cope with the ECC error at the transmitting end.

[Embodiment 13]

Figure 33:
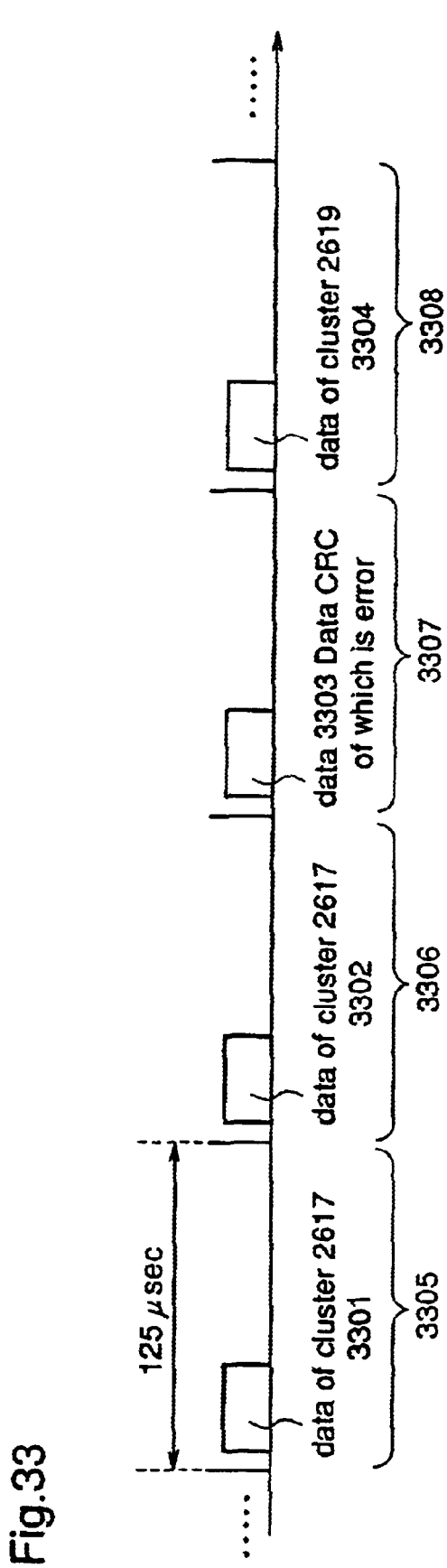
FIG. 33 is a diagram for explaining a data transmitting device according to a thirteenth embodiment of the present invention.

FIG. 33 is a diagram for explaining a data transmitting device according to a thirteenth embodiment of the present invention.

The sector structure of an optical disk as a recording medium employed in this thirteenth embodiment is identical to that shown in FIG. 26(a).

The structure of the data transmitting device according to this thirteenth embodiment is fundamentally identical to that of the data transmitting device 1011 according to the eleventh embodiment shown in FIG. 25. Further, the data outputting operation in the case where no ECC error is detected by the ECC decoder 2502, i.e., the operation of reading data from the optical disk 2508 and then outputting a packet to the network N by the data transmitter 2507, is identical to that already described for the data transmitting device 1011 of the eleventh embodiment.

The data transmitting device according to the thirteenth embodiment is different from the device according to the eleventh embodiment only in that, when an ECC error is detected, the packet generator adds incorrect data CRC 3104 as information indicating the occurrence of the ECC error.

Also in this thirteenth embodiment, the data transmitter as a digital interface of the data transmitting device is the IEEE1394I/F.

A description is given of the operation of the data transmitting device.

It is assumed that data of a cluster 2617 is read from the optical disk 2508, processed by the signal processor 2501, and subjected to ECC decoding by the ECC decoder 2502 with no occurrence of the error. In this case, the data of the cluster 2617 which has been subjected to ECC decoding is read into the AV decoder 2506 and, simultaneously, input to the buffer 2503. Then, the data of the cluster 2617 output from the buffer 2503 is packetized by the packet generator 2504, and the packet so generated is output through the data transmitter 2507 to the network N.

Also in this thirteenth embodiment, the cluster 2617 is composed of sectors 2601~2616, each having the size of 2048 bytes. Further, the packet generator 2504 divides the data of the cluster 2617 so that the data can be transmitted within an obtained band, and adds CRC data and header information or the like to the data of the divided clusters. Then, the packet generator 2504 packetizes the data of the divided clusters, and outputs the packets so generated to the data transmitter 2507.

FIGS. 31(a) and 31(b) show the structure of an isochronous packet handled in the IEEE1394I/F. The isochronous packet is composed of AV data 3103, an isochronous header 3101, a CIP header 3102, and data CRC 3104. The AV data 3103 corresponds to the data of the cluster 2617.

FIG. 33 shows isochronous data flowing on the network N. In cycles 3305 and 3306, data 3301 and 3302 of the cluster 2617 flow, respectively, and the data 3302 in the cycle 3306 is the last data of the cluster 2617.

Next, it is assumed that an ECC error occurs when the data of the cluster 2618 (refer to FIG. 26(a)) read from the optical disk 2507 is subjected to ECC decoding by the ECC decoder 2502. Then, the ECC decoder 2502 posts the occurrence of the ECC error to the system controller 2505 by a signal 2512. In this case, re-reading of the cluster 2618 from the optical disk 2508 is not carried out, but readout of the next cluster 2619 is carried out.

Accordingly, in the data input to the buffer 2503, the cluster 2619 follows the cluster 2617 as shown in FIG. 26(b). When the ECC decoder 2502 posts the occurrence of the ECC error to the system controller 2505, the system controller 2505 detects a point of time at which the last data of the cluster 2617 is output from the buffer 2503, according to a monitor signal 2515 showing the amount of data stored in the buffer 2503. When the last data of the cluster 2617 is output from the buffer 2503, the system controller 2505 posts that an ECC error has occurred in the next cluster to the packet generator 2504 by a signal 2513. Thereby, the packet generator 2504 knows that the data of the cluster to be input will not be input because of the ECC error. Then, the packet generator 2504 generates a packet in which incorrect data CRC 3104 is added to the arbitrary data 3103 as shown in FIGS. 31(a) and 31(b). The structure of the packet so generated is apparently identical to that of the packet shown in FIGS. 31(a) and 31(b). The data CRC 3104 is not correct CRC data with respect to the data 3103.

As shown in FIG. 33, in a cycle 3307, the packet generated by the packet generator 2504 is output as a packet 3303 through the data transmitter 2504 to the network N.

Next, the data of the cluster 2619 is output from the buffer 2503 as shown in FIG. 26(b). Since the data of the cluster 2619 has no ECC error, it is packetized like the cluster 2617 by the packet generator 2504. Then, the packet generated by the packet generator 2504 is output through the data transmitter 2507 to the network N, in or after a cycle 3308.

As described above, in the data transmitting device according to the thirteenth embodiment, when transmitting data, which has been read from a recording medium for each cluster (a unit of ECC processing) and subjected to ECC decoding and packetization, if the device cannot transmit the data because of an ECC error, a packet in which incorrect data CRC is added to AV data is generated, and this packet is transmitted to the network. Therefore, it is possible to post the occurrence of the ECC error to the receiving end, and the receiving end can speedily cope with the ECC error at the transmitting end.

[Embodiment 14]

Figure 34:
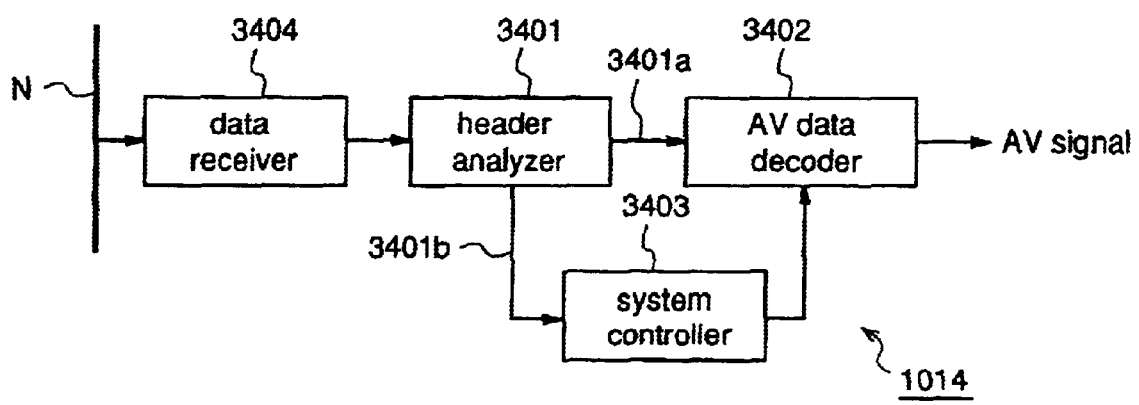
FIG. 34 is a block diagram showing a data receiving device according to a fourteenth embodiment of the present invention.

FIG. 34 is a block diagram showing a data receiving device according to a fourteenth embodiment of the present invention.

Referring to FIG. 34, there is shown a data receiving device 1014. The data receiving device 1014 is used to receive packets output from the data transmitting device 1011 of the eleventh embodiment toward the network N, and comprises a data receiver 3404 for receiving the packets on the network N, a header analyzer 3401 for analyzing a header of the received packet, and outputting data 3401a corresponding to a buffer output and a header analysis result 3401b, an AV data decoder 3402 for decoding the data 3401a from the header analyzer 3401 and outputting the resulting AV signal, and a system controller 3403 for controlling the decoder 3402 according to the header analysis result 3401b.

Subsequently, operation of the device 1014 will be described. When the data receiver 3404 receives the packets on the network N, the header 3401 at a next stage thereof checks their headers. More specifically, in a case where the packets 2801 and 2802 in FIG. 28 are received as the packet 2700 in FIGS. 27(a) and 27(b), the isochronous header 2703 is first checked and then the CIP header 2701 is then checked. When checking the CIP header 2701, the ECC flag 2702 contained therein is examined. When the ECC flag indicates "no ECC error", CRC check on the AV data 2704 is performed. When the CRC is correct, the AV data 2704 is output to the AV data decoder 3402, which decodes the AV data and outputs the resulting AV signal.

Subsequently, description is given of a case where the ECC flag 2702 indicates "ECC error". In this case, the data receiving device operates in the same manner that it processes the packet 2803 in FIG. 28 as the packet 2900 in FIGS. 29(a) and 29(b).

The header analyzer 3401 posts "ECC error" to the system controller 3403 using the header analysis result 3401b. Knowing that ECC error has occurred, the system controller 3403 posts this to the AV data decoder 3402, which aborts normal decoding mode operation, and performs error handling mode operation. Taken as an example of the error handling mode operation is, in a case where the AV data is MPEG data, retrieval of GOP (group of picture) headers, picture headers, or the like.

Thus, in the data receiving device 1014 of the fourteenth embodiment, when a packet received through the digital interface contains information indicating that the ECC error has occurred at the transmitting end, this is detected and then the decoding operation mode converts from the normal mode to the error handling mode. Therefore, at the receiving end, the error is processed speedily, whereby disorder of the AV signal due to the ECC error is minimized.

[Embodiment 15]

A data receiving device according to a fifteenth embodiment will be described with reference to FIGS. 34, 30, and 31.

The data receiving device of the fifteenth embodiment is used to receive the packets in FIG. 30 output from the data transmitting device of the twelfth embodiment toward the network N.

The data receiving device of the fifteenth embodiment differs from that of the fourteenth embodiment in that a header analyzer performs decision on data indicating that underflow has occurred.

Subsequently, operation of the device will be described.

When the data receiver 3404 receives packets on the network N, the header analyzer 3401 checks their headers. Specifically, in a case where it receives the packets 3001 and 3002 in FIG. 30 as the packet 3100 in FIGS. 31(a) and 31(b) or the packet 3200 in FIGS. 32(a) and 32(b), the header analyzer 3401 checks the isochronous header 3101 or 3201, checks the CIP header 3102 or 3202, and further, checks data CRC of the AV data 3103 or 3203. When the data CRC is correct, the header analyzer 3401 checks whether or not the AV data 3103 or 3203 contains a specific pattern.

As examples of the specific pattern, there are data with all bits set to "0" aligned in a row (32 bits), a 32-bit sequence error code 000001B4h (h: hexadecimal number) defined in MPEG2, and so forth.

In case of the AV data 3103 including no specific pattern data, it is output to the AV data decoder 3402, which decodes the AV data, and outputs the resulting AV signal.

Subsequently, description is given of the AV data 3203 including the specific pattern. In this case, the data receiving device 1015 operates in the same manner that it processes the packet 3003 in FIG. 30. The header analyzer 3401 posts the ECC error to the system controller 3403 using the signal 3401b. Knowing the ECC error, the system controller posts this to the AV data decoder 3402, which aborts normal decoding mode operation and then starts error handling mode operation. Taken as an example of the error handling mode operation is, in a case where AV data is MPEG data, retrieval of GOP (group of picture) headers, picture headers, or the like.

Thus, in the data receiving device of the fifteenth embodiment, when a packet received through the digital interface contains the specific pattern data as information indicating that the ECC error has occurred at the transmitting end, this is detected and then the decoding operation mode converts from the normal mode to the error handling mode. Therefore, at the receiving end, as in the case of the fourteenth embodiment, the error is processed speedily, whereby disorder of the AV signal due to the ECC error is minimized.

[Embodiment 16]

A data receiving device of the sixteenth embodiment will be described with reference to FIGS. 34, 31, and 33.

The data receiving device of the sixteenth embodiment is used to receive packets output from the data transmitting device of the thirteenth embodiment toward the network N.

The data receiving device of the sixteenth embodiment differs from that of the fourteenth embodiment in that a header analyzer performs decision on data indicating that underflow has occurred.

Subsequently, operation of the device will be described.

When the data receiver 3404 receives the packets on the network N, the header analyzer 3401 checks their headers. More specifically, in a case where the packets 3301 and 3302 in FIG. 33 are received as the packet 3100 in FIG. 31, the header analyzer 3401 first checks the isochronous header 3101 and then the CIP header 3102, and further, performs CRC check on the AV data 3103. When the data CRC 3014 is correct, the header analyzer 3401 outputs the AV data 3103 to the AV data decoder 3402, which decodes the AV data and outputs the resulting AV signal.

Subsequently, description is given of a case where the data CRC 3104 is incorrect. In this case, the data receiving device 1016 operates in the same manner that it processes the packet 3303 in FIG. 33.

The header analyzer 3401 posts "ECC error" to the system controller 3403 using the signal 3401b. Knowing the ECC error, the system controller 3403 posts this to the AV data decoder 3402, which aborts normal decoding mode operation, and performs error handling mode operation. Taken as an example of the error handling mode operation is, in a case where AV data is MPEG data, retrieval of GOP headers, picture headers, or the like.

Thus, in the data receiving device of the sixteenth embodiment, when a packet received through the digital interface contains the incorrect data CRC as information indicating that the ECC error has occurred at the transmitting end, this is detected and then the decoding operation mode converts from the normal mode to the error handling mode. Therefore, at the receiving end, as in the case of the fourteenth and fifteenth embodiments, the error is processed speedily, whereby disorder of the AV signal due to the ECC error is minimized.

[Embodiment 17]

Figure 35:
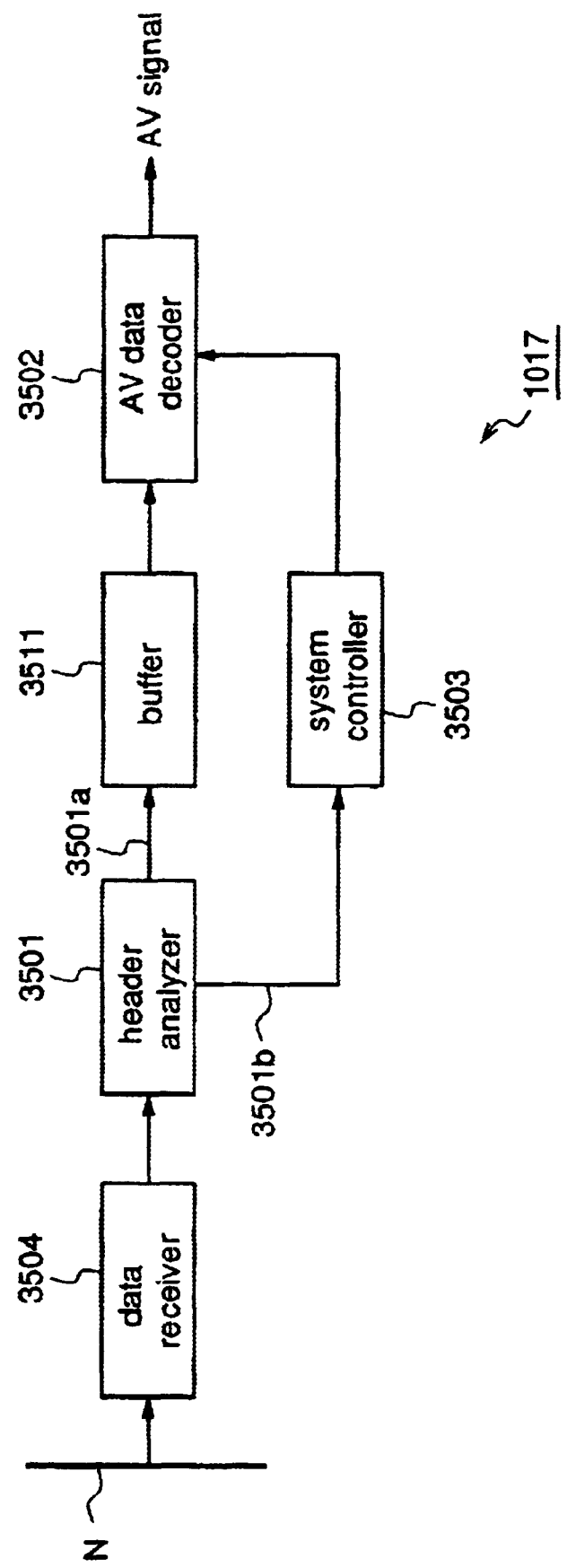
FIG. 35 is a block diagram showing a data receiving device according to a seventeenth embodiment of the present invention.

FIG. 35 is a block diagram showing a data receiving device according to a seventeenth embodiment of the present invention.

The data receiving device 1017 is provided with a buffer 3511 between a header analyzer 3501 and an AV data decoder 3502, which has been added to the data receiving device 1014 of the fourteenth embodiment in FIG. 34, and is used to receive packets output from the data transmitting device of the eleventh embodiment toward the network N.

Subsequently, operation of the device will be described.

When the data receiver 3504 receives the packets on the network N, the header analyzer 3501 checks their headers. More specifically, in a case where the packets 2801 and 2802 in FIG. 28 are received as the packet 2707 in FIGS. 27(a) and 27(b), the header analyzer 3501 first checks the isochronous header 2703 and then the CIP header 2701. When checking the CIP header 2701, the analyzer 3501 examines the ECC flag 2702 contained in the CIP header 2701. When the ECC flag indicates "no ECC error", the analyzer 3501 performs CRC check on the AV data. When the CRC is correct, the header analyzer 3501 outputs the AV data 2704 to the buffer 3511 as a signal 3501a. The AV data 2704 input to the buffer 3511 is, after it is delayed for a fixed time, output to the AV data decoder 3502, which decodes the AV data and outputs the resulting AV signal.

Subsequently, description is given of a case where the ECC flag indicates "ECC error" when checking the ECC flag contained in the CIP header 2702. In this case, the data receiving device operates in the same manner that it processes the packet 2803 in FIG. 20 as the packet 2900 in FIGS. 29(a) and 29(b).

The header analyzer 3501 posts the ECC error to the system controller 3503 using the header analysis result 3501b. Knowing the ECC error, the system controller 3503 posts this to the AV data decoder 3502. The AV data decoder 3502 performs processing considering that error data will be input thereto after some delay in the buffer 3511 while data is delayed by the buffer 3511, and then aborts normal decoding mode operation, and starts error handling mode operation when the error data is input thereto.

Thus, in the data receiving device 1017 of the seventeenth embodiment, when a packet received through the digital interface contains the information indicating that the ECC error has occurred at the transmitting end, this is detected and then the decoding operation mode converts from the normal mode to the error handling mode. Therefore, at the receiving end, the error is processed speedily, whereby disorder of the AV signal due to the ECC error is minimized.

In addition, the AV data is delayed by the buffer, and then decoded. Therefore, the decoder can detect that incorrect AV data resulting from the ECC error will be input thereto. Thereby, decoding can be performed in view of error processing in advance, whereby disorder of the video or audio signal due to the ECC error is effectively suppressed.

While in the eleventh to seventeenth embodiments the IEEE 1394 is illustrated as the digital interface, another digital interface may be used.

While in the eleventh to seventeenth embodiments, the data recorded in the recording medium is used as the AV data, this may include subtitle data. Besides, the data recorded in the recording medium may be one of the video data and audio data.

While in the eleventh to thirteenth embodiments the optical disk is illustrated as the recording medium, this may be another recording medium such as a magnetic disk.

In the case where ECC decoding of the cluster 2618 has developed the ECC error in the data transmitting device of the eleventh to thirteenth embodiments, it will not be reread from the optical disk 2508, and the subsequent cluster 2619 is read therefrom. Contrary to this, the cluster 2618 may be reread.

Although in the data transmitting device of the eleventh embodiment, whether or not the ECC error has occurred is indicated by the ECC flag 2702 "1" or "0", respectively, this may be reversed.

While the data receiving device of the seventeenth embodiment is shown as being the device of the fourteenth embodiment to which the buffer is added, the buffer may be added to the data receiving device of the fifteenth or sixteenth embodiment.

While in the eleventh to thirteenth embodiments, the buffer output is directly sent to the packet generator, it may be divided as already described in the first embodiment, and output to the packet generator.

What is claimed is:

1. A data transmitting device which obtains a frequency band having a maximum frequency band width permitted according to a condition of a network, and performs a transmission of data using the obtained frequency band during a transmission cycle period set up repeatedly, comprising:

multiplexing means for receiving plural kinds of coded data, and multiplexing these coded data to generate a multiplexed coded stream having a predetermined data structure;

dividing means for dividing the multiplexed coded stream into data units having a data size which is determined according to the frequency band width of the obtained frequency band and the length of transmission cycle period to generate divided pack data corresponding to divided packs as the data units;

packet generating means for adding header information to respective divided pack data to generate packet data corresponding to packets as data transmission units; and transmitting means for performing transmitting process in which the respective packet data is output toward the network by using the obtained frequency band during the transmission cycle period, wherein the packets as data transmission units have a data size which is smaller than an amount of data that can be transmitted during one transmitting cycle period, the amount of data being determined according to the obtained frequency band.

2. The data transmitting device as defined in claim 1 wherein the multiplexing means is system encoding means which receives the plural kinds of coded data, generates and outputs an MPEG2 program stream as the multiplexed coded stream having a predetermined data structure.

3. The data transmitting device as defined in claim 2 wherein the dividing means divides the multiplexed coded stream having a predetermined data structure in such a manner that the divided packs each contain coded data of one kind.

4. The data transmitting device as defined in claim 3 wherein the packet generating means generates packet data by adding stuffing data to a divided pack of a size smaller than the prescribed data size so that all the generated packets are of the same size.

5. A data transmitting device which transmits data through a network, comprising:

reading means for reading out multiplexed data which is recorded in sector units of a prescribed data size in a recording medium, for each sector;

dividing means for dividing multiplexed data corresponding to each sector read out by the reading means into data units, to generate divided pack data corresponding to divided packs as the data units, the data units having a data size which is determined according to a readout speed at which the data is read out from the recording medium and a frequency band which is used for the transmission of the data;

packet generating means for adding header information to respective divided pack data, to generate packet data corresponding to packets as data transmission units; and transmitting means for transmitting the respective packet data to be output toward the network as a multiplexed stream by using the frequency band.

6. The data transmitting device as defined in claim 5 wherein the dividing means divides the multiplexed coded data corresponding to the sector so that head data of each sector matches head data of the corresponding divided pack.

7. The data transmitting device as defined in claim 6 wherein the packet generating means generates packet data by adding information indicating that a divided pack contains head data of the corresponding sector to the divided pack.

8. The data transmitting device of claim 7 wherein, when the outputting means repeats, at fixed time intervals, packet-by-packet data transmission for outputting at least one packet data to the network at a fixed transmission rate, it adds information indicating that the divided pack contains the head data to a header of an isochronous packet for use in an isochronous transfer which performs the data transmission in synchronization with a transmission request in the outputting means.

9. The data transmitting device of claim 7 wherein the information is count number indicating the number of plural divided packs corresponding to each sector.

10. A data receiving device for receiving packet data output from the data transmitting device of claim 7 as a coded stream, said device comprising:

receiving means for receiving the packet data and outputting the divided pack data corresponding to each packet according to analysis of its header information; and coupling means for coupling the divided pack data output from the receiving means to generate data corresponding to the sector.

11. The data receiving device as defined in claim 10 wherein the sector is 2048 bytes in data size.

12. The data receiving device of claim 10 wherein the recording medium contains MPEG2 program stream data which has been subjected to prescribed signal processing.

13. A data recording device for receiving and recording packet data output as a coded stream from the data transmitting device of claim 7, said device comprising:

receiving means for receiving the packet data and outputting the divided packet data corresponding to each packet according to analysis of its header information;

coupling means for coupling the divided pack data output from the receiving means to generate data corresponding to the sector; and recording means for recording the data corresponding to the sector output from the coupling means in a recording medium having a sector structure.

14. The data recording device of claim 13 wherein the sector is 2048 bytes in data size.

15. The data recording device of claim 13 wherein the recording medium at the transmitting end contains MPEG2 program stream data which has been subjected to prescribed signal processing.

16. The data transmitting device of claim 7 wherein the sector is 2048 bytes in data size.

17. The data transmitting device of claim 7 wherein the recording medium contains MPEG2 program stream data which has been subjected to prescribed signal processing.

18. A data receiving device for receiving packet data output from the data transmitting device of claim 6 as a coded stream, said device comprising:

receiving means for receiving the packet data and outputting the divided pack data corresponding to each packet according to analysis of its header information; and coupling means for coupling the divided pack data output from the receiving means to generate data corresponding to the sector.

19. The data receiving device as defined in claim 18 wherein the sector is 2048 bytes in data size.

20. The data receiving device of claim 18 wherein the recording medium contains MPEG2 program stream data which has been subjected to prescribed signal processing.

21. A data recording device for receiving and recording packet data output as a coded stream from the data transmitting device of claim 6, said device comprising:

receiving means for receiving the packet data and outputting the divided pack data corresponding to each packet according to analysis of its header information;

coupling means for coupling the divided pack data output from the receiving means to generate data corresponding to the sector; and recording means for recording the data corresponding to the sector output from the coupling means in a recording medium having a sector structure.

22. The data recording device of claim 21 wherein the sector is 2048 bytes in data size.

23. The data recording device of claim 21 wherein the recording medium at the transmitting end contains MPEG2 program stream data which has been subjected to prescribed signal processing.

24. The data transmitting device of claim 6 wherein the sector is 2048 bytes in data size.

25. The data transmitting device of claim 6 wherein the recording medium contains MPEG2 program stream data which has been subjected to prescribed signal processing.

26. The data transmitting device as defined in claim 5 wherein the packet generating means generates packet data by adding information indicating that a divided pack contains head data of the corresponding sector to the divided pack.

27. The data transmitting device of claim 26 wherein, when the outputting means repeats, at fixed time intervals, packet-by-packet data transmission for outputting at least one packet data to the network at a fixed transmission rate, it adds information indicating that the divided pack contains the head data to a header of an isochronous packet for use in an isochronous transfer which performs the data transmission in synchronization with a transmission request in the transmitting means.

28. The data transmitting device of claim 26 wherein the information is count number indicating the number of plural divided packs corresponding to each sector.

29. A data receiving device for receiving packet data output from the data transmitting device of claim 26 as a coded stream, said device comprising:

receiving means for receiving the packet data and outputting the divided pack data corresponding to each packet according to analysis of its header information; and coupling means for coupling the divided pack data output from the receiving means to generate data corresponding to the sector.

30. The data receiving device as defined in claim 29 wherein the sector is 2048 bytes in data size.

31. The data receiving device of claim 29 wherein the recording medium contains MPEG2 program stream data which has been subjected to prescribed signal processing.

32. A data recording device for receiving and recording packet data output as a coded stream from the data transmitting device of claim 26, said device comprising:

receiving means for receiving the packet data and outputting the divided pack data corresponding to each packet according to analysis of its header information;

coupling means for coupling the divided pack data output from the receiving means to generate data corresponding to the sector; and recording means for recording the data corresponding to the sector output from the coupling means in a recording medium having a sector structure.

33. The data recording device of claim 32 wherein the sector is 2048 bytes in data size.

34. The data recording device of claim 32 wherein the recording medium at the transmitting end contains MPEG2 program stream data which has been subjected to prescribed signal processing.

35. The data transmitting device of claim 26 wherein the sector is 2048 bytes in data size.

36. The data transmitting device of claim 26 wherein the recording medium contains MPEG2 program stream data which has been subjected to prescribed signal processing.

37. A data receiving device for receiving packet data output from the data transmitting device of claim 5 as a coded stream, said device comprising:

receiving means for receiving the packet data and outputting the divided pack data corresponding to each packet according to analysis of its header information; and coupling means for coupling the divided pack data output from the receiving means to generate data corresponding to the sector.

38. The data receiving device as defined in claim 37 wherein the sector is 2048 bytes in data size.

39. The data receiving device of claim 37 wherein the recording medium contains MPEG2 program stream data which has been subjected to prescribed signal processing.

40. A data recording device for receiving and recording packet data output as a coded stream from the data transmitting device of claim 5, said device comprising:

receiving means for receiving the packet data and outputting the divided pack data corresponding to each packet according to analysis of its header information;

coupling means for coupling the divided pack data output from the receiving means to generate data corresponding to the sector; and recording means for recording the data corresponding to the sector output from the coupling means in a recording medium having a sector structure.

41. The data recording device of claim 40 wherein the sector is 2048 bytes in data size.

42. The data recording device of claim 40 wherein the recording medium at the transmitting end contains MPEG2 program stream data which has been subjected to prescribed signal processing.

43. The data transmitting device of claim 5 wherein the sector is 2048 bytes in data size.

44. The data transmitting device of claim 5 wherein the recording medium contains MPEG2 program stream data which has been subjected to prescribed signal processing.

45. A data transmitting method for obtaining a frequency band having a maximum frequency band width permitted according to a condition of a network, and performs a transmission of data using the obtained frequency band during a transmission cycle period set up repeatedly, comprising:

multiplexing step for receiving plural kinds of coded data, and multiplexing these coded data to generate a multiplexed coded stream having a predetermined data structure;

dividing step for dividing the multiplexed coded stream into data units having a data size which is determined according to the frequency band width of the obtained frequency band and the length of transmission cycle period to generate divided pack data corresponding to divided packs as the data units;

packet generating step for adding header information to respective divided pack data to generate packet data corresponding to packets as data transmission units; and transmitting step for performing transmitting process in which the respective packet data is output toward the network by using the obtained frequency band, wherein the packets as data transmission units have a data size which is smaller than an amount of data that can be transmitted during one transmitting cycle period, the amount of data being determined according to the obtained frequency band.

46. A data transmitting method for transmitting data toward a network, comprising:

reading step for reading out multiplexed data which is recorded in sector units of a prescribed data size in a recording medium, for each sector;

dividing step for dividing data corresponding to each sector read out in the reading step in data units, to generate divided pack data corresponding to divided packs as the data units, the data units having a data size which is determined according to a readout speed at which the data is read out from the recording medium and a frequency band which is used for the transmission of the data;

packet generating step for adding header information to respective divided pack data, to generate data corresponding to packets as data transmission units; and transmitting step for transmitting the respective packet data to be output toward the network by using the obtained frequency band.

* * * * *

UNITED STATES PATENT AND TRADEMARK OFFICE
CERTIFICATE OF CORRECTION

PATENT NO.     : 6,618,396 B1
DATED          : September 9, 2003
INVENTOR(S)    : Satoshi Kondo et al.

It is certified that error appears in the above-identified patent and that said Letters Patent is hereby corrected as shown below:

<u>Title page,</u>
Add Item:
-- [73] Assignee: Matsushita Electric Industrial Co., Ltd. (JP) --.

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,618,396 B1
DATED         : September 9, 2003
INVENTOR(S)   : Satoshi Kondo et al.

It is certified that error appears in the above-identified patent and that said Letters Patent is hereby corrected as shown below:

<u>Title page,</u>
add:
-- [73]  Assignee: Matsushita Electric Industrial Co., Ltd. (JP) --.

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,618,396 B1 Page 1 of 1
DATED : September 9, 2003
INVENTOR(S) : Satoshi Kondo et al.

It is certified that error appears in the above-identified patent and that said Letters Patent is hereby corrected as shown below:

Column 44,
Line 39, change "packet" to -- pack --.

Signed and Sealed this

Fifteenth Day of February, 2005

JON W. DUDAS
*Director of the United States Patent and Trademark Office*